United States Patent
Kriza

(10) Patent No.: US 7,778,870 B1
(45) Date of Patent: Aug. 17, 2010

(54) SYSTEM AND METHOD FOR MANAGING, MONITORING AND REPORTING ON A PLURALITY OF ONLINE INCENTIVE PROGRAMS

(75) Inventor: George Kriza, Willow Springs, IL (US)

(73) Assignee: Marketing Technology Concepts, Inc., Schaumburg, IL (US)

( * ) Notice: Subject to any disclaimer, the term of this patent is extended or adjusted under 35 U.S.C. 154(b) by 1534 days.

(21) Appl. No.: 10/946,523

(22) Filed: Sep. 21, 2004

(51) Int. Cl.
*G06Q 30/00* (2006.01)

(52) U.S. Cl. ............... 705/14.16; 705/14.2; 705/14.24; 705/14.29; 705/14.69

(58) Field of Classification Search .................. 705/14, 705/10, 14.16, 14.2, 14.24, 14.29, 14.69
See application file for complete search history.

(56) References Cited

U.S. PATENT DOCUMENTS

| | | | |
|---|---|---|---|
| 5,025,372 A | 6/1991 | Burton et al. | |
| 5,056,019 A | 10/1991 | Schultz et al. | |
| 5,774,870 A * | 6/1998 | Storey | 705/14 |
| 6,000,608 A | 12/1999 | Dorf | |
| 6,009,412 A | 12/1999 | Storey | |
| 6,009,415 A | 12/1999 | Shurling et al. | |
| 6,061,660 A * | 5/2000 | Eggleston et al. | 705/14 |
| 6,067,525 A * | 5/2000 | Johnson et al. | 705/10 |
| 6,189,787 B1 * | 2/2001 | Dorf | 235/380 |
| 6,195,644 B1 | 2/2001 | Bowie | |
| 6,253,187 B1 * | 6/2001 | Fox | 705/10 |
| 6,424,951 B1 | 7/2002 | Shurling et al. | |
| 6,820,061 B2 | 11/2004 | Postrel | |
| 6,820,082 B1 * | 11/2004 | Cook et al. | 707/9 |
| 6,826,572 B2 * | 11/2004 | Colace et al. | 707/10 |
| 6,920,464 B2 * | 7/2005 | Fox | 1/1 |
| 6,965,868 B1 * | 11/2005 | Bednarek | 705/9 |
| 7,054,830 B1 * | 5/2006 | Eggleston et al. | 705/14.26 |
| 7,104,443 B1 * | 9/2006 | Paul et al. | 235/380 |
| 2002/0046091 A1 | 4/2002 | Mooers et al. | |
| 2002/0095333 A1 * | 7/2002 | Jokinen et al. | 705/14 |
| 2002/0169671 A1 | 11/2002 | Junger | |
| 2002/0188509 A1 * | 12/2002 | Ariff et al. | 705/14 |
| 2003/0200142 A1 | 10/2003 | Hicks et al. | |
| 2003/0200144 A1 * | 10/2003 | Antonucci et al. | 705/14 |
| 2004/0122734 A1 | 6/2004 | Schleicher et al. | |
| 2004/0122735 A1 * | 6/2004 | Meshkin | 705/14 |
| 2004/0199398 A1 * | 10/2004 | Kubota | 705/1 |
| 2005/0043992 A1 * | 2/2005 | Cohagan et al. | 705/14 |
| 2005/0144066 A1 * | 6/2005 | Cope et al. | 705/14 |
| 2005/0192863 A1 * | 9/2005 | Mohan | 705/14 |
| 2005/0256766 A1 * | 11/2005 | Garcia et al. | 705/14 |

* cited by examiner

*Primary Examiner*—James W Myhre
*Assistant Examiner*—Adam Chornesky
(74) *Attorney, Agent, or Firm*—Patzik, Frank & Samotny Ltd.

(57) ABSTRACT

A system and method for centralizing the creation, approval, monitoring and managing of a plurality of incentive reward or spiff programs. The system preferably includes a host system that allows program managers, an administrator and participants to access the system in connection with spiff programs. The system also may monitor and report on the effectiveness of the spiff programs to permit the program manager to increase its return on investment. Once a spiff program is approved, registered participants are automatically enrolled in the program. Upon the entering or receipt of sales information, the system automatically begins the claims process for all eligible products. Centralizing the available spiff programs allows the participants to combine rewards and simplifies tax issues. The users may also view various reports on the spiff programs and directly communicate with one another.

46 Claims, 81 Drawing Sheets

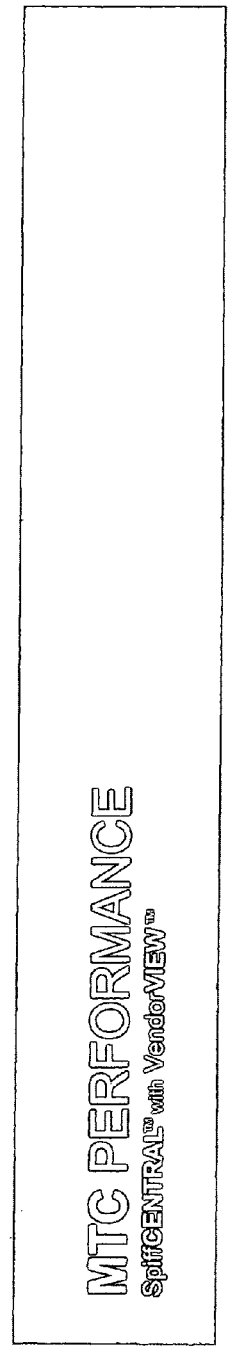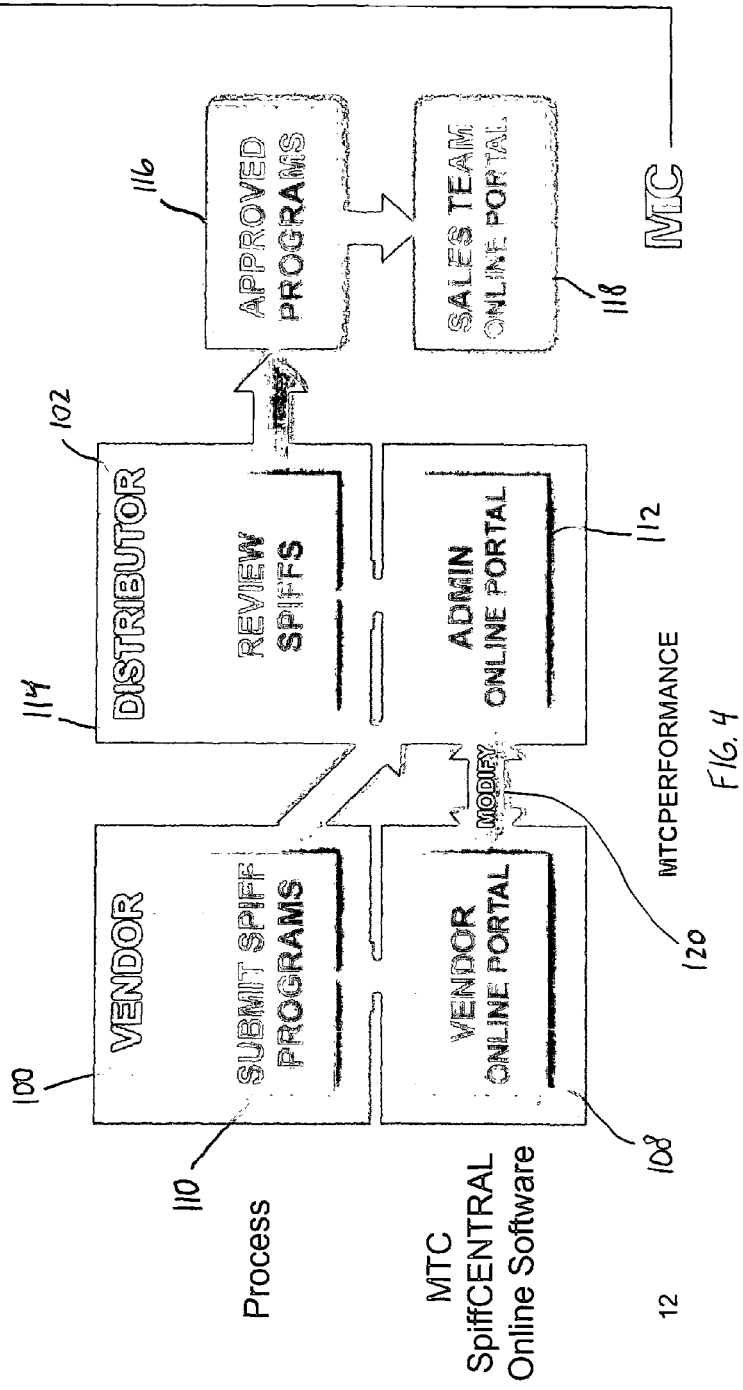
FIG. 4

MTC SpiffCENTRAL™
Vendor Manager

My Promotions ▼ | Report Suite ▼ | Manage Content | Manage Account | Manage Invoices | Home | Promotion Search

Add New Promotion

Step 1: Select a Promotion Type

Debit Card — Reward dollars to sales representatives for sales of eligible products → 170

Points — Designate points for each product. 10 points = $1 → 172

Lottery — A lottery contest to award a fixed amount of merchandise, travel, cash or a mix of prizes to sales representatives → 174

Prize Contest — A contest to award merchandise, travel, cash or a mix of prizes to sales representatives who reach a pre-determined threshold → 176

Quick View

Jim Patrick    Logout
3com Corporation

You Have Outstanding Invoice(s)
You may not enter a new promotion until payment has been received.
View Invoices.

Promotions
- Incomplete   0
- Pending   2
- Active   3

Support

Technical Support
demo@mtcperformance.com
800.800.0000 (8:30a - 5:00p CST)

Promotion Entry Process

Step 4:

*Selecting your SKUs to SPIFF*

After selecting, your SKUs will be shown in the Search box.*

Select the SKUs you wish to select and enter the SPIFF amount per SKU. You will need to repeat this process for each different SPIFF value.

Select [Add to Your Promotion]

\* If you select another manufacturer's SKU, a warning will state SKU OWNED BY ANOTHER SUPPLIER. If you select a SKU already in a current SPIFF promotion, a warning will state ALREADY USED IN THIS PROMOTION.

FIG. 11

Promotion Entry Process

Step 4 cont.:

*Selecting your SKUs to SPIFF*

After selecting,  your SKUs will be shown in the promotion box.

From here, you can Remove or Change Value by selecting the SKU and entering the change in the box.

Once complete, Select

Promotion Entry Process

Step 5:

*Selecting a promotion spotlight or uploading a pdf*

After completing the SKU process, you can elect to create a Promotion Spotlight page or upload a pdf*.

Select Promotion Spotlight Builder and then select [Next >>]

* To upload a pdf, select from the menu and follow the upload process.

Promotion Wizard

How would you like to create your Promotion Spotlight?

⦿ Use our Online Promotion Spotlight Builder
   Take advantage of our easy-to-use Promotion Spotlight Builder and create a professional looking web page to feature your promotion.
   You can add text, images, links and attachments!

○ Upload an Adobe® PDF File
   Use this form to upload a PDF file as your promotion spotlight.
   PDF File [Choose File] no file selected

[<< back]  [Next >>]

FIG. 13

Promotion Entry Process

Step 7:

*Creating your Banner Ad*

You can upload a graphic which will be viewed on the Participant Home Page

Promotion Wizard

Please upload a banner ad for your Promotion Spotlight.

Spotlight Banner Image
Your banner image will appear on the Sales Rep site.

Will be displayed at 160 x 168 (pixels).

[Choose File] Upload Image no file selected

[<<Back] [Save & Preview] [Skip] [Next>>]

FIG. 15

MTC Demo Navigator

MTC
SpiffCENTRAL™
Vendor Manager

My Promotions | Report Center | Manage Content | Manage Account | Manage Invoices | Promotion Search

Browse Promotions

Filter Results

Status: All
Promotion Type: All
Keyword: 
Valid During: Month / Year

Search   Show All

| Status | Promotion # | Type | Title | Start | End | # Products | Action |
|---|---|---|---|---|---|---|---|
| ● | 1658 | Points | LanWan routers | 1/1/04 | 7/31/04 | 1 | Details |
| ● | 1657 | Debit Card | $4 NIC spiff - November | 1/1/04 | 7/31/04 | 3 | Details |
| ● | 1656 | Points | Router Spiff | 1/1/04 | 7/31/04 | 4 | Details |
| ● | 1655 | Debit Card | Switch 4200/4400 spiff | 1/1/04 | 7/31/04 | 2 | Details |
| ● | 1654 | Debit Card | $2 NIC spiff ... addition to | 1/1/04 | 7/31/04 | 4 | Details |
| ● | 1653 | Debit Card | $2 Gig NIC spiff | 1/1/04 | 7/31/04 | 1 | Details |
| ● | 1652 | Debit Card | 3Com Baseline spiff | 1/1/04 | 7/31/04 | 3 | Details |
| ● | 1651 | Points | Q4 2003 | 1/1/04 | 7/31/04 | 2 | Details |

Status Key
● Declined
● Incomplete
● Pending Review
● In Review
● Approved
● Active
● Complete

Quick View

Jim Patrick — Logout
3com Corporation

You Have Outstanding Invoice(s)
You may not enter a new promotion until payment has been received.
View Invoices

Promotions
Q Incomplete    0
Q Pending       2
Q Active        3

Support

Technical Support
demo@mtcperformance.com
800.800.0000 (8:30a - 5:00p CST)

FIG. 16 mtc
SpiffCENTRAL™
Vendor Manager

My Promotions | Report&Bills | Manage Content | Manage Account | Manage Invoices | Home | Promotion Search

Promotion # 1657

This Promotion Is Active

[Print My Promotions] [Action] [Duplicate]

Summary

- 260 — Title: $4 NIC spiff - November
- 262 — Description: $4 NIC spiff for every units sold.
- 264 — Start Date: 01/01/2004
- End Date: 07/31/2004

Spiffed Products

| SKU # | Partner Part | Partner | Description | Value (Cash) |
|---|---|---|---|---|
| MTC-143 | 3C17400 | 3com Corporation | SS3 3824 24pt 10/100/1000-swch | 8.00 |
| MTC-251 | 3C13678 | 3com Corporation | 3com Router X-2 DTE to DTE | 10.00 |
| MTC-170 | 3CR17501-91-US | 3com Corporation | Superstack3 3250 48pt-swch w/ 2 GIG Connect | 8.00 |

270 — (Summary line)
274 — (Partner line)
272 — (SKU line)
278 — (Value line)

Quick View

Jim Patrick — Logout
3com Corporation

You Have Outstanding Invoice(s)
You may not enter a new promotion until payment has been received.
View Invoices Promotions
- Q Incomplete    0
- Q Pending       2
- Q Active        3

Support

Technical Support
demo@mtcperformance.com
800.800.0000  (8:30a - 5:00p CST)

FIG. 17

SpiffCENTRAL Vendor - Report Suite

Your Program Name

My Promotions | My Reports | My Account

Demo | Participant | Vendor | Admin

My Reports
- Report Suite

Home

Comprehensive Report Suite

| Reports | Description |
|---|---|
| Account Manager List | Listing of all account managers. |
| Account Manager Listing with Claim Info | Listing of all account managers including valid claim information |
| Account Manager Total Claims Detail | Detailed report of all product claim data by AM |
| Batch Claim Detail | Detailed breakout of claims in a given batch |
| Batch Claim Summary | Claim Summary based on selected batch number |
| Batch Product Accounting | Breakout of products sold |
| Invoice Backup | Shows spiff details for a particular invoice number. |
| Performance - SPIFs - Account Manager | Account manager report showing total SPIF dollars claimed |
| Performance - Units - Account Manager | Account manager report showing total product units claimed |
| Product Promotion Sales by Account Manager | Summary of products sold and claimed by AM |
| Product Promotion Sales by Group | Summary of products sold and claimed by Group |
| Product Promotion Sales Results | Summary of products sold and claimed by funding period |
| Promotion Claim Detail by Funding Period | Detailed report of all claim data for a specific funding period by AM. Please use for invoice validation |
| Promotion Claim Summary | Summary report of all claim data for a specific claim funding period by AM |
| Sales Out Accounting by Account Manager | Products claimed report summarizing units and claim dollars by product and AM |

FIG. 18

MTC Demo Navigator

MTC
SPIFFCENTRAL™
Vendor Manager

My Promotions ▼ | Report Suite ▼ | Manage Content ▼ | Manage Account ▼ | Manage Invoices ▼ | Home | Promotion Search

Choose a Report

Contest Spiff Winners
Shows all winners picked with their acceptance status.

Detailed Sales Out by Sales Rep
Sales rep sales out data.

Invoice Backup
Detailed sales out by invoice number.

Sales Out by Participant
Shows products sold by participant.

Sales Out by Product
Shows participants who sold a product.

Spiff Summary by Participant
Shows total spiffs earned by participant.

Quick View

Jim Patrick          Logout
3com Corporation

You Have Outstanding Invoice(s)
You may not enter a new promotion until payment has been received.
View Invoices Promotions
Q Incomplete    0
Q Pending       2
Q Active        3

Support

Technical Support
demo@mtcperformance.com
800.800.0000  (8:30a - 5:00p CST)

MTC Demo Navigator

MTC SP*T CENTRAL™
Vendor Manager

My Promotions ▼ | Report Suite ▼ | Manage Content | Manage Account ▼ | Manage Invoices ▼ | Home | Promotion Search

Sales Out by Product
Shows participants who sold a product.

Switch Report: Sales Out by Product [Go]

⊞ Expand All   ⊟ Collapse All

| Product | SKU# | Total Qty | Net Spiff |
|---|---|---|---|
| ⊞ 3com 11mbps Wireless LAN PC Card With XJack Antenn | MTC-561 | 56.00 | 12,320.00 |
| ⊞ 3com Officeconnect Dual-speed Switch 8 | MTC-185 | 60.00 | 12,000.00 |
| ⊞ 3com Officeconnect Wireless 11G | MTC-493 | 87.00 | 8,700.00 |
| ⊞ 3com Router X.21 DTE Cable FOR | MTC-251 | 61.00 | 610.00 |
| ⊞ Maint 1YR 8x5xnbd | MTC-71 | 78.00 | 15,600.00 |
| ⊞ Partner Express 24x7x4 HR Cat18 | MTC-307 | 63.00 | 13,860.00 |
| ⊞ Software Upgrade Cat16 | MTC-543 | 86.00 | 12,900.00 |
| ⊞ SS3 3824 24pt 10/100/1000-swch | MTC-143 | 96.00 | 768.00 |
| ⊞ Superstack3 3250 48pt-swch W/ 2 GIG Connect | MTC-170 | 74.00 | 592.00 |

( Modify Report )   ( Download Report to Excel )

Quick View
Jim Patrick — Logout
3com Corporation

You Have Outstanding Invoice(s)
You may not enter a new promotion until payment has been received.
View Invoices Promotions
- Incomplete    0
- Pending       2
- Active        3

Support
Technical Support
demo@mtcperformance.com
800.800.0000  (8:30a - 5:00p CST)

MtC SpiffCENTRAL™
Vendor Manager

MTC Demo Navigator | Exit Demo

My Promotions ▼ | Report Suite ▼ | Manage Content | Manage Accounts ▼ | Manage Invoices ▼ | Home | Promotion Search

Browse Invoices — 314

Filter Results — 310

Status: [All]  Invoice #: [ ]
Promotion Type: [All]  Promotion #: [ ]
Invoice Date: [ ]

[Search]  [Show All]

Status Key — 338
- ● Pending Payment - Current
- ● Pending Payment - 31 to 45 Days
- ● Pending Payment - 46 to 60 Days
- ● Pending Payment - 61+ Days
- ● Paid
- ● Cancelled

| Status | Invoice # | Promotion # | Invoice Date | Grace | Age | Type | Total | Action |
|---|---|---|---|---|---|---|---|---|
| ● | 3669 | 1651 | 3/25/04 | | 104 | Points | 7800.00 | Printable Copy (PDF) |
| ● | 3670 | 1656 | 3/25/04 | | 104 | Points | 10320.00 | Printable Copy (PDF) |
| ● | 3671 | 1657 | 3/25/04 | | 104 | Debit Card | 597.60 | Printable Copy (PDF) |
| ● | 3720 | 1651 | 6/25/04 | | 12 | Points | 3420.00 | Printable Copy (PDF) |
| ● | 3721 | 1656 | 6/25/04 | | 12 | Points | 13224.00 | Printable Copy (PDF) |
| ● | 3722 | 1657 | 6/25/04 | | 12 | Debit Card | 314.40 | Printable Copy (PDF) |
| ● | 3686 | 1651 | 4/25/04 | | | Points | 5880.00 | Printable Copy (PDF) |
| ● | 3687 | 1656 | 4/25/04 | | | Points | 19872.00 | Printable Copy (PDF) |
| ● | 3688 | 1657 | 4/25/04 | | | Debit Card | 403.20 | Printable Copy (PDF) |
| ● | 3703 | 1651 | 5/25/04 | | | Points | 6520.00 | Printable Copy (PDF) |
| ● | 3704 | 1656 | 5/25/04 | | | Points | 9264.00 | Printable Copy (PDF) |
| ● | 3705 | 1657 | 5/25/04 | | | Debit Card | 396.00 | Printable Copy (PDF) |

Quick View

Jim Patrick  Logout
3com Corporation

You Have Outstanding Invoice(s)
You may not enter a new promotion until payment has been received.
View Invoices

Promotions
- Incomplete  0
- Pending  2
- Active  3

Support

Technical Support
demo@mtcperformance.com
800.800.0000 (8:30a - 5:00p CST)

MTC SpiffCENTRAL™
Vendor Manager

Program ▾ | Report Suite ▾ | Users ▾

Home | Promotion Search

Promotion # 1690

Debit Card Promotion — 390

● This promotion Is Active

392 — Partner: Hewlett Packard
394 — Entered: 07/06/04
396 — By: John Rawlings
demo@mtcperformance.com
(555) 555-5555

Promotion Information

390 — Title — Server Spiffs
400 — Invoice Reference Number
402 — Description
404 — Start Date — 01/01/2004
406 — End Date — 07/31/2004

Spiffed Products — 408

| SKU # | Partner Part | Partner | Description | Value (Dollars) |
|---|---|---|---|---|
| MTC-18667 | ref 243750 | Hewlett Packard | ref 243750 233269 / Dl663av-220 4458279 / Dq783a | 200.00 |
| MTC-18238 | req 186098 | Hewlett Packard | req 186098 04881103 / 310587-001 252017 / 3gbddr | 200.00 |
| MTC-18682 | req 277143 | Hewlett Packard | req 277143 233112 / Db671av-325 238806 / Dq7 | 200.00 |

410  412  414  416  418

Quick View
Demo Admin    Logout
Pending Promotions  🔍 View All
1654  3com Corpora...  Wed 7/7
1653  3com Corpora...  Wed 7/7
more

MTC Support
support@mtcperformance.com
800.800.0000 (8:30a - 5:00p CST)

MTC Demo Navigator

MtC SpotCentral™
Vendor Manager

Program ▾ | Report Suite ▾ | Users ▾      Home | Promotion Search

Invoice #3669

Invoice Date: 03/25/2004 — 490
Total: $7800.00
Confirm: 1651
Contest: Points

● 104 DAYS PAST DUE — 498

Status [ No Change  ▾ ]
Grace [ 0 ] days
[ Save ]

Partner: 3com Corporation
Billing Contact: Cathy Rogers
demo@mtcperformance.com
phone: (555) 243-2667 — 492

[ Back to Invoices ]   [ Download PDF ]

Invoice Details — 494

| Description | Qty | Unit | Extended | Surcharge | Total |
|---|---|---|---|---|---|
| Promo: Q4 2003 (FEB) | 1 | | 6500.00 | 1300.00 | 7800.00 |
| | | Sub Totals | 6500.00 | 1300.00 | 7800.00 |

Notes — 496

No Notes Saved

Add Note

[ Add Note ]

Communication History

| Date Sent | Message Type | Invoice Age | Emailed To |
|---|---|---|---|

---

Quick View

Demo Admin   Logout

Pending Promotions  Q View All
1654   3com Corpora...   Wed 7/7
1653   3com Corpora...   Wed 7/7
      more

MTC Support support@mtcperformance.com
800.800.0000 (8:30a - 5:00p CST)

MTC SP*CENTRAL™
Vendor Manager

Program ▾ | Report Suite ▾ | Users ▾     Home | Promotion Search

Participant Manager

Filter Results
- Status: All
- Name: [ ]
- [Search] [Show All]
- MTC ID: [ ]

Quick View
Demo Admin    Logout
Pending Promotions 🔍 View All
1654   3com Corpora...   Wed 7/7
1653   3com Corpora...   Wed 7/7
          more

MTC Support
support@mtcperformance.com
800.800.0000 (8:30a - 5:00p CST)

1 2 3 4 5   Go to Page [ ] (Go)   15 pages

| Last Name | First Name | MTC ID | Added | # Spiffs | Total Awarded | Status | Term Date | Action |
|---|---|---|---|---|---|---|---|---|
| Agrawal | Linda | 110972 | 7/2/04 | 3 | 433.00 | Active | | Reward History – Cash |
| Alexander | Cliff | 111170 | 7/2/04 | 0 | | Active | | Reward History – Cash |
| Allen | Brandon | 111146 | 7/2/04 | 4 | 1432.00 | Active | | Reward History – Cash |
| Anbudaiyan | David | 110985 | 7/2/04 | 1 | 26.00 | Active | | Reward History – Cash |
| Anderson | Christopher | 111160 | 7/2/04 | 11 | 1277.00 | Active | | Reward History – Cash |
| Anderson | Justin | 111136 | 7/2/04 | 5 | 1740.00 | Active | | Reward History – Cash |
| Angelo | Jeffrey | 111052 | 7/2/04 | 3 | 84.00 | Active | | Reward History – Cash |
| Annexy | Howard | 111109 | 7/2/04 | 0 | | Active | | Reward History – Cash |
| Arons | Brooke | 111207 | 7/2/04 | 1 | 80.00 | Active | | Reward History – Cash |
| Atkinson | Meghan | 111010 | 7/2/04 | 4 | 214.00 | Active | | Reward History – Cash |
| Atrea | Geoff | 111065 | 7/2/04 | 4 | 700.00 | Active | | Reward History – Cash |
| Aviles | Teresa | 111190 | 7/2/04 | 8 | 476.00 | Active | | Reward History – Cash |
| Babcock | Andy | 111183 | 7/2/04 | 4 | 1675.00 | Active | | Reward History – Cash |
| Bajaj | Cynthia | 111150 | 7/2/04 | | | Active | | Reward History – Cash |

MTC Demo Navigator

MTC
SpiffCENTRAL™
Vendor Manager

Program | Report Suite | Users | Home | Promotion Search

Choose a Report

Product Owner Invoices
Displays product owner invoice summaries.

Promotion Registrants
Displays list of promotion registrants with demographic data.

Spiffed Sales Out
Displays spiffed sale details.

Vendor Accounts
Displays list of active vendor accounts.

Quick View
Demo Admin    Logout
Pending Promotions   View All
1654   3com Corpora...   Wed 7/7
1653   3com Corpora...   Wed 7/7
             more

MTC Support
support@mtcperformance.com
800.800.0000 (8:30a - 5:00p CST)

MTC Demo Navigator

MTC SpiffCENTRAL™
Vendor Manager

Program ▾ | Report Suite ▾ | Users ▾     Home | Promotion Search

Customize Report

Spiffed Sales Out     Spiffed Sales Out [ ⇅ ] (Go)

Displays spiffed sale details.

○ Specify Participant
◉ Any Participant

Agrawal, Linda
    Alexander, Cliff
    Allen, Brandon
    Anbudaiyan, David
    Anderson, Christopher
    Anderson, Justin ○ Specify Promotion #
◉ Any Promotion #

○ Specify Invoice Number
◉ Any Invoice Number

◉ Specify Invoice Date
◉ Any Invoice Date

From [ 06/07/2004 ] MM/DD/YYYY
To    [ 07/07/2004 ] MM/DD/YYYY (View Report)
(Download Report to Excel)

Quick View
Demo Admin     Logout

Pending Promotions 🔍 View All 1654   3com Corpora...   Wed 7/7
1653   3com Corpora...   Wed 7/7
                   more

MTC Support
support@mtcperformance.com
800.800.0000 (8:30a - 5:00p CST)

FIG. 46

MTC Demo Navigator

MTC SpiffCENTRAL™
Vendor Manager

Spiffed Sales Out
Displays spiffed sale details.

| Last Name | First Name | Net Spiff |
|---|---|---|
| Agrawal | Linda | 433.00 |
| Allen | Brandon | 1,432.00 |
| Anbudaiyan | David | 25.00 |
| Anderson | Christopher | 1,277.00 |
| Anderson | Justin | 1,740.00 |
| Angelo | Jeffrey | 84.00 |
| Arons | Brooke | 80.00 |
| Atkinson | Meghan | 214.00 |
| Attea | Geoff | 700.00 |
| Aviles | Teresa | 475.00 |
| Babcock | Andy | 1,675.00 |
| Bajaj | Cynthia | 180.00 |
| Bartlett | Stephen | 100.00 |
| Beach | Michael | 100.00 |
| Benison | Jessica | 545.00 |
| Berg | Matthew | 1,510.00 |
| Bernthal | Jon | 90.00 |
| Bouphavan | Charles | 3,035.00 |
| Boyle | Wayne | 145.00 |
| Byron | Thomas | 200.00 |
| Campbell | Shibani | 700.00 |
| Carney | Bradley | 145.00 |
| Castillo | Craig | 164.00 |
| Childs | Vanessa | 1,940.00 |
| Cho | Joseph | 100.00 |

Quick View

Demo Admin — Logout

Pending Promotions  View All
1654  3com Corpora...  Wed 7/7
1653  3com Corpora...  Wed 7/7
more

MTC Support support@mtcperformance.com
800.800.0000  (8:30a - 5:00p CST)

MTC Demo Navigator

MC SpiffCENTRAL™
Vendor Manager

Register

Personal Information

First Name
Middle Initial
Last Name
Work Email
Date of Birth [Month] [Day] [Year]
Social Security Number
No dashes or spaces

*We require your Date of Birth and Social Security Number in order to issue your Tech Depot REWARDS MasterCard® Debit Card.

Home Address & Phone

Address 1
Address 2
City
State
Zip Code
Phone

Site Login

User ID
Password

Your User ID and Password will be required to access the Vendor Manager Demo site.
Please Save.

MtC SpiffCENTRAL™
Vendor Manager

My REWARDS | Promotions | Resources | Manage Account | Program Info

Home | Promotion Search

Funding Summary

Filter Results
Funding Date: [Search] [Show All]

Click on a Funding Date to view Reward details

| Funding Date | # Unique Invoices | Total Qty | Total SPIFF |
|---|---|---|---|
| 6/25/04 | 29 | 177.00 | 12181.00 |
| 5/25/04 | 11 | 68.00 | 7245.00 |
| 4/25/04 | 26 | 152.00 | 6730.00 |
| 3/25/04 | 29 | 172.00 | 6345.00 |
| Totals for Search | 95 | 569.00 | 32501.00 |

Quick View
Demo Participant — Logout

Support
New Feedback
For problems, questions or comments, click here.
Check Status of Existing Case
Case [67894-5700] [Go]
Call (800) 221-6172 to Report a Lost or Stolen Card

MC SpiffCENTRAL™
Vendor Manager

My REWARDS ▾ | Promotions ▾ | Resources ▾ | Manage Account ▾ | Program Info ▾

My Debit Card

Card Summary
Balance: 1,463.47
Jun 25 Funding: 12,181.00

Edge's Vegas Vacation 04

*Don't you deserve a getaway?*

Get Cash Fast with your Vendor Manager Demo Debit MasterCard®
Find an ATM
Change ATM PIN

Totals for Displayed Transactions
- Total Funding: 0.00
- Total Purchases: -356.66
- Total Returns: 0.00
- Total ATM Withdrawals: -61.75
- Total Fees: -2.00
- Total Adjustments: 0.00

Quick View
Demo Participant — Logout

Support
New Feedback
For problems, questions or comments, click here.

Check Status of Existing Case
Case: 67894-5700 ▾ [Go]
Call (800) 221-6172 to Report a Lost or Stolen Card

Transactions

Filter Transactions
Date: Jul ▾ 2004 ▾
Transaction Type: All ▾
[Show Transactions]

[Printable Version] [Download to Excel]

Click on a Funding Transaction to view all cash rewards funded that day.

| Post Date | Description | Category | Amount |
|---|---|---|---|
| Jul 05 | Walgreen 00044644 / Lake Zurich US USA | Merchandise / Retail | -13.61 |
| Jul 05 | Jewel-Osco 3465631 / Lake Zurich US USA | Grocery / Supermarket | -33.71 |
| Jul 05 | Trader Joes #00006sm2 / Lake Zurich US USA | Grocery / Supermarket | -42.58 |
| Jul 03 | Tinaxx #0054 Lake Zurich US USA | Grocery / Supermarket | -30.87 |
| Jul 02 | Dominicks Stor00021sr1 / Lake Zurich US USA | Grocery / Supermarket | -44.41 |
| Jul 02 | Always Healthy 1236 Rand RD Lake Zurich US USA | Grocery / Supermarket | -127.59 |
| Jun 30 | ATM Cash (maestro) 6/29/2004 9:50:54 PM | Banks / Financial | -61.75 |
| Jun 30 | ATM Transaction Fee | Banks / Financial | -2.00 |
| Jun 29 | Trader Joes #00006sm2 / Lake Zurich US USA | Grocery / Supermarket | -37.12 |
| Jun 29 | Country Sampler #001 Lake Zurich US USA | Merchandise / Retail | -26.77 |

Analytic Graph Item Finder

Results

| Product Code | Product |
|---|---|
| MTC-42558 | Sonicwall 25 to 50 Node User Upgrade |
| MTC-42697 | Sonicwall PRO 2040 |
| MTC-42719 | Sonicwall Support 24x7 FOR SSL |
| MTC-42597 | Sonicwall 8X5 Sup-for Pro2040 |
| MTC-42550 | Sonicwall Soho3/50 Internet Security Appliance + V |
| MTC-42599 | Sonicwall Sgms Standard Editio |
| MTC-42638 | Sonicwall VPN Upgrade for Sonicwall 100/xprs/xprs2 |
| MTC-42603 | Sonicwall Sgms Support 24x7 |
| MTC-42677 | Sonicwall Global Security |
| MTC-42620 | Sonicwall Authentication SVC |
| MTC-42691 | Sonicwall NFR Training-bdl |
| MTC-42549 | Sonicwall PRO 300 Internet Security Appliance Unli |
| MTC-42571 | Sonicwall PRO 3060 Gov/ed-edition |
| MTC-42702 | Sonicwall Support 8X5 FOR |
| MTC-42716 | Sonicwall Support 24x7 FOR SSL |
| MTC-42557 | Sonicwall 10 to 25 Node User Upgrade |
| MTC-42553 | Sonicwall PRO 300 + 12 mos. Support Service Bundle |
| MTC-42610 | Sonicwall Content FIL Svc-for Pro3060 Gov/ed |

Choose your criteria

Product Owner

Product Name

Reseller Code (e.g. EDC)

Manufacturer Code (e.g. Part #)

(Submit)

(Close Help)

| Product | Period | Units Sold |
|---|---|---|
| 17" Syncmaster 173l - Black | 2004 12 | 916 |
| 17" Syncmaster 173l - Black | 2004 13 | 1,234 |
| 17" Syncmaster 173l - Black | 2004 14 | 1,137 |
| 17" Syncmaster 173l - Black | 2004 15 | 1,078 |
| 17" Syncmaster 173l - Black | 2004 16 | 1,046 |
| 17" Syncmaster 173l - Black | 2004 17 | 1,043 |
| 17" Syncmaster 173l - Black | 2004 18 | 1,044 |
| 17" Syncmaster 173l - Black | 2004 19 | 1,043 |
| 17" Syncmaster 173l - Black | 2004 20 | 1,013 |
| 17" Syncmaster 173l - Black | 2004 21 | 961 |
| 17" Syncmaster 173l - Black | 2004 22 | 895 |
| 17" Syncmaster 173l - Black | 2004 23 | 805 |
| 17" Syncmaster 173l - Black | 2004 24 | 725 |
| 17" Syncmaster 173l - Black | 2004 25 | 674 |
| 17" Syncmaster 173l - Black | 2004 26 | 641 |
| 17" Syncmaster 173l - Black | 2004 27 | 628 |
| 17" Syncmaster 173l - Black | 2004 28 | 629 |
| 17" Syncmaster 173l - Black | 2004 29 | 627 |
| Monitors | 2004 12 | 1,377 |
| Monitors | 2004 13 | 1,899 |
| Monitors | 2004 14 | 1,831 |
| Monitors | 2004 15 | 1,819 |
| Monitors | 2004 16 | 1,819 |
| Monitors | 2004 17 | 1,837 |
| Monitors | 2004 18 | 1,891 |
| Monitors | 2004 19 | 1,956 |
| Monitors | 2004 20 | 2,020 |
| Monitors | 2004 21 | 2,071 |
| Monitors | 2004 22 | 2,149 |
| Monitors | 2004 23 | 2,250 |
| Monitors | 2004 24 | 2,339 |
| Monitors | 2004 25 | 2,464 |

INFORMATION, YOU MAY NEED TO CHANGE THE SCALE OF YOUR GRAPHS.

FIG. 72

Basic Spiff
- Quickest method for entering a promotion.
- Specify products, each with their own spiff value.
- Spiff value will be awarded every time a specified product is sold.

Multiple Spiff
- Create groups of products.
- Combined group sales used to determine the spiff value awarded
- Spiff value will be awarded every time the minimum sale requirement for the group is sold.

Multiple Tiered Spiff
- Create one group of products.
- Define incremental sale tiers, each with its own spiff value.
- Combined group sales used to determine the spiff value awarded.
- Spiff value will be awarded only once per rep, based off the highest tier met.

Bundle / Attachment Spiff
- Create product bundles (attachments), each with their own spiff value.
- Spiff value will be awarded every time an invoice meets a bundle's requirements.

Step 2: Add the selected SKUs to a group by clicking on its box.

| | SKU# | MFG# | Description |
|---|---|---|---|
| ☐ | C512020032 | 12020032 | Adobe Acrobat Professional... |
| ☐ | C512001595 | 12001595 | Adobe Acrobat Standard V6.0 |

Remove

Sell [2] ⦿ Unit(s) ☐ Dollar(s) of any

| | SKU# | MFG# | Description |
|---|---|---|---|
| ☐ | C528030165 | 28030165 | Creative Suite? |

Remove

With [1] ⦿ Unit(s) ☐ Dollar(s) of any

Step 3: Set value for this spiff bundle.

Earn [250] dollars save&finish    save&addnew

Split Manager

Summary

| | |
|---|---|
| Sales Rep | Demo Participant |
| Fund To | Rep |
| Status | Queued for Funding |
| Reference Number | 1324670 |
| Awarded On | 09/08/2004 |
| Sponsor | logear |
| Promotion | 2085 |
| Promotion Title | Fourth Demo Promotion |
| Spiff Setup | Multiple Tiered Spiff |

Current Split Breakdown

| | | | |
|---|---|---|---|
| Demo Participant | 50.00% | $60.00 | 1.00 Unit |
| House Account | 50.00% | $60.00 | 1.00 Unit |
| Total Spiff | 100.00% | $120.00 | 2.00 Units |

[Modify Split]

Add Additional User to Split List

Name [        ] [Search]

FIG 79

SYSTEM AND METHOD FOR MANAGING, MONITORING AND REPORTING ON A PLURALITY OF ONLINE INCENTIVE PROGRAMS

FIELD OF THE INVENTION

This invention relates in general to incentive (or "spiff") programs, and more particularly to a system and method to be used by administrators, program managers and participants for establishing, monitoring and/or reporting on the status of a plurality of incentive programs online.

BACKGROUND OF THE INVENTION

Most retailers and distributors today offer a variety of different products (and/or services) from a number of different vendors, manufacturers or other entities (hereinafter "vendors"). In order to provide incentive programs to encourage salespeople or other employees or agents (hereinafter "salespeople") to increase their effort to sell certain products or services, the vendors often provide or offer incentive (or "spiff") programs, which provide prizes or monetary rewards based upon, among other things, sales of selected products, sales of groups of products, a salesperson's performance, quotas, or ad hoc programs. Incentive programs operate under several principles. One of the principles behind incentive programs is that by allowing other employees at the same level to see how fellow employees and/or competitors are doing, the employee is encouraged to match or beat the achievements of his or her fellow employees or competitors. Another principle behind incentive programs is that by rewarding a positive act, there is a likelihood that the act would be repeated to the benefit of the salesperson, distributor and vendor.

Traditional incentive programs often involved manually inputting information related to the incentive programs and then retaining hard copies of the compiled information. As there are often a number of different incentive programs relating to different products and vendors running at a time, it is thus difficult for vendors and distributors to coordinate or monitor the various spiff programs. As a result, employees may be unaware of the all of the various programs, thereby rendering many programs ineffective. The large number of incentive programs also created problems in that it often took time to process the claims made under the various programs. Longer delays or problems incurred in the incentive programs often result in angering or otherwise discouraging the employees from meeting or exceeding certain performance levels.

Due to the number of different incentive programs and the difficulties in monitoring the programs, it has also been difficult for vendors to determine the effectiveness of the various incentive programs. Accordingly, vendors may continue to operate or run spiff programs that result in fewer sales and a lower net profit.

Therefore, there is a need for a system and method that streamlines all of the sales incentive or spiff programs from inception to award recognition. There is also a need for an incentive program system that allows interaction with individuals at all levels of the spiff programs. There is also a need for a system and method that centralizes the implementation, monitoring and reporting on all spiff programs that pertain to the user, while being economical and easy to manufacture and/or use.

SUMMARY OF THE INVENTION

The present invention is an improvement over the prior incentive programs in the way that the system centralizes the creation, approval, monitoring and maintenance of incentive reward or spiff programs. In particular, the system of the present invention preferably includes a host system that is operatively connected to computers for administrators (such as distributors, retailers or vendors), program managers (such as vendors, its subsidiaries or the like that manage programs through the administrator, and participants (such as salespeople, engineers, managers or other individuals in the various incentive or spiff programs), who must register to use the system.

Program managers may utilize the system to create and offer one or more spiff programs as incentives to sell its products. Using a substantially automated process, the program manager may select the characteristics of the spiff programs including, for example, the types of programs (e.g., debit card, point or lottery), the administrators and/or participants that may participate in the program, the duration of the program and the amount of the reward or award that is being offered. Additionally, the system preferably includes a list of products and SKUs, which may be inputted or imported into the system, to allow the program manager to select which products will be eligible for rewards. As the system preferably includes all of the program managers's spiff programs, the system will be able to notify the program manager if the proposed spiff program overlaps with any other active or pending programs.

Administrators or other designated individuals or entities may then either approve of the programs or communicate with the program managers through the system in an attempt to reach mutually acceptable terms for the spiff program. Once the spiff programs are approved, eligible participants who have registered with the system may be automatically included in the programs. In one embodiment, where a distributor, retailer or similar entity (herewithin "distributor") is the administrator, the system is operatively connected with the distributor's computers to automatically determine eligible sales by SKU numbers to apply to the spiff programs. Pre-computed spiffs may be imported into the system or raw sales data may also be inputted or imported to the system, whereby the sales data is compared against the product and/or SKU numbers associated with the various spiff programs in the system to automatically determine spiff rewards. Accordingly, the processing of claims for spiff programs is substantially streamlined.

In addition to allowing the program managers to create spiff programs, the system also allows them to monitor the promotions and generate and/or view reports based on a variety of different aspects of the spiff programs such as by administrators, distributors, products or by participants. Program managers may also communicate directly with the participants to encourage sales or update them on changes to the particular spiff programs. The system also preferably keeps track of the sales of each of the products during the various spiff programs and compares the results with a base, which is calculated by monitoring and recording the sales of the products when no spiff programs are offered, to determine the spiff programs relative effectiveness compared to other programs and help maximize the return on investment. Sales for particular products may also be compared against the sales of to the products in the particular product group.

The distributor or program manager may act as an administrator of the various programs to control, monitor and manage the spiff programs that are offered to its salespeople or other employees. In addition to communicating with the program managers and reviewing, modifying and approving the various spiff programs; the administrator also can monitor the invoices created for the spiff programs to insure that payments are made under the programs. The administrator may also view various reports that show the relative success of the spiff programs for the program managers and the participants based on, among other things, particular program managers, products, programs or participants.

Once registered, participants are preferably automatically entered into spiff programs that are approved by the administrator or distributor and for which they are eligible. If desired, the participant may combine the rewards of all of the spiff programs. For example, if the participant is eligible for ten different debit card spiff programs, the system thereby allows the participant to combine all of the spiff rewards into one debit card. The system also allows the participant to access its account information to determine how much he or she has made for, among other things, each program manager, program or program type. The system also provides the participant with substantially real time status for the particular incentive programs and demonstrate how/why the participant earned particular spiffs.

It is therefore an object of the present invention to provide a new and improved system and method for incentive programs in an online environment that allows for the central control of spiff programs for different program managers.

Another object of the present invention is to provide a system and method that improves the overall efficiency of online incentive reward programs and the processing of claims for rewards under those programs.

A yet another object of the present invention is to provide a new and improved system and method for incentive programs in an online environment that increases the ability and ease for users to participate in and benefit from the incentive programs.

A still yet further object of the present invention to provide a new and improved system and method for incentive programs in an online environment that simplifies the creation and management of spiff programs.

Yet another object of the present invention to provide a new and improved system and method for incentive programs in an online environment that allows for a user to track participation and benefits from a plurality of incentive reward programs.

Another object of the present invention to provide a new and improved system and method for incentive programs in an online environment that eliminates the need for users to individually monitor spiff programs.

A still yet further object of the present invention to provide a new and improved system and method for incentive programs in an online environment that allows for substantial real time reporting and communication regarding the incentive programs.

Yet another object of the present invention is to provide a new and improved system and method for incentive programs in an online environment that demonstrates the impact of particular spiff programs on the overall compensation of the users.

Another object of the present invention is to provide a new and improved system and method for incentive programs in an online environment that facilitates communication from management or program managers to participants regarding incentive programs.

A still further object of the present invention is to provide a new and improved system and method for incentive programs in an online environment that monitors the effectiveness of particular incentive programs to maximize sales.

A still yet further object of the present invention is to provide a paperless process for receiving and reviewing claims for rewards in connection with online spiff programs.

Another object of the present invention is to provide a system and method that provides comprehensive and collective reports for a plurality of different vendor spiff programs.

Other objects, features and advantages of the invention will be apparent from the following detailed disclosure, taken in conjunction with the accompanying sheets of drawings, wherein like reference numerals refer to like parts.

BRIEF DESCRIPTION OF THE DRAWINGS

FIG. 4 is a schematic diagram depicting the general steps for submitting, reviewing and posting of spiff programs of the present invention.

FIG. 8 is an embodiment of a screen shot of a Web page of the present invention listing various types of spiff programs for program managers to select.

FIG. 9 is an embodiment of a screen shot of a Web page of the present invention that shows data entry fields for a program manager to create a new spiff promotion.

FIG. 11 is an embodiment of a screen shot of a Web page of the present invention that depicts a list of SKUs that may be selected by a program manager for inclusion in the spiff program.

FIG. 13 is an embodiment of a screen shot of a Web page of the present invention showing the available options for the program manager to create a spotlight.

FIG. 15 is an embodiment of a screen shot of a Web page of the present invention that depicts instructions for a program manager to create a banner ad.

FIG. 16 is an embodiment of a screen shot of a Web page of the present invention showing data entry and selection fields for allowing a program manager to search available promotions and a table listing available promotions.

FIG. 17 is an embodiment of a screen shot of a Web page of the present invention that shows the details to a program manager for a promotion selected from the table shown in FIG. 16.

FIG. 18 is an embodiment of a screen shot of a Web page of the present invention that illustrates the variety of different available program manager report options.

FIG. 19 is an alternate embodiment of a screen shot of a Web page of the present invention illustrating the variety of different available program manager report options.

FIG. 20 is an embodiment of a screen shot of a Web page of the present invention that depicts criteria for allowing a program manager to tailor reports for contest spiff winners.

FIG. 21 is an embodiment of a screen shot of a Web page of the present invention depicting criteria for allowing a program manager to tailor reports for sales by participants.

FIG. 22 is an embodiment of a screen shot of a Web page of the present invention that illustrates criteria for allowing a program manager to select reports by invoice numbers.

FIG. 23 is an embodiment of a screen shot of a Web page of the present invention that shows a listing of sales to a program manager for a particular invoice number.

FIG. 24 is an embodiment of a screen shot of a Web page of the present invention showing criteria for allowing a program manager to tailor reports for sales by product.

FIG. 25 is an embodiment of a screen shot of a Web page of the present invention that depicts a list of sales by products to a program manager.

FIG. 26 is an embodiment of screen shot of a Web page of the present invention illustrating criteria for allowing a program manager to tailor reports by participants.

FIG. 28 is an embodiment of a screen shot of a Web page of the present invention showing a plurality of data entry fields for modifying program manager information.

FIG. 29 is an embodiment of a screen shot of a Web page of the present invention that illustrates a plurality of checkable boxes for allowing the program manager to grant access to the system.

FIG. 30 is an embodiment of a screen shot of a Web page of the present invention depicting a plurality of data entry fields for the program manager to add a new user.

FIG. 31 is an embodiment of a screen shot of a Web page of the present invention showing a plurality of data entry fields for the program manager to update user information.

FIG. 32 is an embodiment of a screen shot of a Web page of the present invention illustrating a plurality of data entry and selection fields for allowing the program manager to search for invoices on the system and a table summarizing invoices found from a search.

Figure 33:
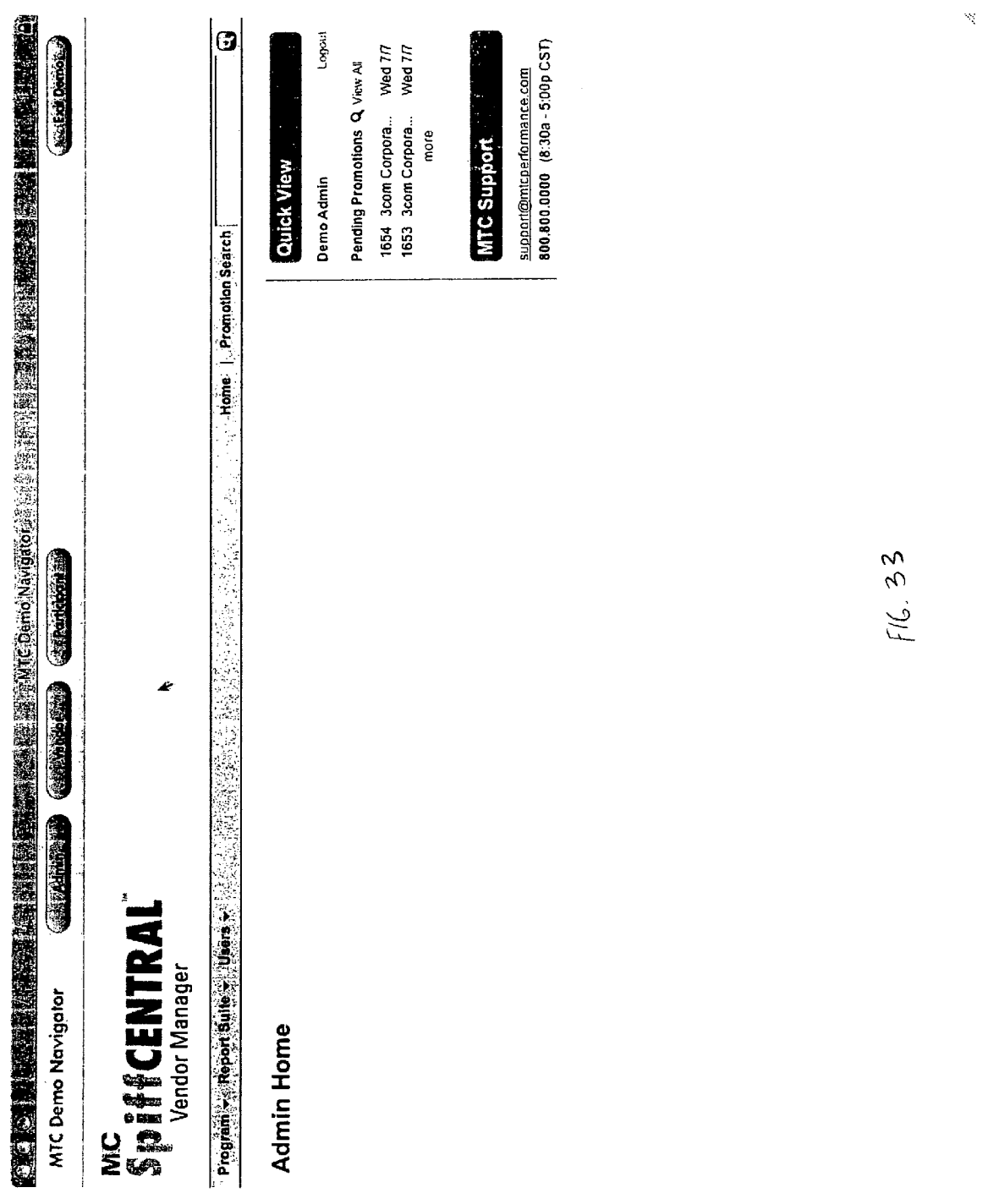

FIG. 33 is an embodiment of a screen shot of a Web page of the present invention that depicts an introductory page for an administrator.

FIG. 35 is an embodiment of a screen shot of a Web page of the present invention that illustrates a plurality of data entry and selection fields for allowing an administrator to search for promotions and a table summarizing promotions found from a search.

FIG. 36 is an embodiment of a screen shot of a Web page of the present invention that shows detailed information to an administrator regarding a promotion selected from the table shown in FIG. 35.

FIG. 37 is an embodiment of a screen shot of a Web page of the present invention showing data entry and selection fields for allowing an administrator to search for spotlights and a table showing spotlights found from a search.

Figure 38:
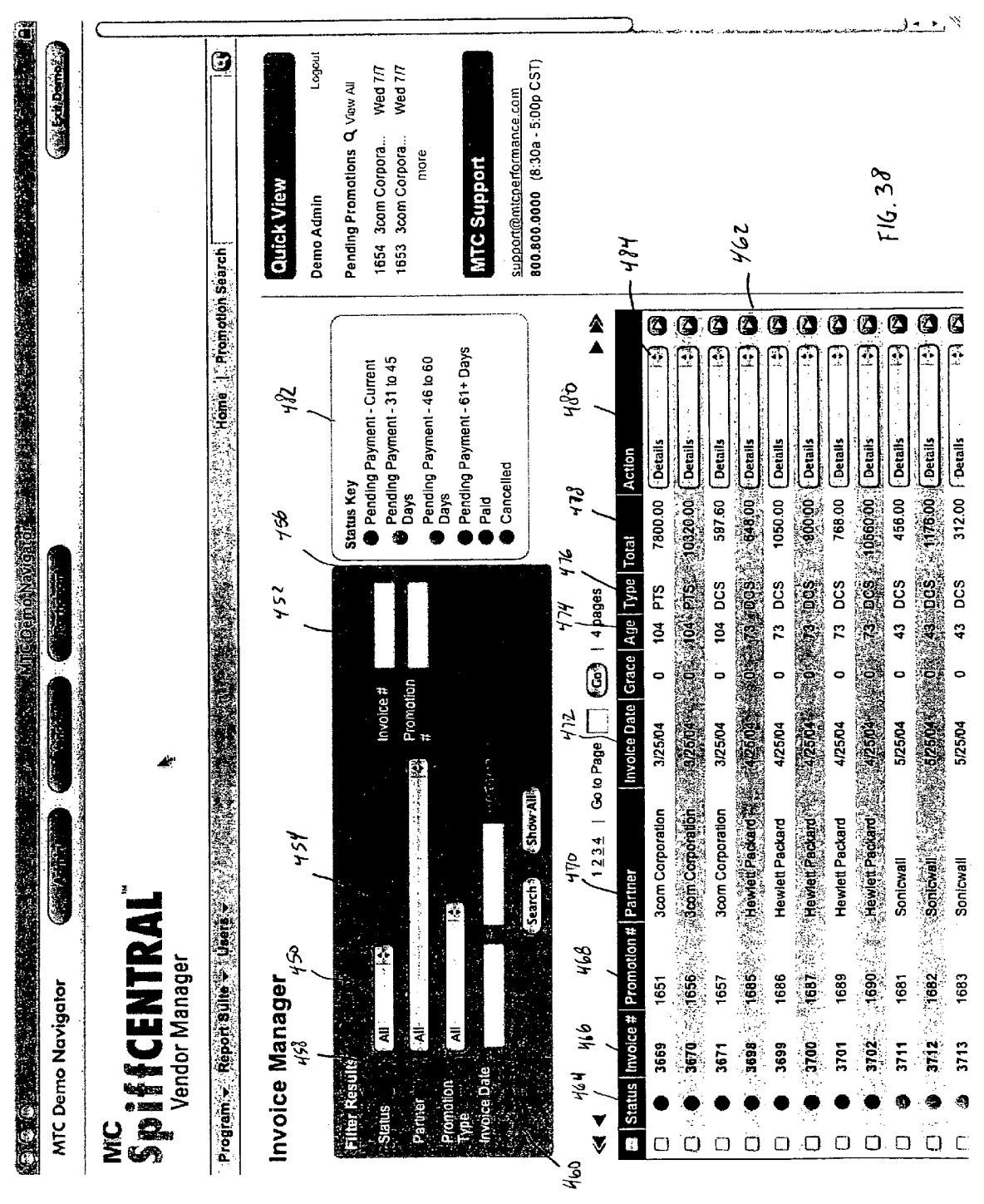

FIG. 38 is an embodiment of a screen shot of a Web page of the present invention illustrating data entry and selection fields for allowing an administrator to search for invoices and a table listing invoices found from a search.

FIG. 39 is an embodiment of a screen shot of a Web page of the present invention showing details of an invoice that was selected from the table shown in FIG. 38.

FIG. 40 is an embodiment of a screen shot of a Web page of the present invention illustrating data entry and selection fields for allowing an administrator to search for participants and a table showing results from a search.

FIG. 41 is an embodiment of a screen shot of a Web page of the present invention that illustrates steps to upload products into the system.

FIG. 43 is an alternate embodiment of a screen shot of a Web page of the present invention that illustrates a variety of different available administrator report options.

FIG. 44 is an embodiment of a screen shot of a Web page of the present invention that depicts criteria for allowing the administrator to tailor reports for product invoices.

FIG. 45 is an embodiment of a screen shot of a Web page of the present invention that shows criteria for allowing the administrator to tailor reports for spiff promotions or programs.

FIG. 46 is an embodiment of a screen shot of a Web page of the present invention depicting criteria for permitting the administrator to tailor reports for spiffed sales.

FIG. 47 is an embodiment of a screen shot of a Web page of the present invention that shows a report for the administrator of spiffed sales for the participants.

FIG. 48 is an embodiment of a screen shot of a Web page of the present invention depicting criteria for allowing the administrator to select reports by program manager.

FIG. 50 is an embodiment of a screen shot of a Web page of the present invention depicting a series of data entry fields for allowing the administrator to modify its user information.

Figure 51:
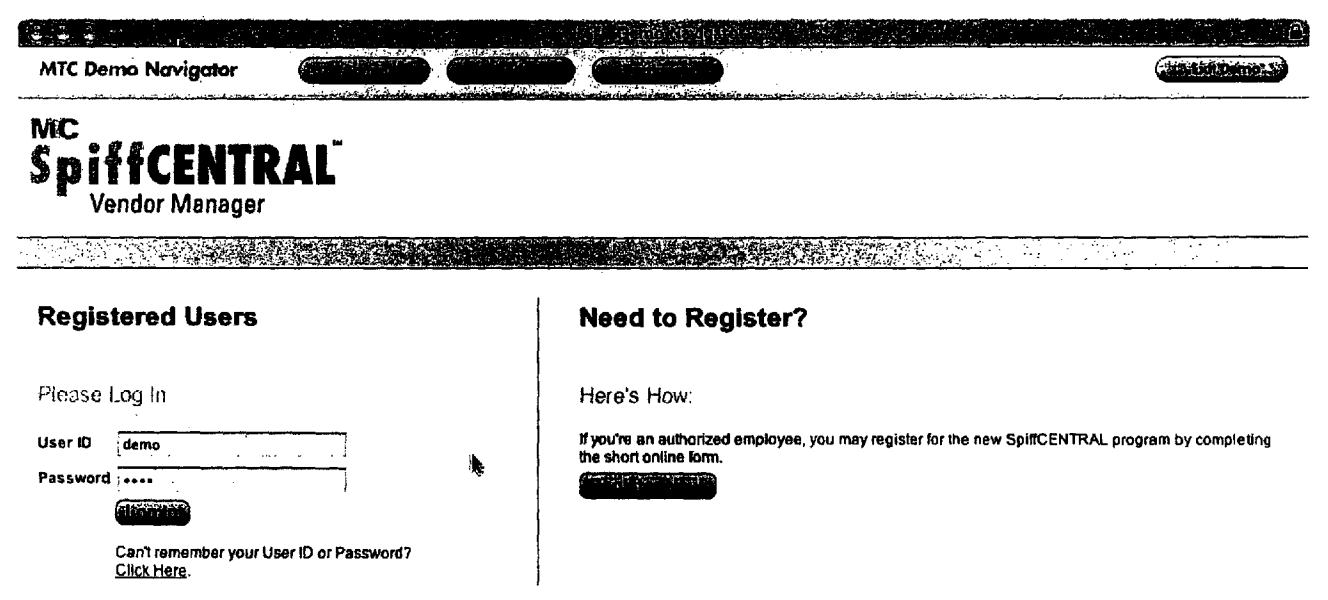

FIG. 51 is an embodiment of a screen shot of a Web page of the present invention showing data entry fields to allow a participant to log into the system.

FIG. 52 is an embodiment of a screen shot of a Web page of the present invention depicting a plurality of data entry fields for permitting a participant to register with the system.

FIG. 53 is an embodiment of a screen shot of a Web page of the present invention depicting a display of the account summary for a participant.

FIG. 54 is an embodiment of a screen shot of a Web page of the present invention that shows a funding summary for a participant.

FIG. 55 is an embodiment of a screen shot of a Web page of the present invention illustrating a debit card statement for a participant.

FIG. 56 is an embodiment of a screen shot of a Web page of the present invention showing a plurality of data entry and selection fields for allowing a participant to search for spiff monetary rewards and a table showing results of a search.

FIG. 57 is an embodiment of a screen shot of a Web page of the present invention showing a plurality of data entry and selection fields for permitting a participant to search for spiff prize rewards and a table showing results of a search.

Figure 58:
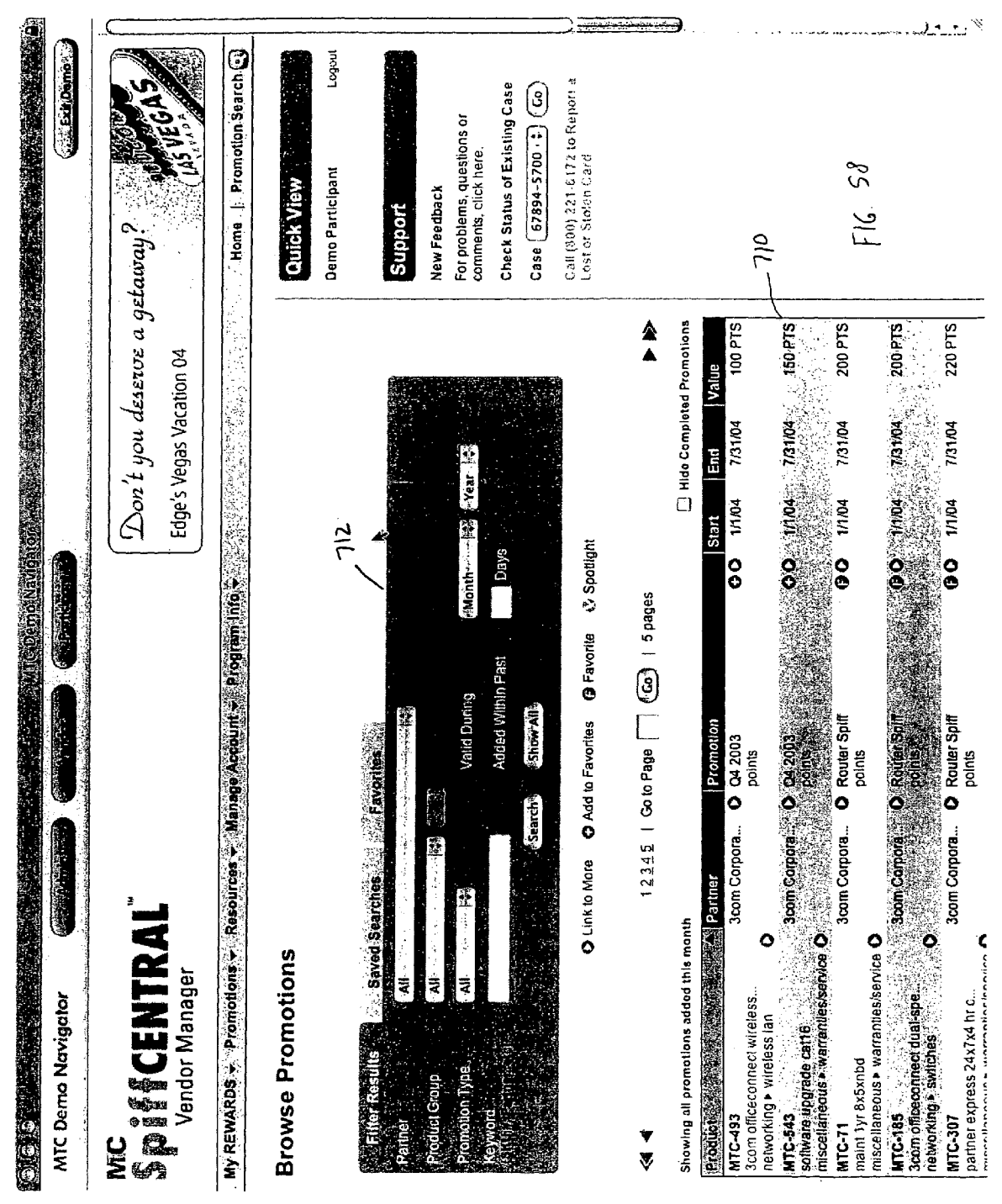

FIG. 58 is an embodiment of a screen shot of a Web page of the present invention depicting a plurality of data entry and selection fields for allowing a participant to search for promotions and a table showing results of a search.

FIGS. 59 through 61 are embodiments of screen shots of Web pages of the present invention illustrating a series of data entry fields to permit a participant to update its user information.

FIGS. 62 through 70 illustrate embodiments of screen shots of Web pages of the present invention illustrating aspects of the reporting and comparison features of the system of the present invention.

FIGS. 71 through 78 illustrate alternate embodiments of screen shots of Web pages that an administrator or vendor may access to create various spiff programs.

FIGS. 79 and 80 illustrate embodiments of screen shots of Web pages that an administrator may access to permit the administrator to allocate or modify the spiff award.

DETAILED DESCRIPTION OF THE INVENTION

Figure 1:
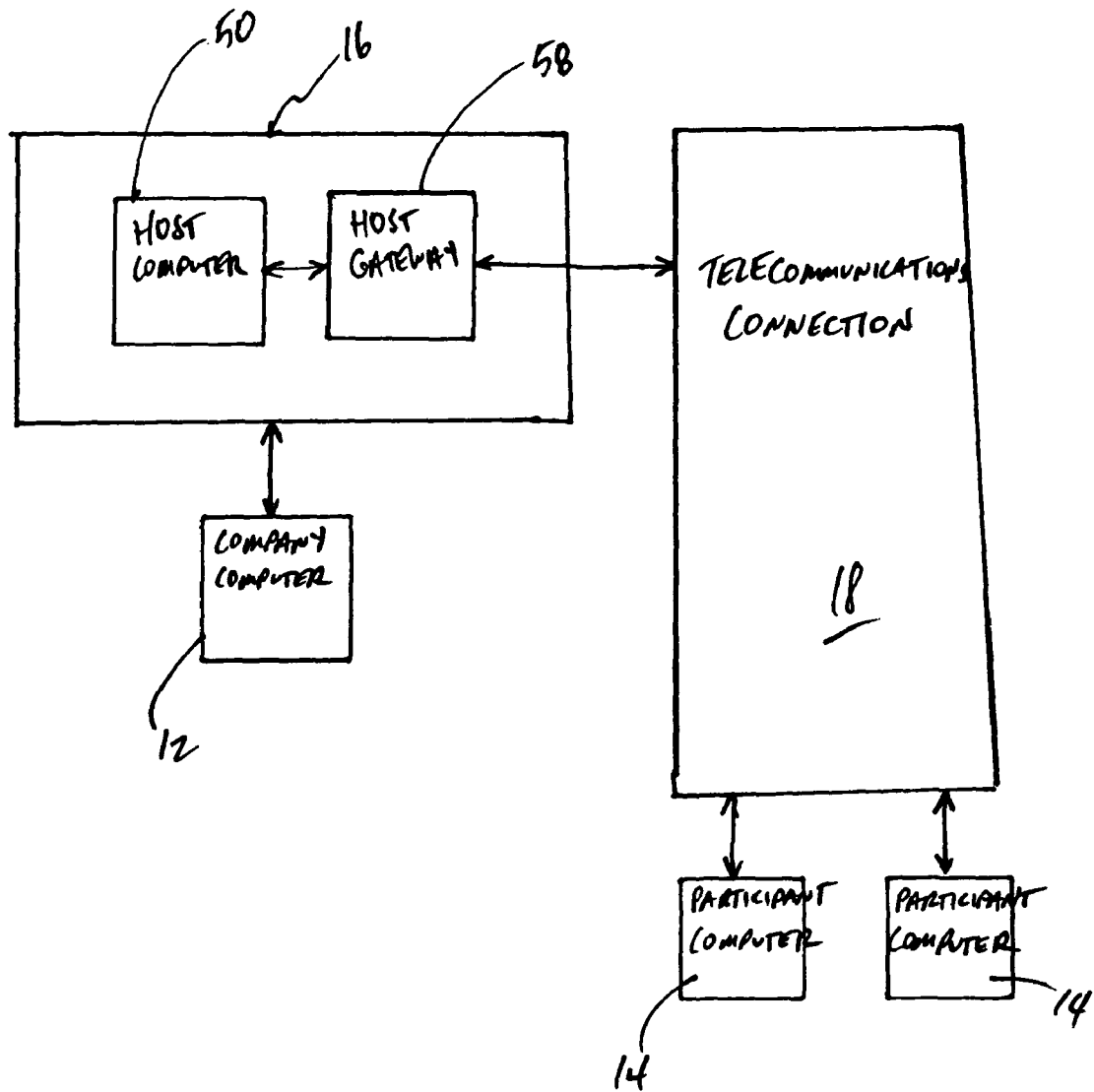
FIG. 1 is a schematic diagram of the primary components of the hardware components of the host system of the present invention.

While this invention is susceptible of embodiment in many different forms, there is shown in the drawings and will herein be described in detail several specific embodiments, with the understanding that the present disclosure is to be considered merely an exemplification of the principles of the invention and the application is limited only to the appended claims.

The system includes a host or incentive program institution that manages the system, one or more program managers that offer incentive programs, an owner or administrator, and a plurality of participants who participate in the incentive program. While the use of a host is preferred, it is appreciated that the administrator may also take the place of host and not depart from the scope of the present invention. Referring now to the drawings, and particularly to FIG. 1, there is shown a preferred embodiment of the present invention. The incentive program system, generally designated by the number 10, is shown as having a company computer 12 and a plurality of computers 14 connected to a host system 16 by a telecommunications connection 18 over the Internet. The computers 14 may be used by the administrator, program managers, distributors, participants, and the like. As indicated above, it is appreciated that the term participant includes any individual or user who is eligible to participate in any of the incentive programs including, but not limited to, employees of the administrator.

Figure 2:
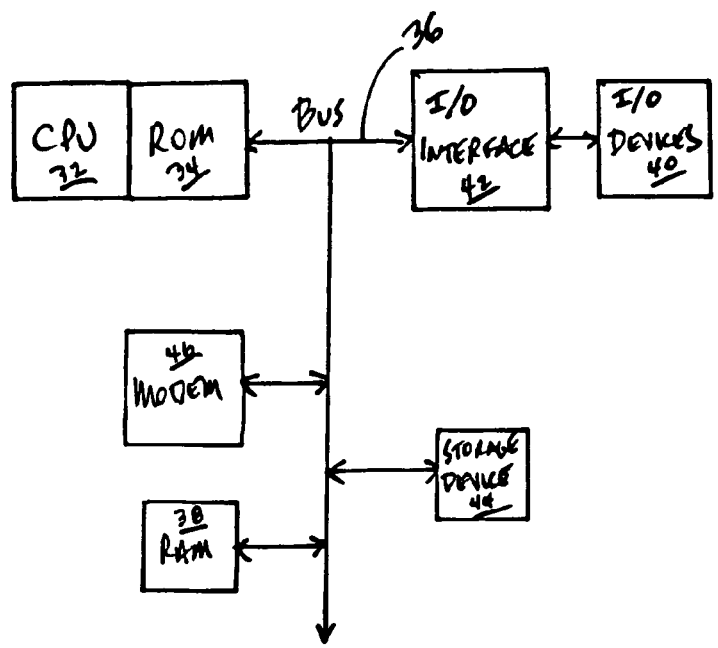
FIG. 2 is a schematic diagram of a computer for use with the present invention.
Figure 3:
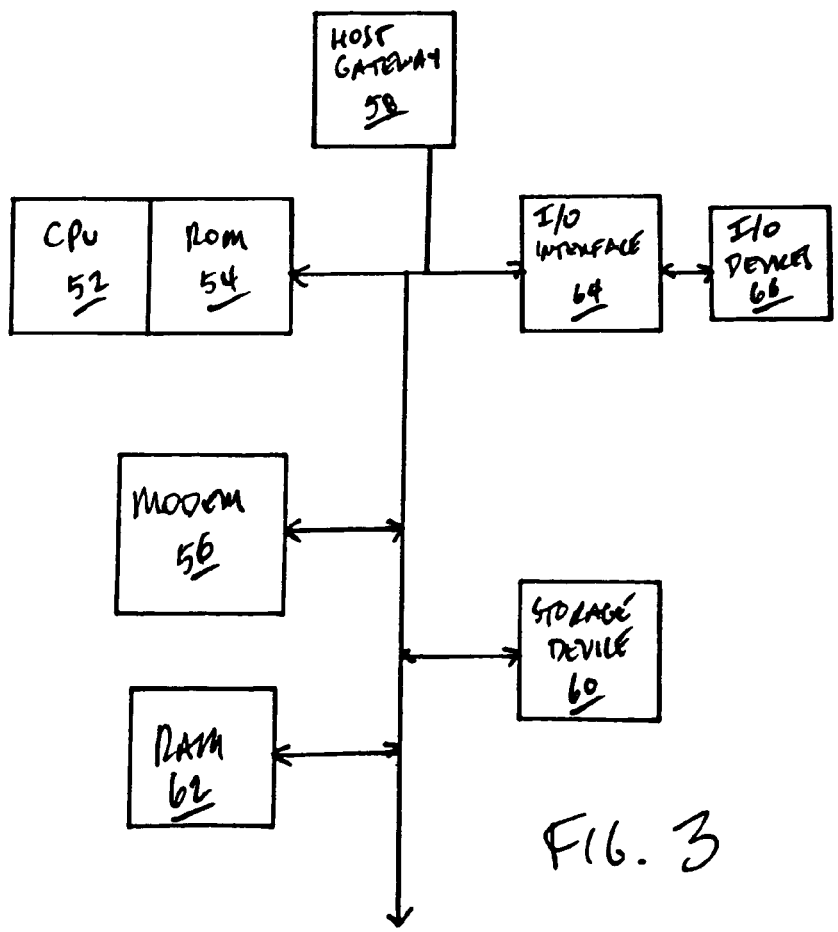
FIG. 3 is a schematic diagram of a host computer for use with the present invention.

It is appreciated that the various computers may comprise any computer having the known components necessary to participate in the present system. For example, referring to FIG. 2, each of the computers 12, 14 may include a central processing unit (CPU) 32 and associated read-only memory (ROM) 34, both of which are connected along data and address bus lines 36 to a random access memory (RAM) 38. An input/output (I/O) device 40, an I/O interface 42, a data storage device 44 and a odem 46 may be connected to the RAM 38, CPU 32 and the ROM 34 in a known way. The CPU 32 is operatively connected to the I/O interface 42 to control any corresponding I/O devices 40 such as, but not limited to, keyboards, mice or joysticks. The computers also include an operating system (not shown) that controls various applications such as, but not limited to, data management, storage and retrieval, Web browsing applications and communication applications that allow the computer to communicate with other computers over the Internet. The operating system may be any standard operating system such as, but not limited to, Windows 98.

The host system 16 may include a host computer 50 that includes a CPU 52, ROM 54, modem 56, a host gateway 58, a data storage device 60, RAM 62, I/O interface 64 and I/O device 66. The host system also may include an HTTP server, or Web server, and a separate application server capable of communication to the HTTP server. While the host computer preferably includes a host gateway, it is appreciated that it may be configured to provide a direct connection to the telecommunications connection.

FIG. 4 shows the general schematic overview of the process of submitting spiff programs by program managers (labeled in the figure as "vendors") 100 and the approval of spiff programs by an administrator (labeled in the figure as "distributor") 102. In the embodiment shown and disclosed herein, the program managers will be one or more vendors, the administrator will be a distributor, and the participants will be salespeople of the distributor. As indicated above, it is appreciated that administrators may be, among other things, distributors, retailers or manufacturers; the program managers may be vendors, its subsidiaries and the like that manage programs through the system; and the participants may by salespeople, engineers, managers and any other individuals in the incentive or spiff programs.

In particular, and as described in more detail below, the vendor 100 will log into the system in step 108 and submit one or more spiff programs in step 110. The distributor 102 may then separately log into the system in step 112 and review the proposed spiff programs in step 114. If the distributor 102 approves the particular spiff program or programs in step 116, the spiff program or programs will be activated for the distributor's salespeople in step 118. If the distributor 102 does not approve of the particular spiff program, the distributor 102 may communicate with the vendor 100 in step 120 in an attempt to revise the spiff program to achieve a mutually acceptable program.

The system of the present invention allows for administrators, program managers and participants to, among other things, communicate with one another regarding particular spiff programs. In the preferred embodiment, use of the system of the present invention allows an administrator to effectively manage a plurality of concurrent spiff programs for its salespeople.

Figure 5:
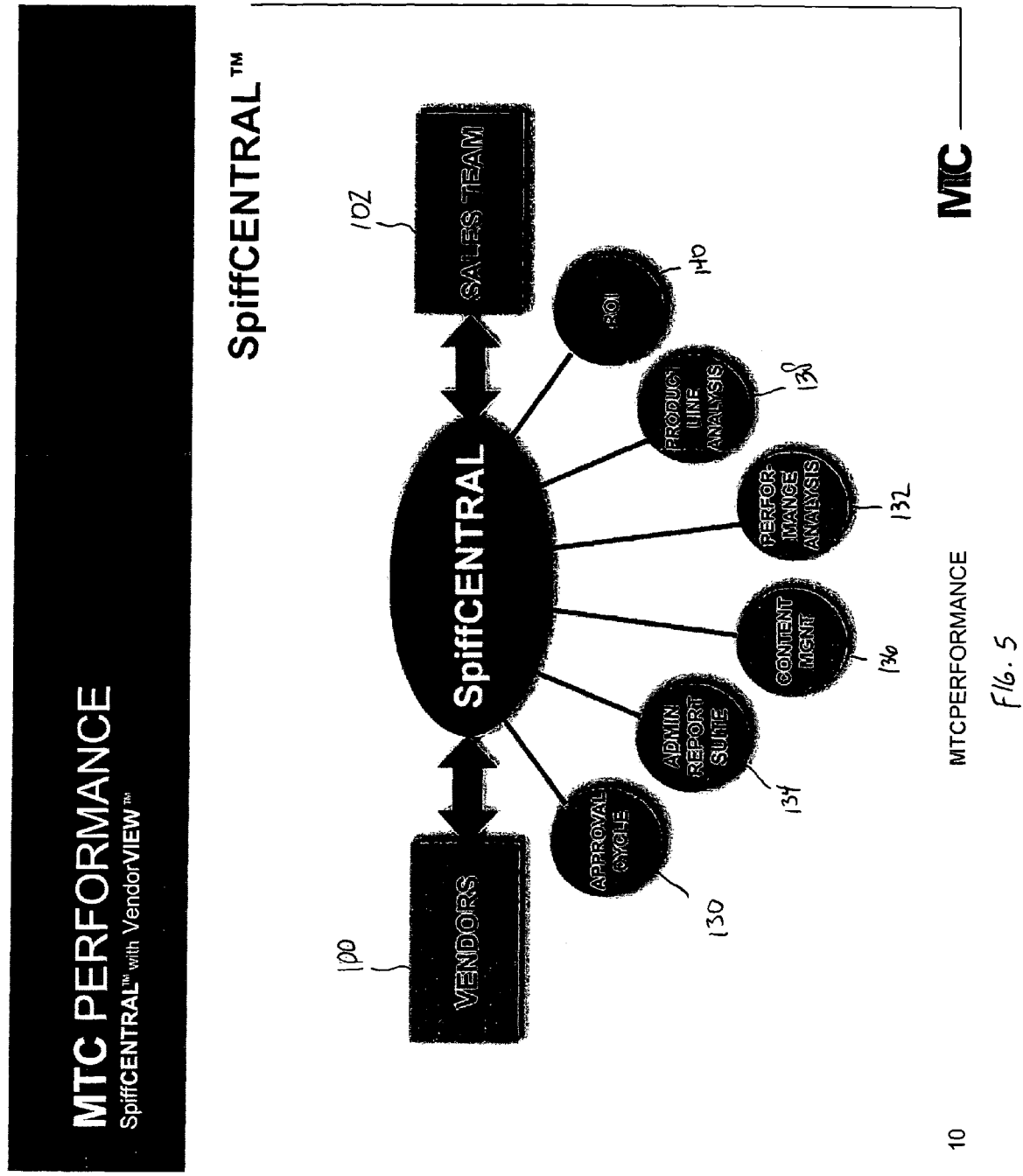
FIG. 5 is schematic diagram depicting features that may be performed using the system of the present invention.

As shown in FIG. 5 and as explained in more detail below, the distributor may be given the ability to, among other things, communicate with the vendors regarding the various proposed or current spiff programs 130; manage the salespeople's involvement in the spiff programs 132; obtain and view reports of the spiff programs 134; manage the content of the spiff programs 136; analyze the product lines involved in the spiff programs 138; and monitor the return on the investment in the spiff programs 140. Other functions include, but are not limited to, the ability to monitor and/or manage the billing aspects of the spiff programs. It is appreciated that all of the features described herein may be performed by a single individual or they may be performed by a plurality of individuals and not depart from the scope of the present invention. Furthermore, certain of these functions may also be performed by and/or for the vendors.

In order to utilize the system, it is preferred that each of the entities or individuals involved register with the host system, or have someone register for them, to control the access to the system and the spiff programs. The system preferable includes user restricting means for ensuring that only eligible users access the information contained on the system and to limit the information that the vendors 100, distributors 102 and salespeople have access to.

Referring now to FIGS. 6 through 32, a series of Web pages illustrate examples of Web pages that a vendor may access when using the system of one embodiment of the present invention. The Web pages shown and disclosed throughout this application are provided for illustrative purposes and are not intended to limit the present invention to those particular displays.

Figure 6:
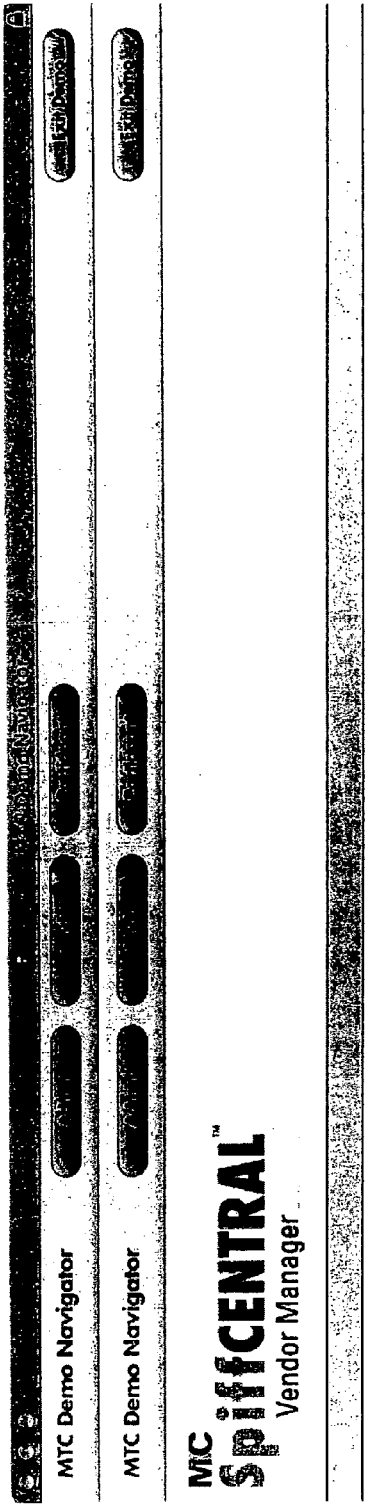
FIG. 6 is an embodiment of a screen shot of a Web page of the present invention illustrating data entry fields for a program manager to login to the system.

In order to access the system, the vendor 100 preferably must access a website and login to the system. For example, as shown in FIG. 6, the system is preferably adapted to require the vendor to enter a user name or ID and a password to log into the system. Once logged in, the user will only be allowed to access those reports, information and features that are associated with the vendor or otherwise authorized by the system.

If the user is not already registered, the user will be prompted to enter registration information. In a preferred embodiment, the vendor may input registration information through a series of data entry fields in a known way. Included among the data entry fields may be a series of fields for inputting, among other things, the vendor's name, a password, the vendor's address and/or contact information such as a contact name, telephone number and an E-mail address. To assure that the password is correctly entered, the vendor may be prompted to re-enter the password. If the password is not correctly repeated, an error message may be displayed indicating that the passwords did not match and needs to be reentered. Additionally, in case the vendor forgets the password, the vendor may be asked to select a particular security question such as the contact's birthday or pet's name and then provide an answer.

Once logged into the system, the vendor may access one or more Web pages that permit the vendor to manage and view its spiff programs. In particular, the system preferably provides a single location for the submission, monitoring and evaluation of the spiff programs, as well as communication with the distributors and participants.

Figure 7:
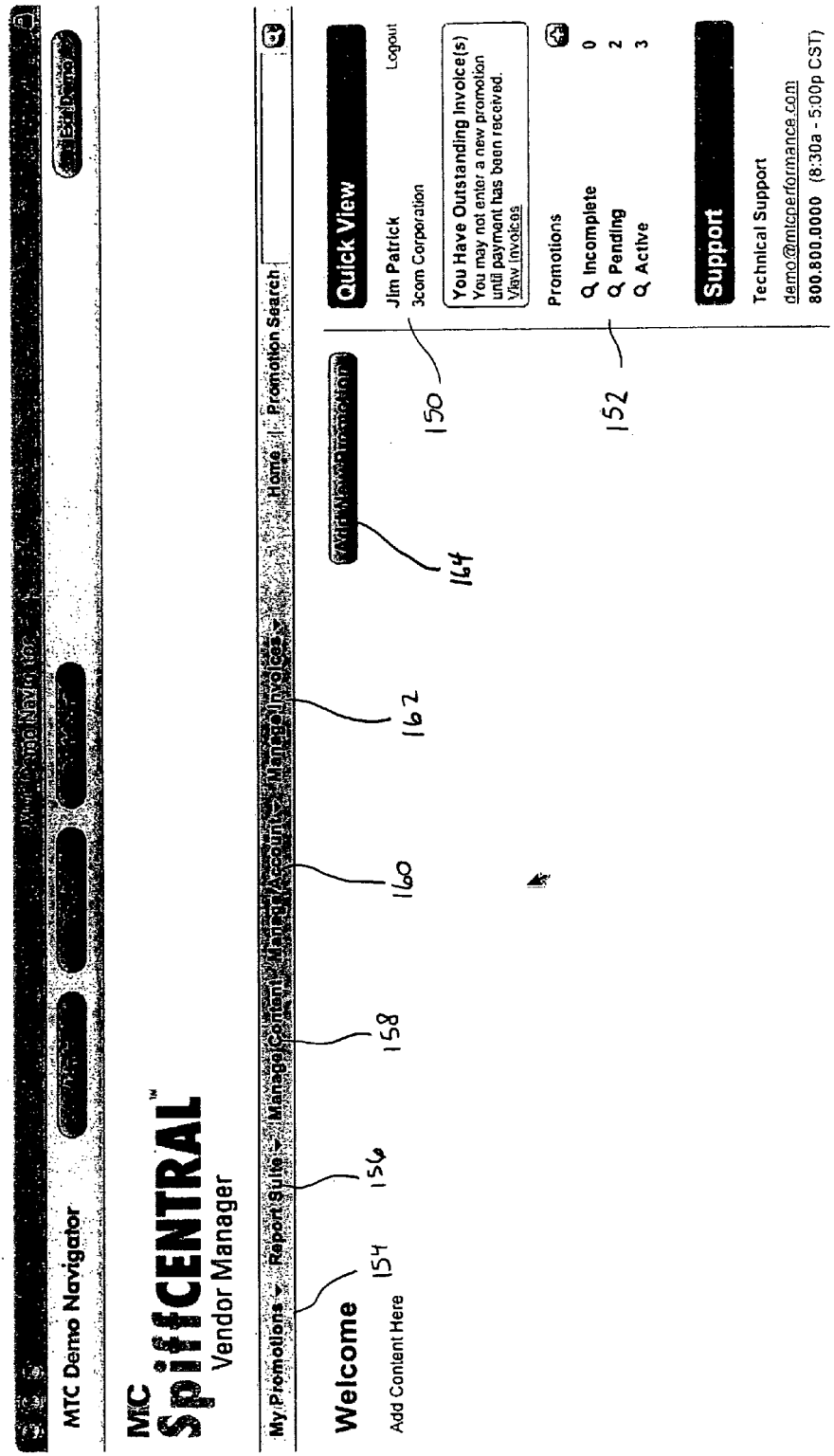
FIG. 7 is an embodiment of a screen shot of a Web page of the present invention showing various drill-down menus headers for program managers.

An example of an initial Web page for a vendor is shown in FIG. 7. Information that may be shown on the initial Web page may include, but is not limited to, the vendor's name and contact information 150; and a listing of the number of the vendor's spiff programs 152, which may be broken down into incomplete programs, pending programs and active programs. It is appreciated that the vendor's initial Web page may also be specifically tailored or customized for the particular vendor. A series of drill-down menus may also be provided to allow the vendor to manage, monitor and view information concerning its spiff programs. As shown in FIG. 7, general topics for such menus may include, but are not limited to: My Promotions 154, Report Suite 156, Managing Content 158, Manage Account 160 and Manage Invoices 162. The Web page also preferably provides a menu or link 164 that allows the vendor to add a new promotion.

If the vendor desires to add a new promotion, the vendor may click on the button/hypertext link 164 to access one or more Web pages to input information about the desired promotion. While separate Web pages are shown and disclosed, it is appreciated that the system may display the information in any of the known ways online including, but not limited to, through frames. Referring to FIG. 8, an example of a Web page that provides a list of the different types of spiff programs or promotions is shown. For example, the vendor may choose to add a debit or credit card program (where the card is credited with dollar amounts in accordance with the amount designated for the sale of eligible products by the salespeople) by using the mouse to click on the button 170, a points program (whereby the salesperson is credited with a certain amount of points for each eligible sale) by clicking on button 172, a lottery by clicking on button 174 or a prize contest (whereby awards or prizes may be given to salespeople who reach certain pre-determined sales) by clicking on button 176.

Figure 9:
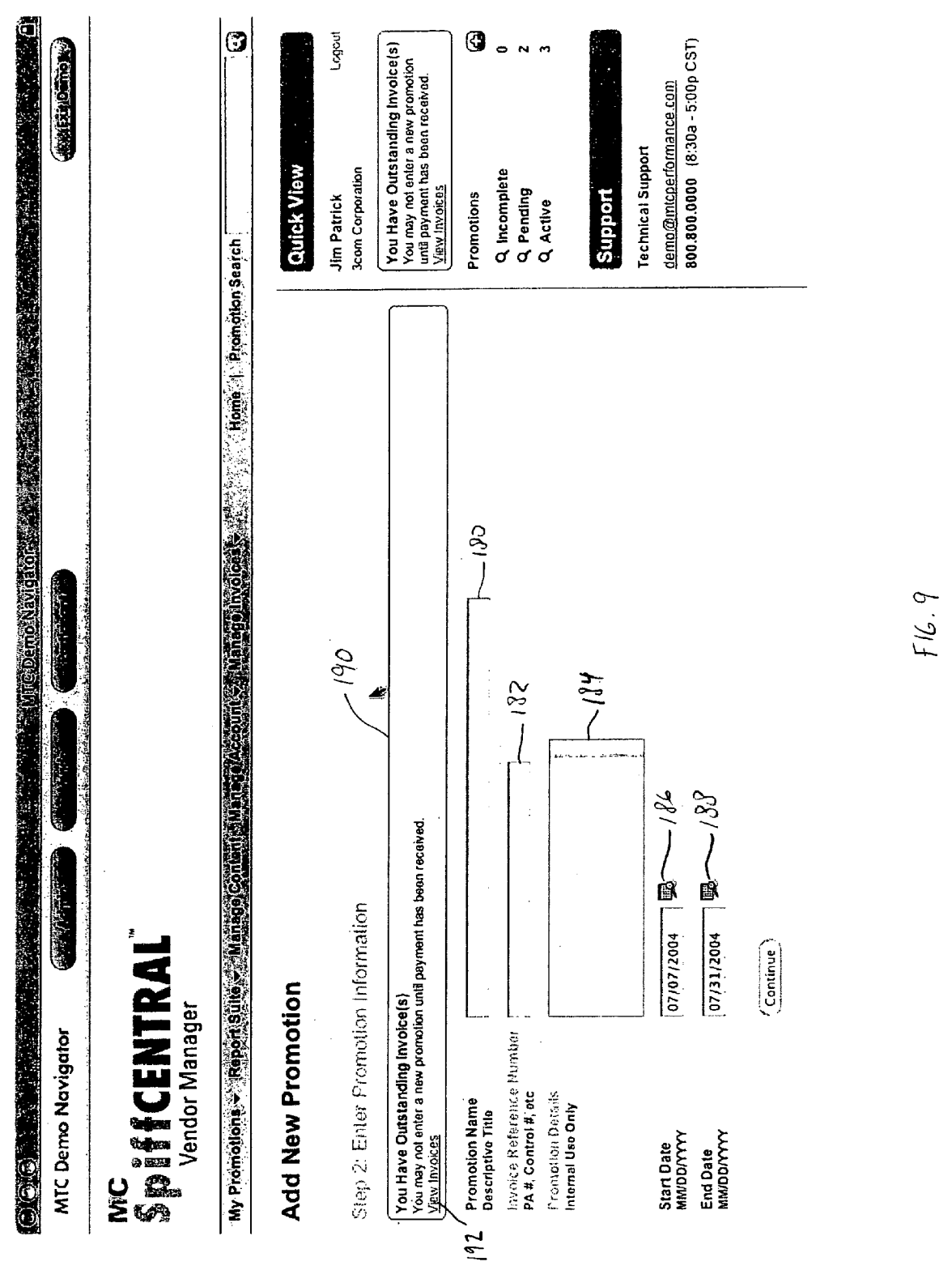

Once the type of spiff program is selected, the vendor may proceed to enter specific details regarding the program through a series of data fields. As shown in FIG. 9, examples of data fields include, but are not limited to, the promotion name 180, an invoice reference number 182, promotion details for internal use 184, and start and finish dates 186, 188 for the promotion. Additionally, it is appreciated that the system may be set such that the vendor will not be permitted to add any new promotions if it has outstanding invoices that have not been paid. For example, upon attempting to enter a new promotion, a vendor who has outstanding invoices, may receive a message 190 that indicates that it has invoices that have not been settled. In order to assist the vendor, the message may include a link 192 to allow the vendor to view the delinquent invoices.

Figure 10:
FIG. 10 is an embodiment of a screen shot of a Web page of the present invention that illustrates data entry and selection fields for allowing a program manager to search available SKUs to include in a spiff program.
Figure 12:
FIG. 12 is an embodiment of a screen shot of a Web page of the present invention depicting a table listing the products and SKUs that have been selected by a program manager for the spiff program.

After the vendor establishes the basic structure for the spiff program, the vendor may, as shown in FIGS. 10 through 12, select the products that are eligible for the program and the reward value for those products. Referring to FIG. 10, the vendor may search the system for possible products by entering or selecting the SKU or manufacturing number in field 194, the supplier in field 196 and/or the class of products in field 197. It is appreciated that the host system includes a listing of all available SKUs that allows updates or changes to the SKUs to be added or imported in any of the known ways. After entering the search criteria, the vendor may modify the search or select the desired products that are eligible for the spiff program. While the products may be selected in any number of known ways, it is appreciated that the vendor may use the mouse to click on boxes 198 associated with the products to select the desired eligible products. The vendor may also enter the award values in field 200 that apply to the checked or selected products. If different values are desired for different products, the process of selecting the desired products and inputting the award value should be repeated until all products are entered.

As the system preferably includes all of the spiff programs that the vendors offer, the system may automatically check and notify the vendor of any inconsistencies or discrepancies in the spiff programs. For example, the system may notify the vendor if the selected products are owned by another supplier or vendor, or if the products are already subject to an existing spiff program. As shown in FIG. 12, once the spills are inputted into a particular program, the spiffs may be displayed to the vendor, preferably in the form of a table 202. The vendor may then edit the selected spiffs by, among other things, modifying the spiff value or removing the spiff.

Figure 14A:
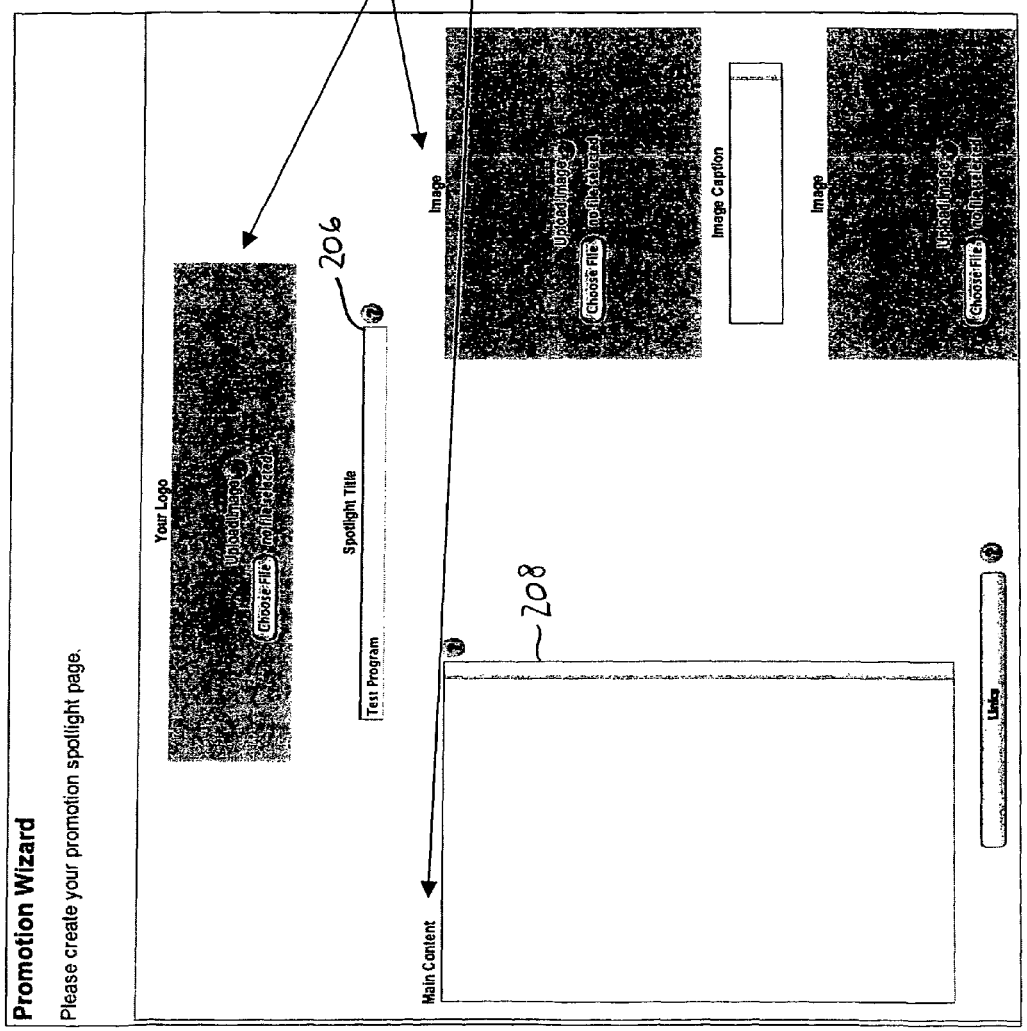
FIGS. 14a and 14b are embodiments of a screen shot of a Web page of the present invention that illustrate a series of data entry fields and buttons for allowing a program manager to create a spotlight.
Figure 14B:
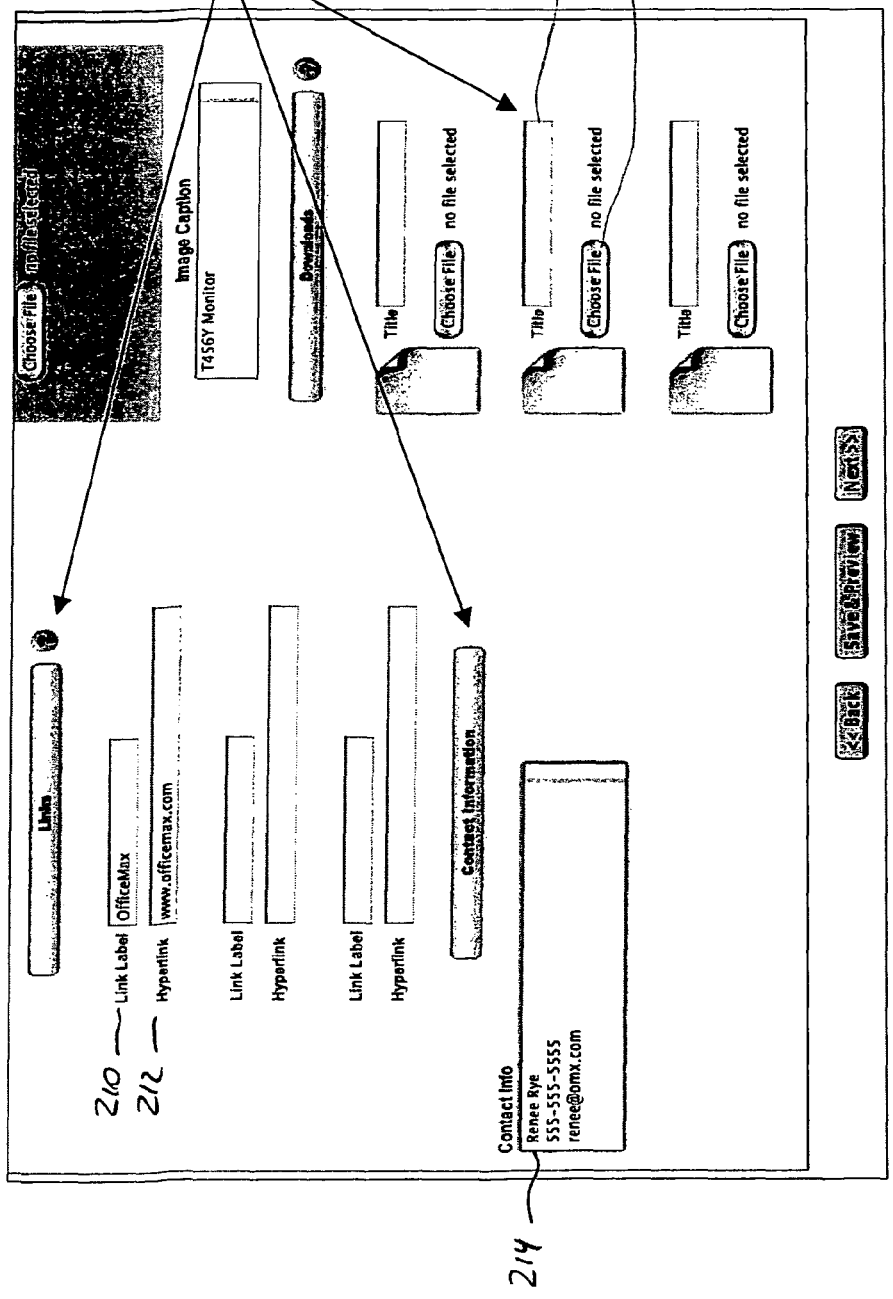

After completing the selection of the eligible products, the vendor may, if desired, create a promotion spotlight that will be displayed to distributors, participants and/or other potential participants. Particularly, a spotlight facilitates direct communication between the vendor and the participants regarding particular spiff programs, information on products or services, or the like. In a preferred embodiment shown in FIG. 13, the vendor may elect to either use a substantially automated process to create a spotlight, or upload a .pdf or other file into the system. If the vendor elects to create a spotlight using the automated process, the system, as shown in FIGS. 14*a* and 14*b*, preferably provides at least one template that directs or prompts the vendor to upload graphics, enter content information, and attach .pdf files and links. If the spotlight includes links, the template may include data entry fields to allow the vendor to name 206 the spotlight, input contact information 208, input a link label 210 and input a URL 212 for each desired link. The vendor may also be prompted or directed to include contact information 214. Similarly, if images are included in the spotlight, the template preferably includes data entry fields 216 that allow the vendor to name the images and buttons or links 218 that allow the image files to be downloaded or otherwise transferred to the system. Referring to one embodiment shown in FIG. 15, the system may also allow the vendor to create and/or include a banner advertisement for the spotlight to appear for the salespeople.

Figure 71:
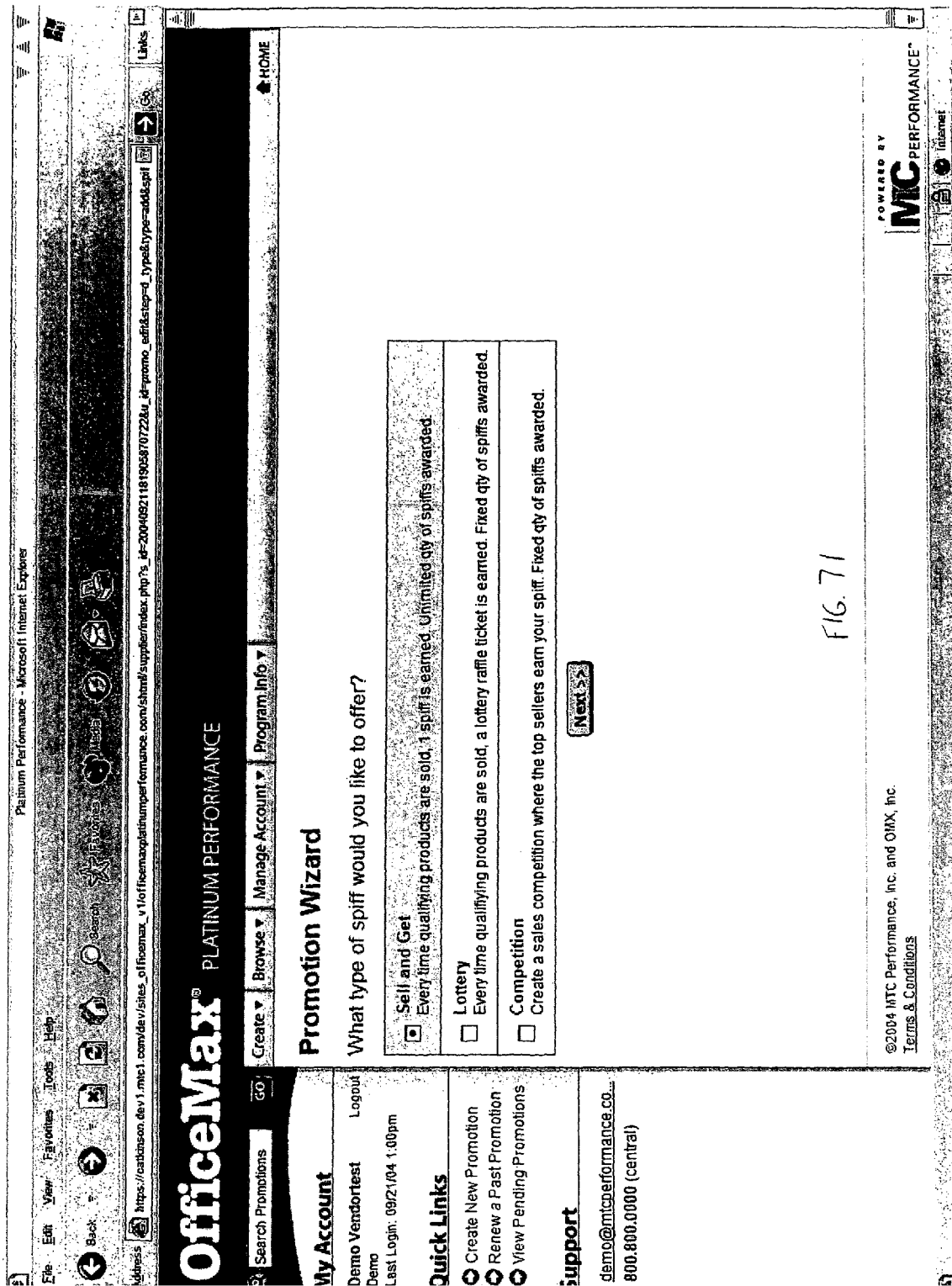
Figure 72:
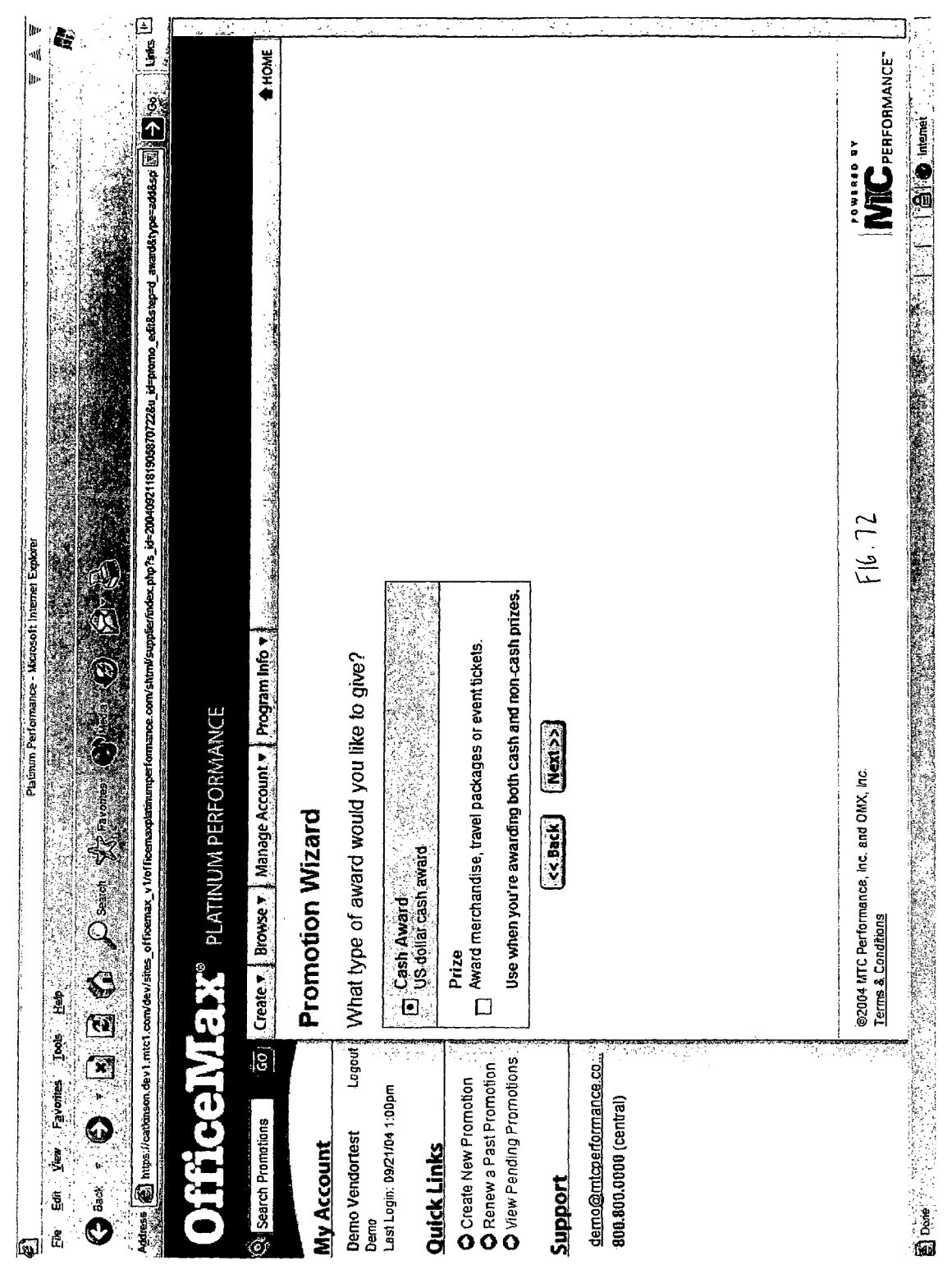

FIGS. 71 through 78 illustrate an alternate embodiment of examples of Web pages that may be accessed by the vendor to assist in creating spiff programs. Referring to FIG. 71, the system preferably provides the vendor with a list of the different general categories or types of spiff programs that may be inputted into the system. While "Sell and Get" (where the participants earn spills for every sale of a qualifying product), "Lottery" (where the participants earn a raffle ticket for every sale of a qualifying product) and "Competition" (where the top sellers earn the spiff(s)) are shown, it is appreciated that the system may permit any of the known types of spiff programs to be selected and/or created. Once the type of spiff program is selected, the vendor may then proceed to select the type of award for the particular spiff program. As shown in FIG. 72, examples of types of awards include, but are not limited to, prizes or cash awards.

Figure 73:
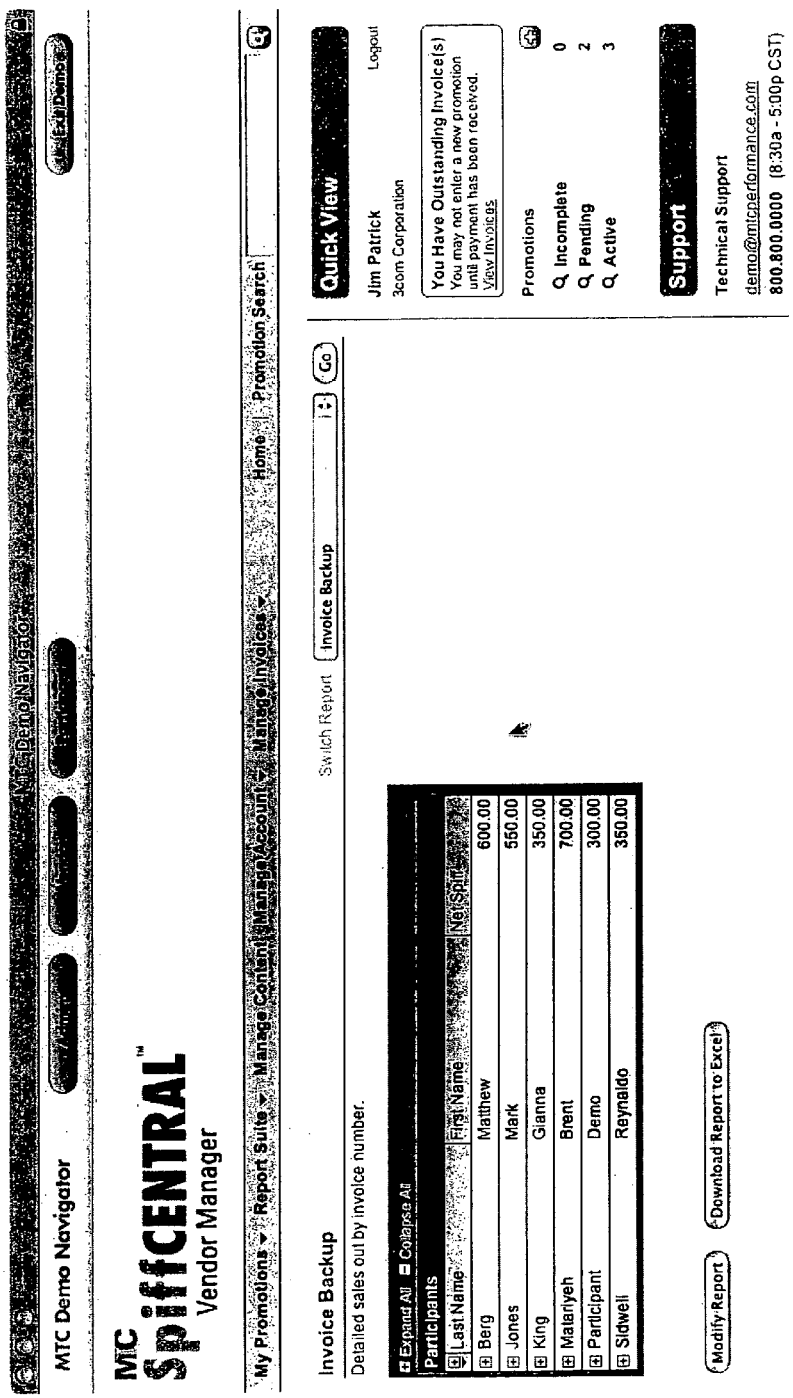

Referring to FIG. 73, the system may also allow the vendor to designate what products must be sold to earn a spiff. For example, the vendor may designate the program as a basic spiff program (where spiff awards or values will be awarded for every sale of an eligible product); a multiple spiff program (where spiff awards or values will be awarded every time the minimum number of eligible products have been sold); a multiple tiered spiff program (where a spiff award or value will vary depending on the number of products or amount sold); and a bundle spiff program (where a spiff award or value will be awarded every time a participant sells the selected bundled products to an individual or during a designated time period).

Figure 74:
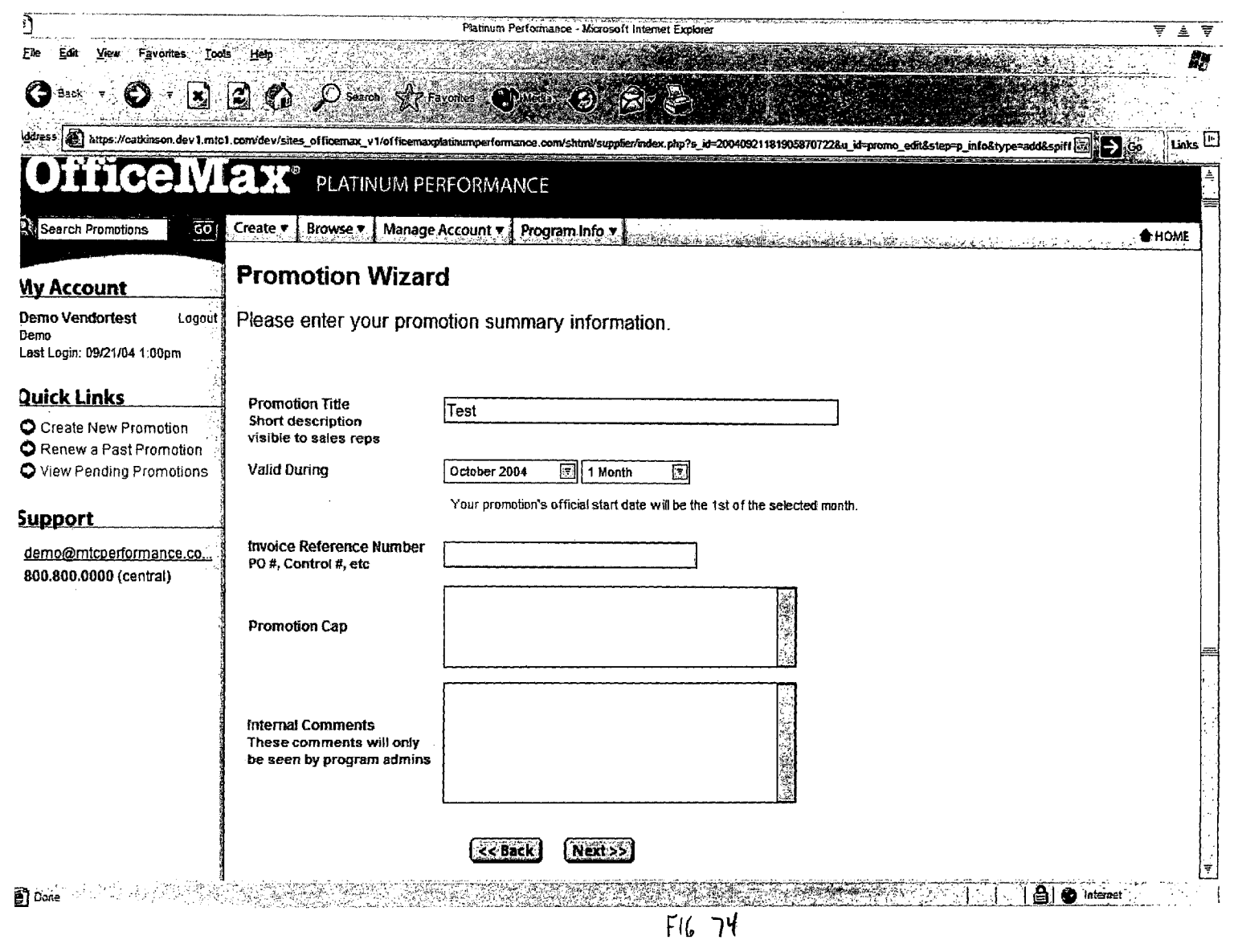

FIG. 74 shows a series of data entry and selection fields that a vendor may use to input information on the particular spiff program including, but not limited to, the program title, the dates of operation, the invoice reference number, the promotion cap, if any, and any internal comments.

Figure 75:
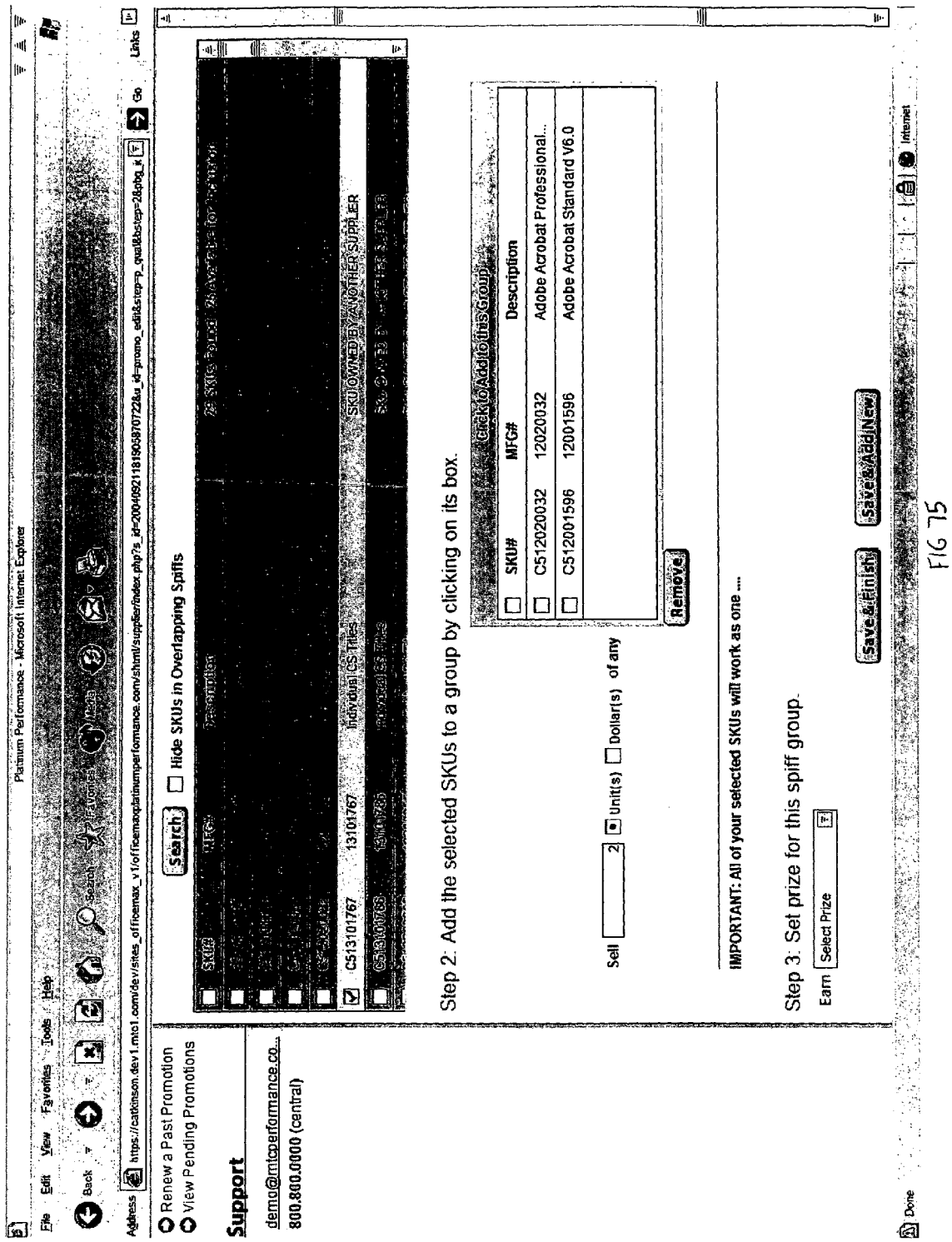

FIG. 75 illustrates an example of a Web page after a user has elected to create a multiple spiff program. In order to assist the vendor, the available SKUs or products are preferably listed on the Web page, or are available via a search. Using a mouse or other inputting device, the vendor may select the products or SKUs that it desires to include in its program. Once all of the products or SKUs are selected (although they can be subsequently modified), the vendor may designate the number of eligible products that must be sold in order to receive a particular spiff prize or award that it also inputs. Referring to the example shown in FIG. 75, the vendor has indicated that two products must be sold to be eligible for a spiff award.

Figure 76:
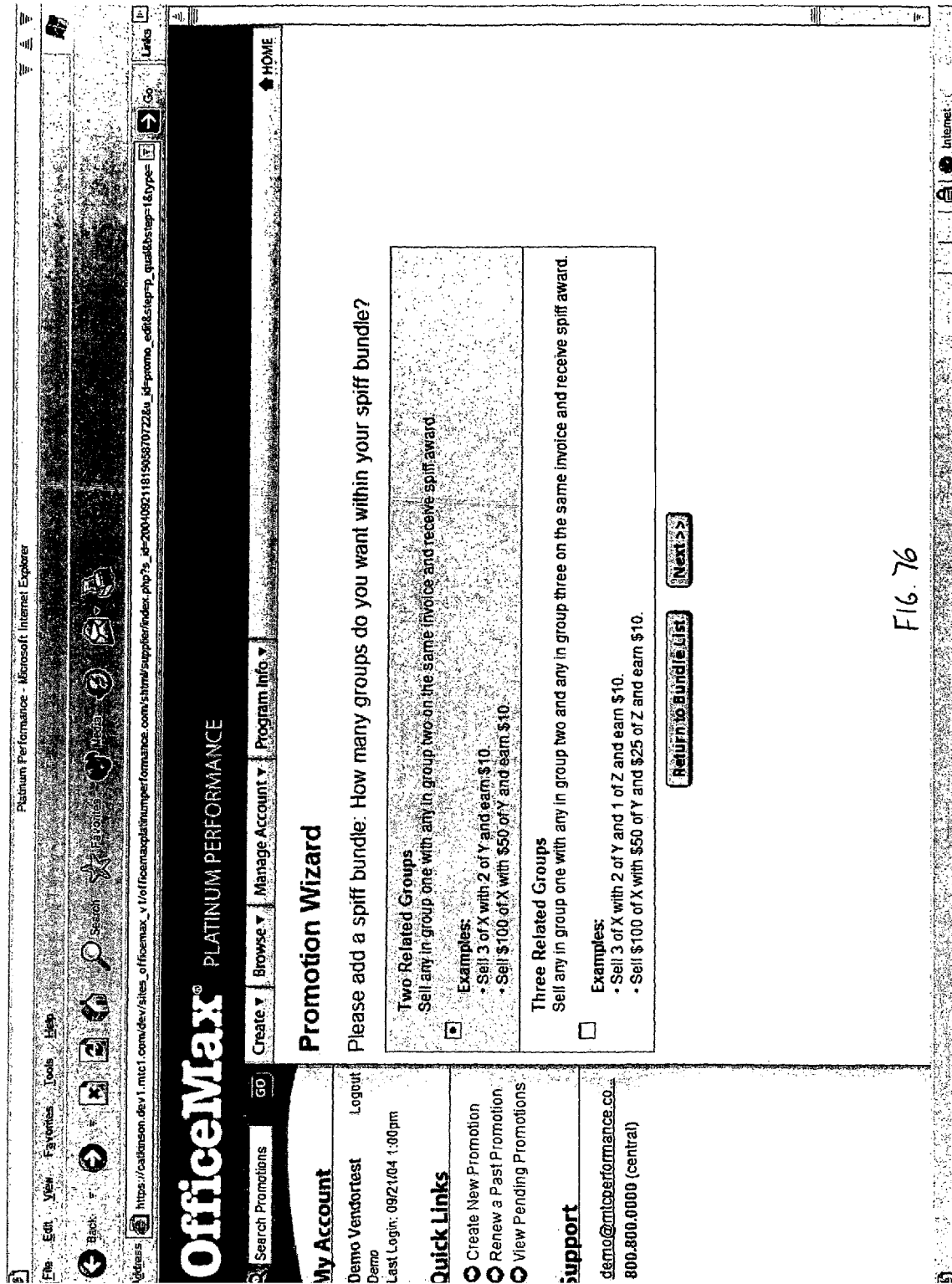

FIG. 76 shows an example of a Web page to assist a vendor in creating a bundle spiff program. While the Web page depicts the available options as Two Related Groups (wherein the participant must sell any of the eligible products in group one with any of the eligible products in group two) and Three Related Groups, it is appreciated that any number of groups may be bundled together. An example of a Web page for selecting SKUs for two groups of products is shown in FIG. 77. In order to assist the vendor in creating the program, the available SKUs or products are preferably listed on the Web page, or are available through a search. Using a mouse or other inputting device, the vendor may select the SKUs or products that it desires to include in its program. Once all of the SKUs or products are selected for each of the groups, the vendor may then designate how many products from each group must be sold for the participant to be eligible for a spiff reward or award that it also enters into the system.

Figure 78:
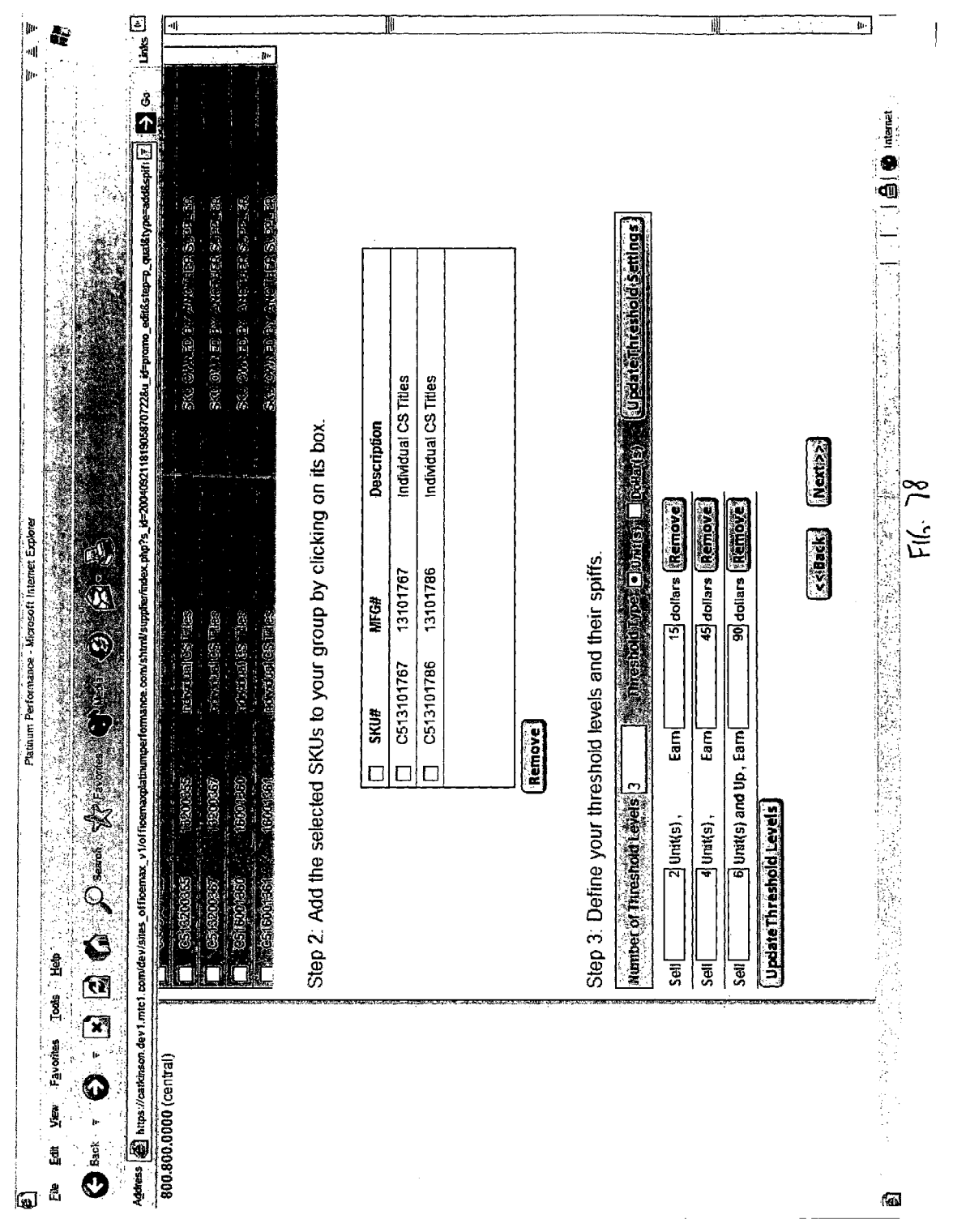

FIG. 78 illustrates an example of a Web page after a user has elected to create a multiple tiered spiff program. In order to assist the vendor, the available SKUs or products are preferably listed on the Web page, or are available by a search. Using a mouse or other inputting device, the vendor may select the SKUs or products that it desires to include in its program. Once all of the SKUs or products are selected, the vendor may enter how many threshold levels will be involved and the criteria for meeting those thresholds (e.g., number of products sold or total amount of sales). The vendor may utilize a plurality of data entry or selection fields to input the specific details regarding the threshold levels. For example, referring to FIG. 78, the vendor has indicated that if the user sells two units, four units or six or more units, the participant will earn $15, $45 or $90 respectively.

As indicated above, the vendor may also view its various spiff programs. It is appreciated that the available promotions may be searched and displayed in accordance with certain search fields, as shown in FIG. 16. For example, the vendor may be able to elect to search by the status 230 of the spiff programs, the type 232 of promotions, keywords 234 (e.g., promotion number, SKU number or title), or the dates 236 that the programs are valid. The promotions may be displayed in any number of ways, but preferably are displayed in tabular form 238 as shown in FIG. 16. The table 238 may include a variety of different information, but preferably includes an indication of the status 240 of the spiff program, the promotion or program number 242, the type 244 of program, the title of the program 246, the dates 248 the program is valid, and the number of eligible products 250. The table may also permit the vendor to access details 252 regarding recent activities for each program. As shown in the key 254, possible categories for listing the status of the programs may include, but are not limited to: declined, incomplete, pending review, in review, approved, active and complete.

Selecting a particular program allows the vendor to view details about that program. For example, referring to FIG. 17, selecting promotion number 1657 from the table 238 of FIG. 16 provides the vendor with information regarding that particular debit card spiff program. Information that may be available to the vendor includes, but is not limited to, fields showing the title 260, description 262 and valid dates 264 for the spiff program. The details also preferably include information on the eligible products 270 and SKU numbers 272; the partners 274; the description 276 of the products; and the value or other reward amounts 278 for the eligible products.

FIG. 18 is an embodiment of a Web page that depicts the various types of reports that may be available to the vendor. Examples of reports include but are not limited to: a list of all account managers or administrators; a list of all administrators with valid claim information; detailed reports of product claim data by administrators; a detailed breakout of claims in a given batch; a claim summary based on a selected batch; a report based on all products sold; spiff details for particular invoice numbers; reports showing total spiffs claimed; reports showing total products claimed; summaries of products sold and claimed by the administrator; summary of products sold and claimed by a group; summaries of products sold and claimed for a particular funding period; detailed reports of all claim data for a specific funding period; and summaries of sales out for administrators.

Figure 20:
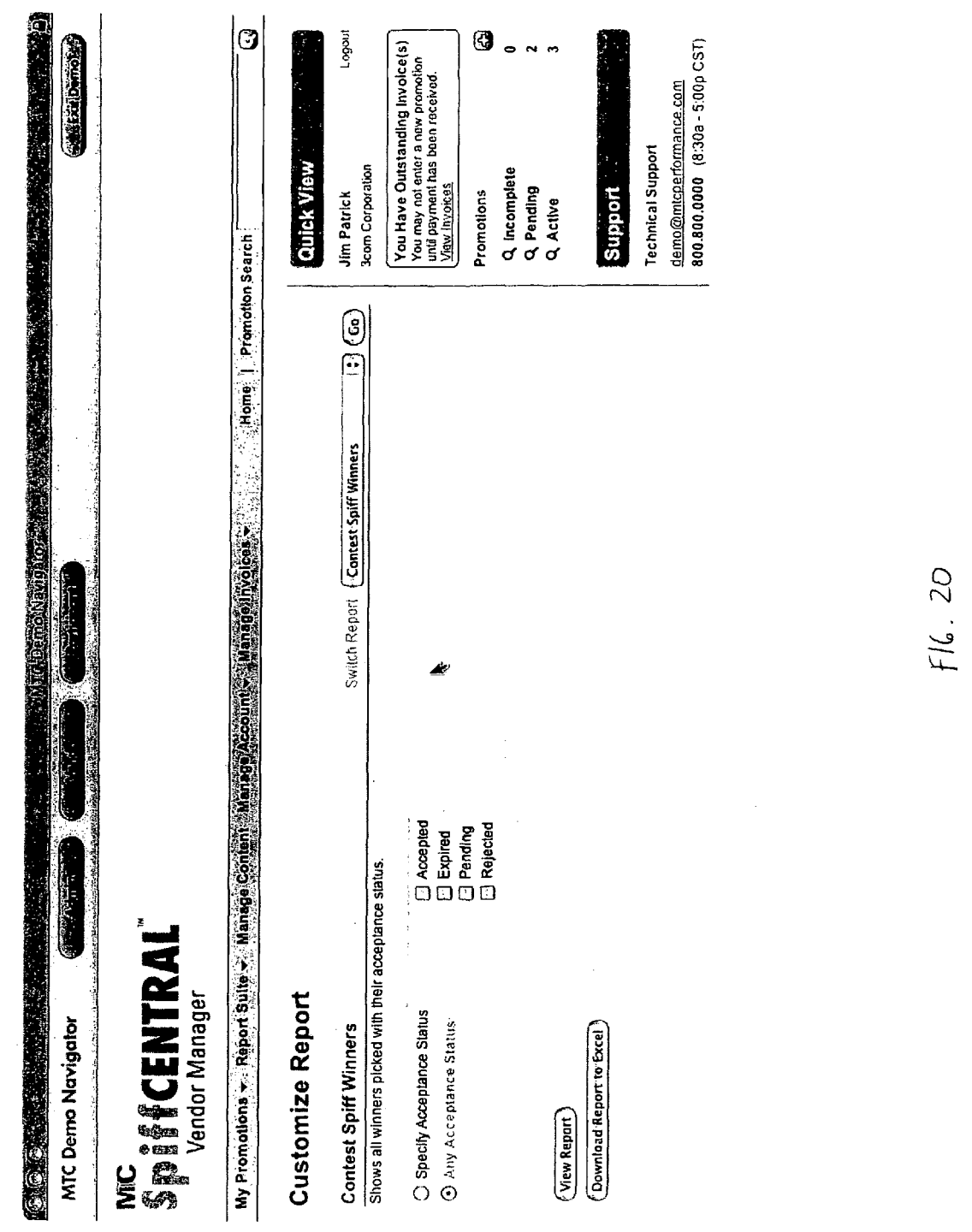
Figure 21:
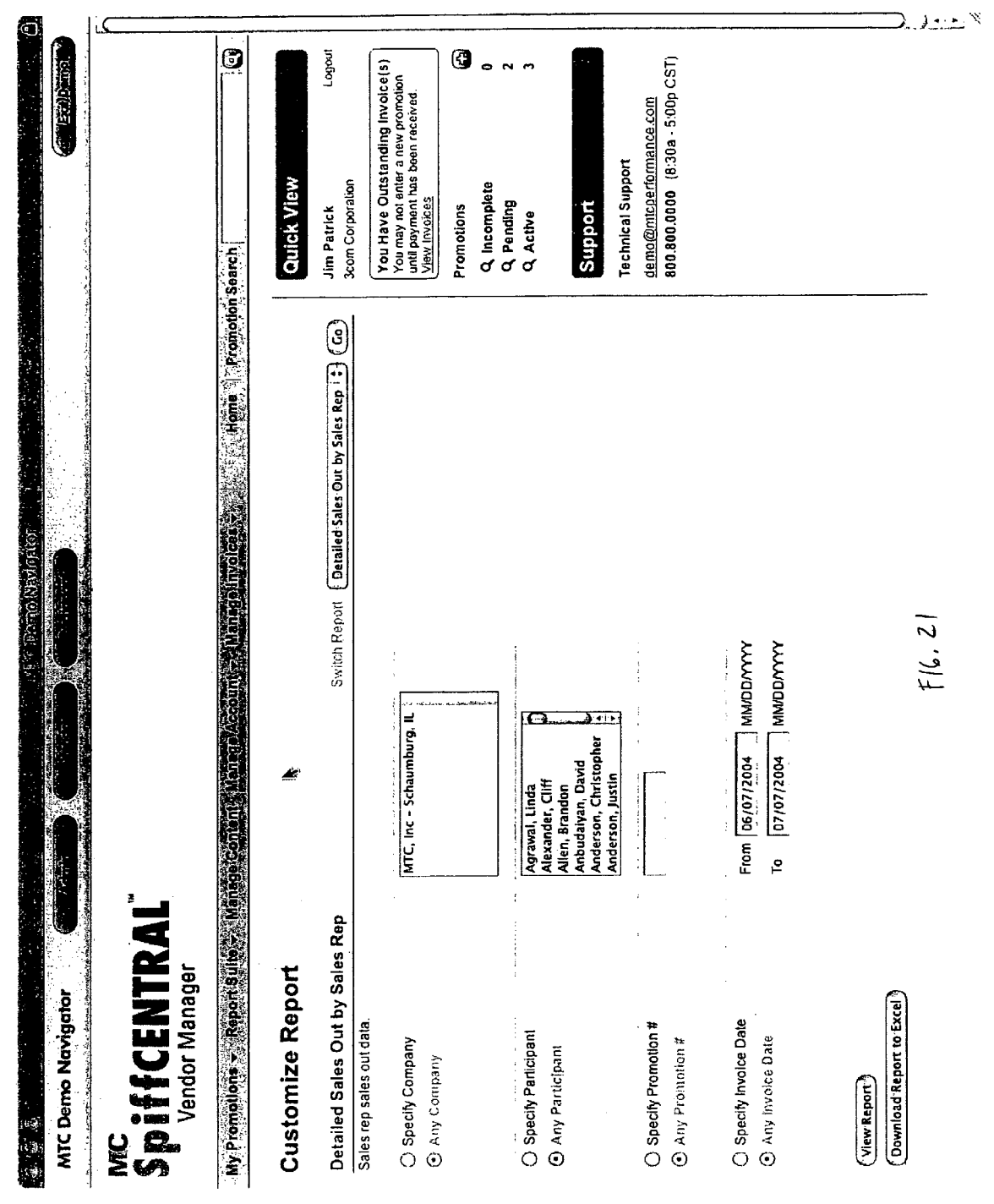
Figure 22:
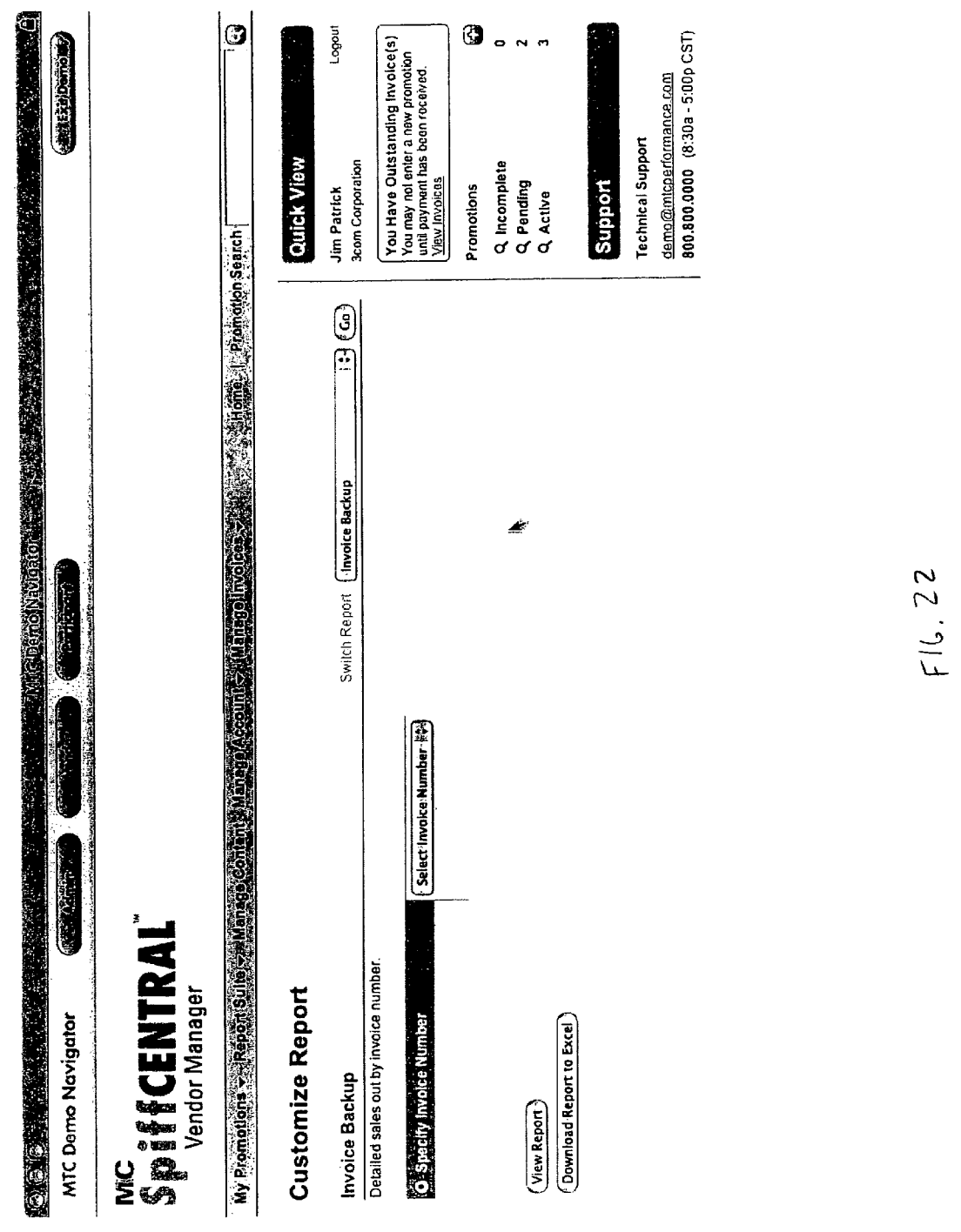
Figure 24:
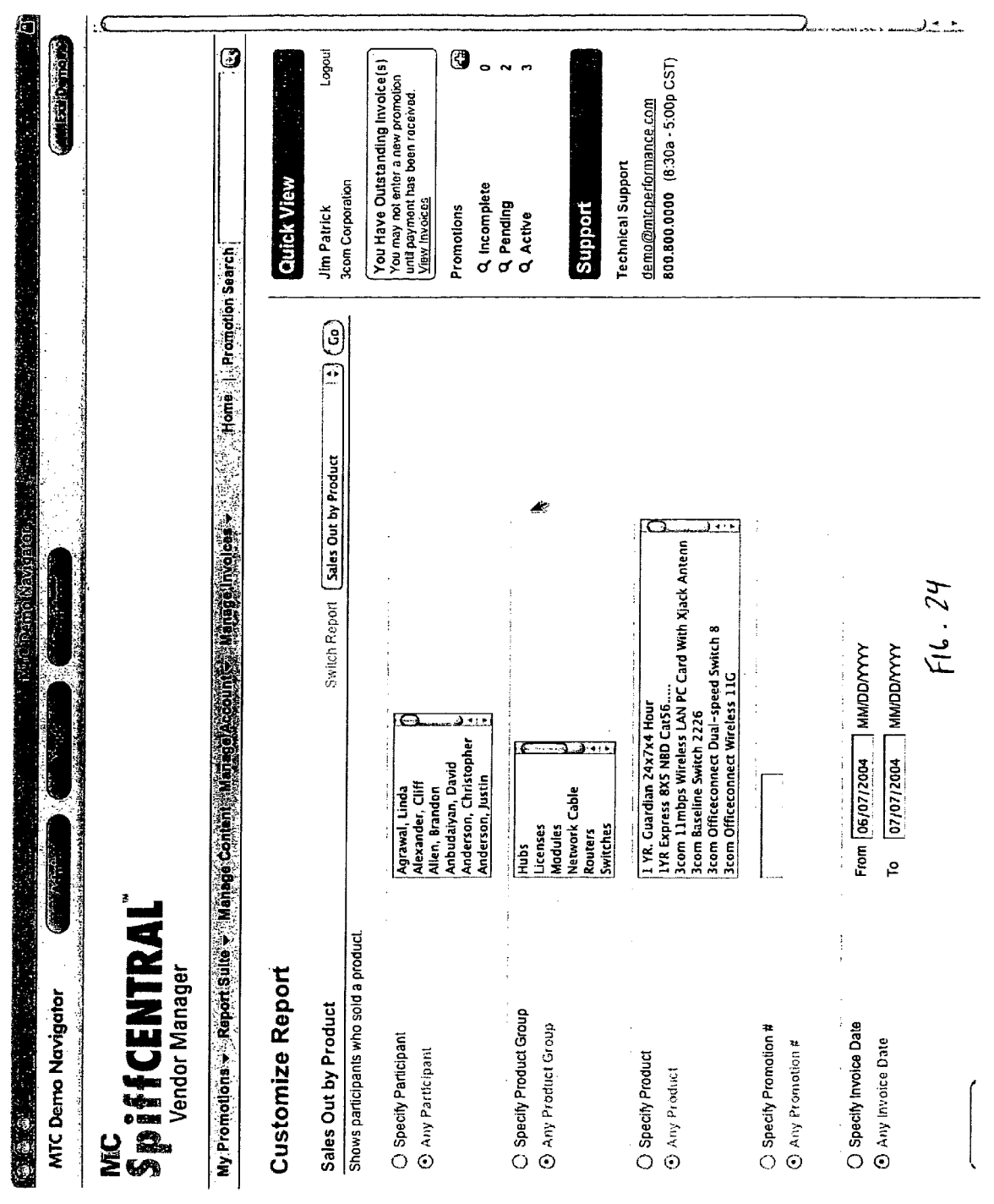
Figure 26:
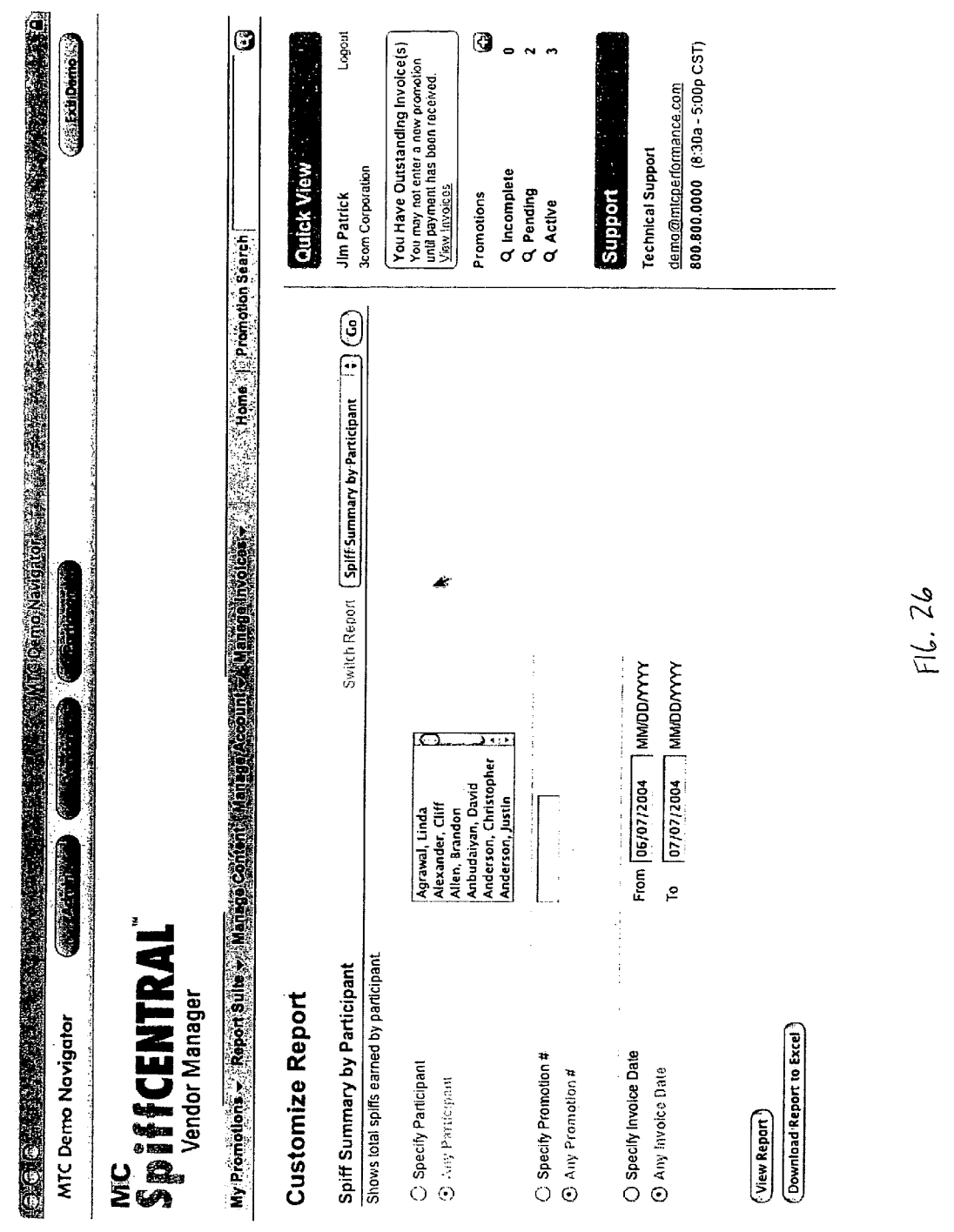

FIG. 19 illustrates an alternate embodiment of a Web page that depicts the various bases for available reports for the vendor. It is appreciated that the system provides for reports to be viewed online or downloaded to the vendor's computer in a known way in a known format such as, but not limited to Excel. For example, as shown in FIG. 20, the vendor may elect to view a report that lists all spiff winners for the vendor's program. The vendor may also limit the report to winners based on their status (e.g., accepted, expired, pending and/or rejected). Referring to FIG. 21, the vendor may also elect to view reports based on particular salespeople. Preferably, the system allows the vendor to limit the report based on particular companies (e.g., distributors or retailers), participants, promotions, and or invoice dates. The vendor may also be given the option to view detailed information regarding sales by particular invoice numbers, as shown in FIGS. 22 and 23. Similar to reports by participants, the system may also allow the vendor to generate and/or view reports based on the sales of particular eligible products. As shown in FIGS. 24 and 25, reports based on the products may be limited to, among other things, particular participants, product groups, products, promotion numbers and/or invoice dates. Referring to FIG. 25, it is appreciated that the vendor may expand or collapse the detailed information for the products by clicking any of the boxes that indicate that there is additional information (e.g., those that include a "+" sign). FIG. 26 illustrates an example of a Web page for selecting a spill summary report by participants.

Figure 27:
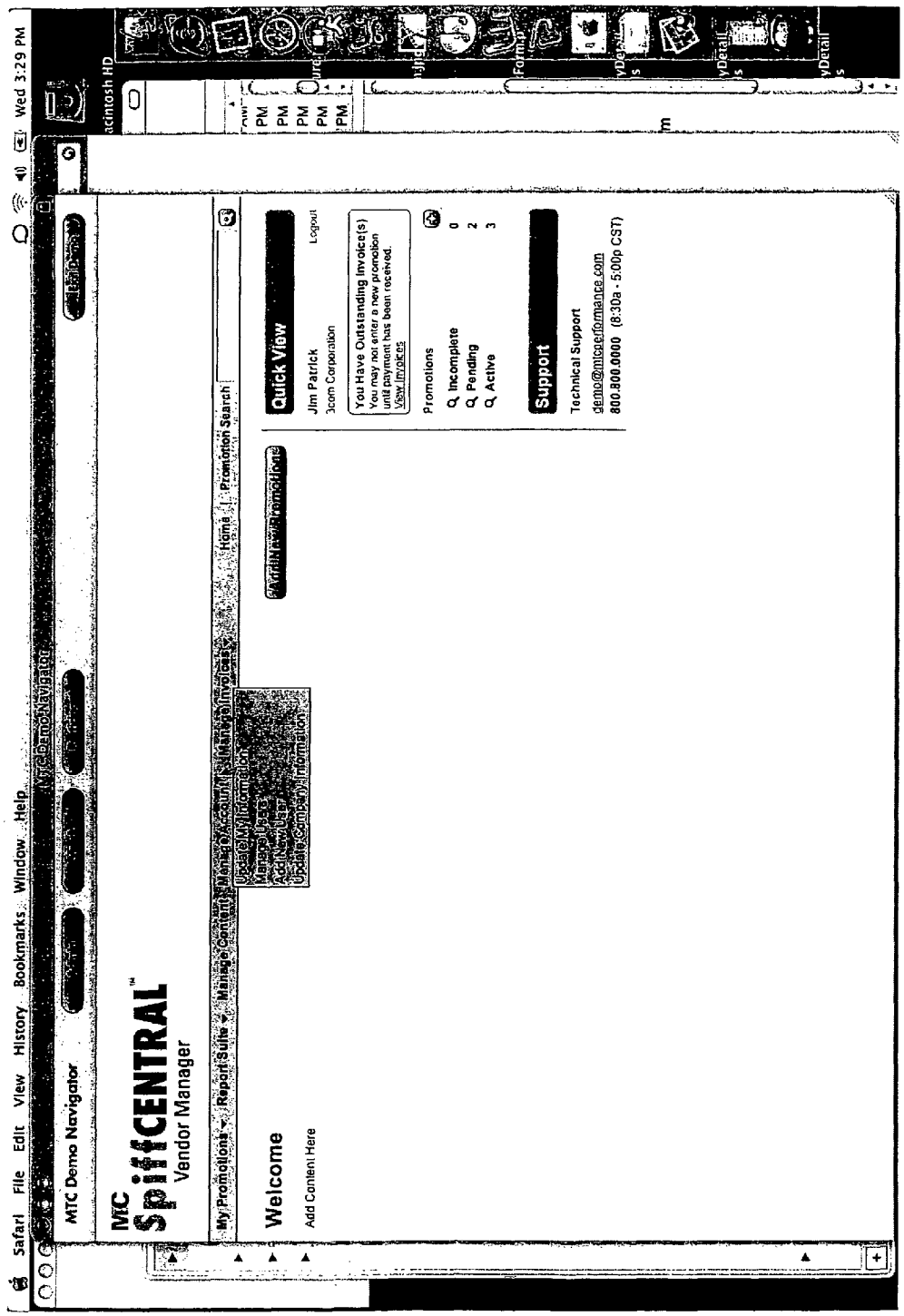
FIG. 27 is an embodiment of a screen shot of a Web page of the present invention that depicts a drill-down menu showing possible functions available for a program manager to manage the account.
Figure 28:
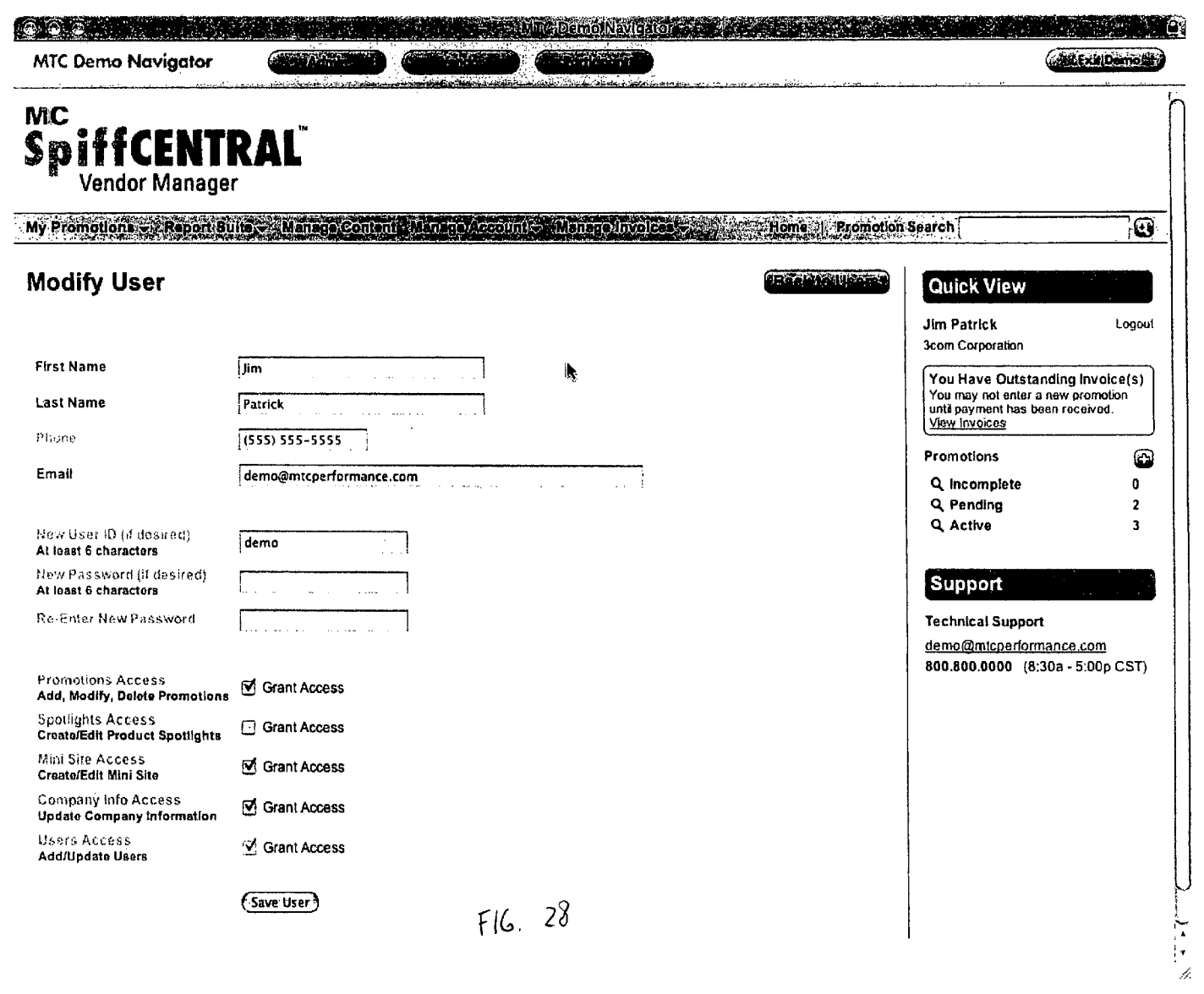

Referring now to FIG. 27, a drill-down menu for the Manage Account menu depicts possible links or selections as including "Update My Information", "Manage Users", "Add New User" and "Update Company Information". Updating the user's information allows the user to, among other things, update its contact information and create a new user ID and/or password. Additionally, it is appreciated that the vendor may set up its users such that the users only have access to certain information and features. In the example shown in FIG. 28, the user has been given access to promotions, mini-sites, company information and users; however, he was not given access to creating and/or editing spotlights.

Figure 29:
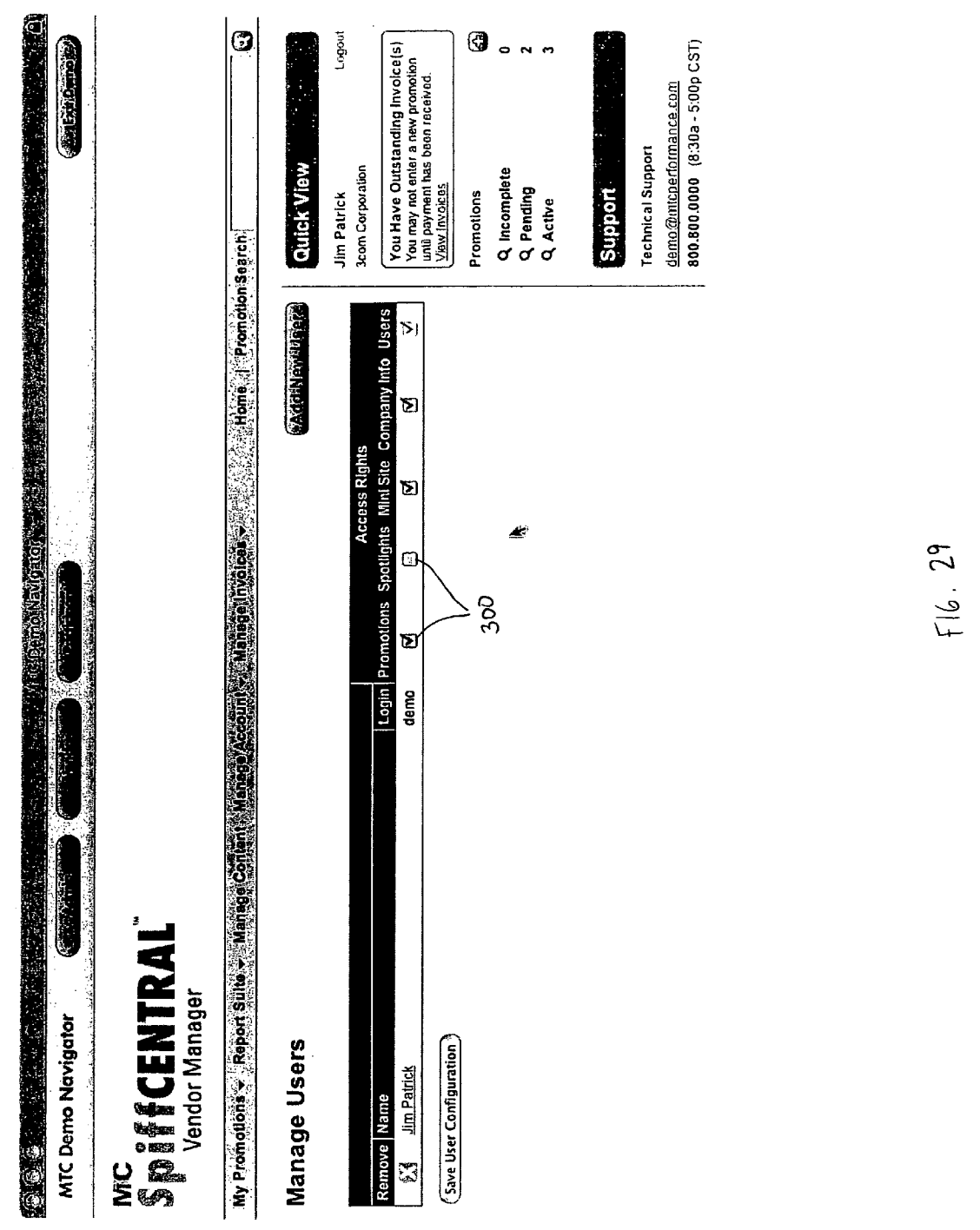
Figure 30:
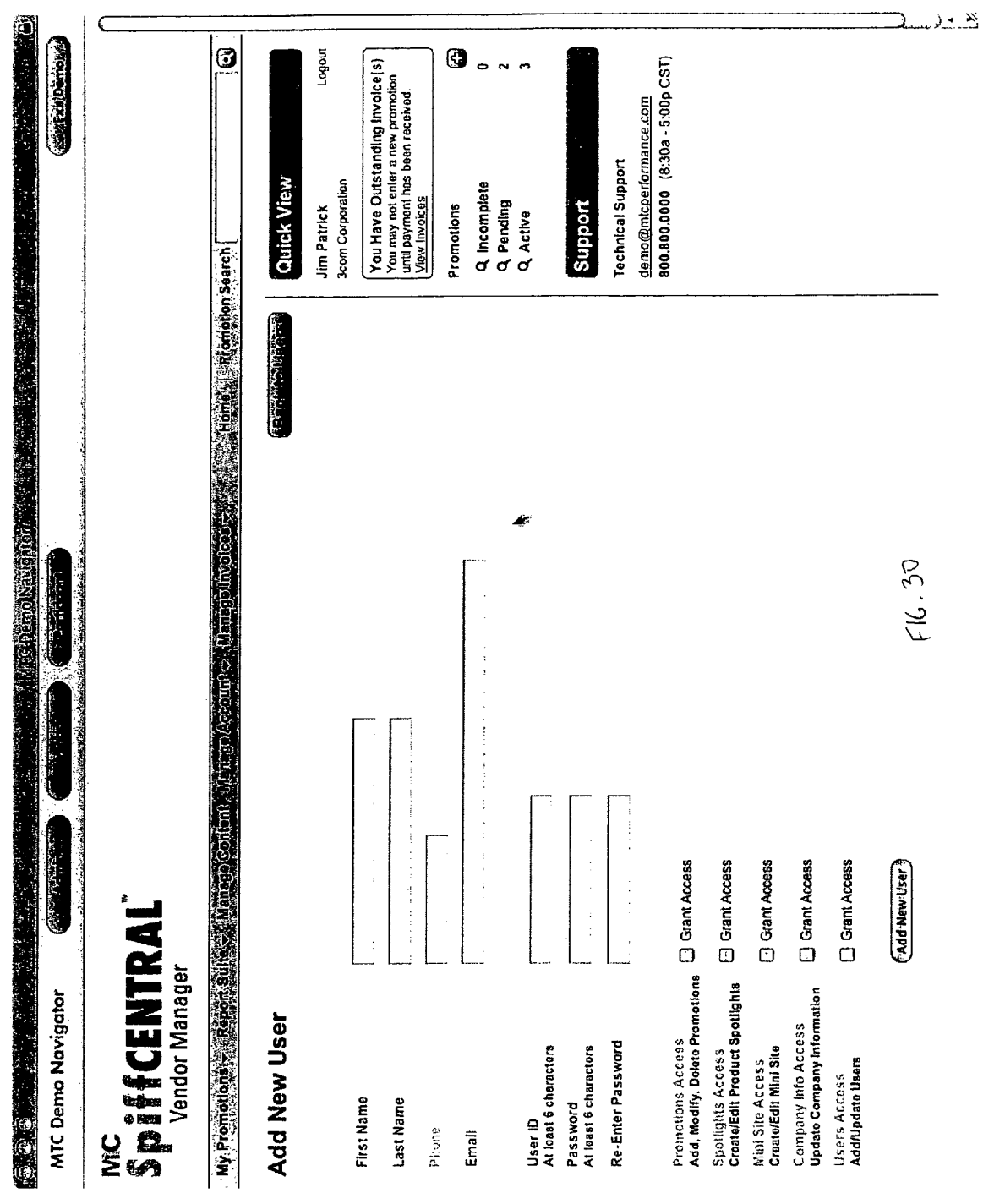
Figure 31:
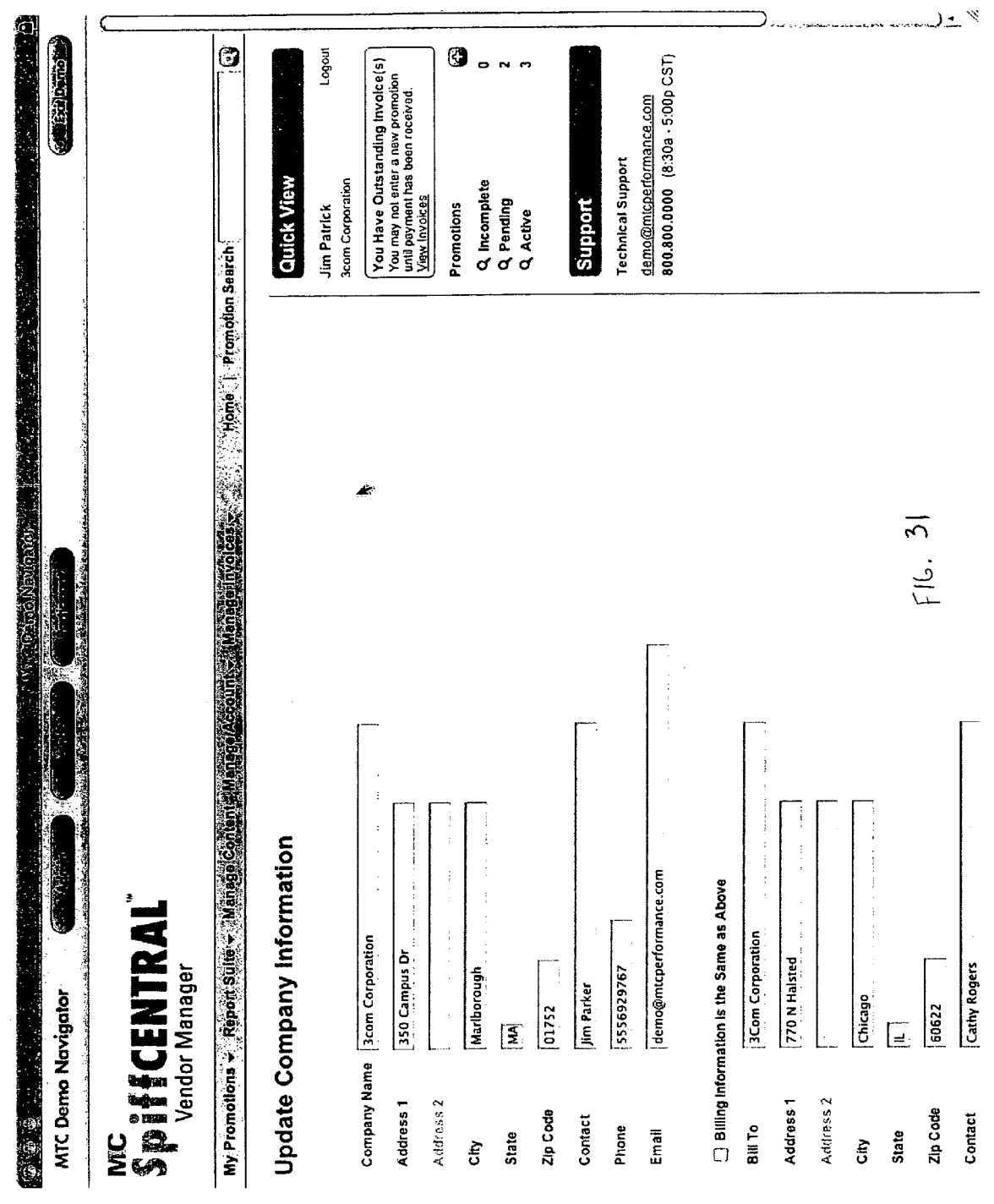

FIG. 29 illustrates one embodiment of a Web page that enables the vendor to modify or manage the users under its authority. For example, the vendor may, among other things, change the user's authority to access certain information and features by checking or unchecking boxes 300 associated with those features or information. The vendor may also be given access to Web pages and date entry fields that allow it to add new users (FIG. 30) or update the vendor information (FIG. 31).

The system also preferably allows the vendor to view and manage the invoices associated with all of the vendor's spiff programs. Referring to FIG. 32, the vendor preferably may search or browse available invoices by using data entry or selection fields to search by the promotion's or programs' status 310, the invoice number 312, promotion types 314, promotion numbers 316 and/or invoice dates 318. Alternatively, the vendor may elect to see all available invoices for all of its vendor programs.

The system also preferably handles all billing matters with the vendors including, but not limited to, sending invoices, which are preferably sent electronically, providing billing status reports for all vendors, and tracking all payments for the spiff programs. In a preferred embodiment, the system will not allow a vendor to submit or renew any programs until such time that it is up-to-date on all payments for its various spiff programs. It is also appreciated that the system allows the vendor to directly communicate with the salespeople regarding the spiff programs to provide encouragement, reminders or other information. The system may also be setup to allow the distributor to review any such communications prior to their transmittal.

In order to assist the vendor in reviewing the invoice information, the system preferably provides information regarding the invoices in a tabular format 320. As shown in FIG. 32, examples of information that may be presented to the vendor regarding its invoices includes, but is not limited to: columns that display, the status 322 of the invoices, the invoice number 324, the promotion or program number 326, the invoice date 328, the length of time 330 since the invoice issued, the type 332 of program and the total amount 334 of the invoice. Additionally, the system may allow the user to perform additional actions 336 such as, but not limited to, printing and/or downloading copies of the invoices. One embodiment to depict the status of the invoices is to use a series of different colored circles or other shapes or images. For example, referring to the key 338 shown in FIG. 32, different colored or shaded circles may be used to denote the different statuses of the invoices, for example, pending payment—current, pending payment—31 to 45 days, pending payment—46 to 60 days, pending payment—61+ days, paid and cancelled.

Figure 80:
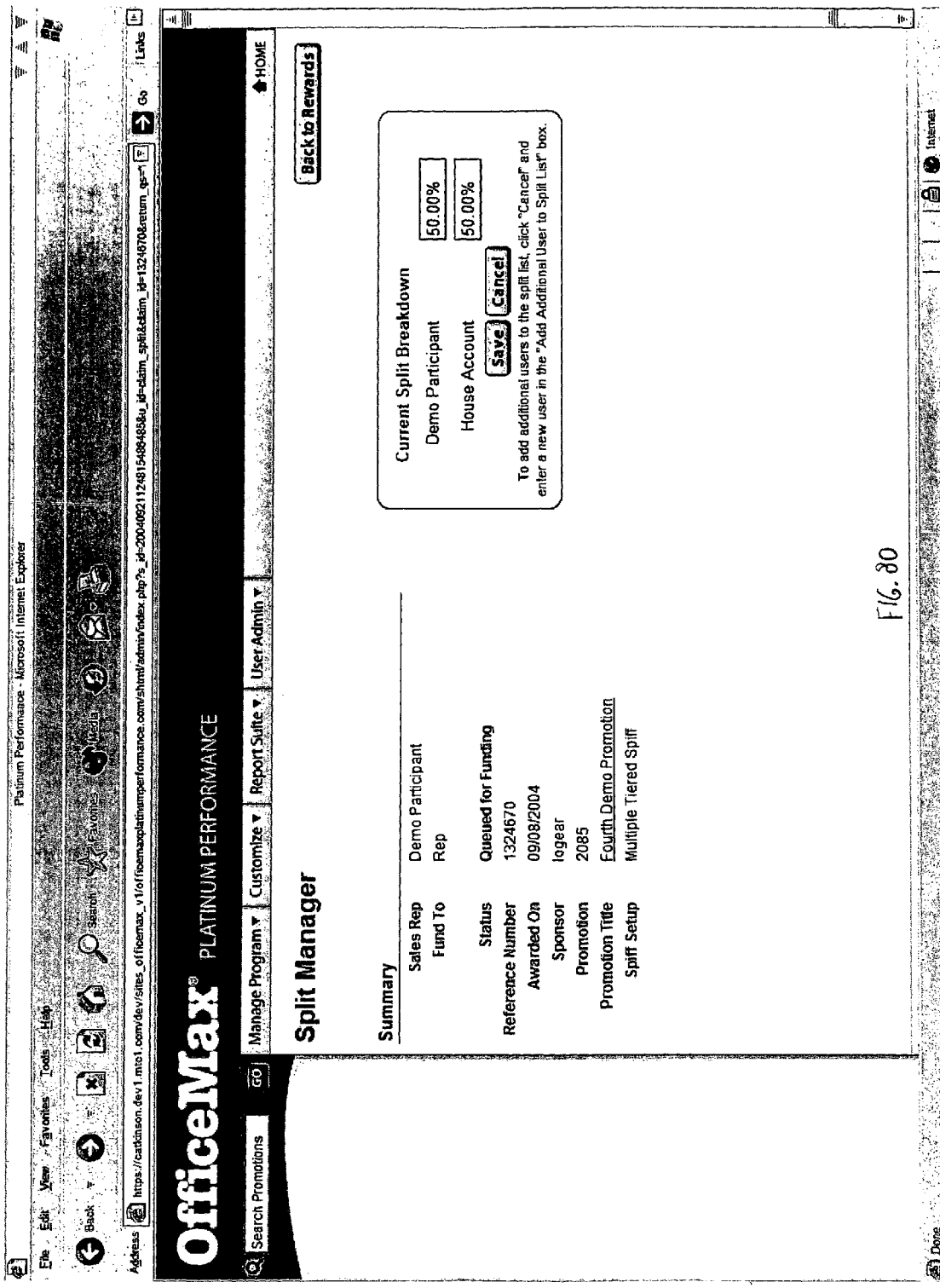

The system also may permit the vendor to modify the spiff awards and/or rewards that participants may be eligible to receive. For example, the vendor may allocate spiff awards or rewards that are received by the participants to others who assisted in the sales process or based on prearranged breakdowns of rewards. In a preferred embodiment, a vendor may access information through one or more Web pages regarding any preset splits of the spiff. For example, referring to FIGS. 79 and 80, the system indicates that spiff awards for eligible products for the Fourth Demo Promotion are split equally between the participant and the vendor. The system also preferably permits the vendor to modify the split amounts, as well as the recipients of any percentage of the spiff awards. For example, if an engineer assisted in modifying a particular product for an eligible sale, the vendor may allocate that 20% of the spiff award be given to the engineer.

Referring now to FIGS. 33 through 50, a series of Web pages that an administrator may access of one embodiment of the present invention are shown. In the preferred embodiment, an administrator, who may be a distributor, by using the system of the present invention, is allowed to effectively manage a plurality of concurrent spiff programs. Similar to the vendor application, the system preferably requires the administrator to register, establish a user ID and password, and log into the system. Once logged into the system, the administrator is preferably provided with a series of drill-down menus, links or other listings to allow the administrator to perform certain functions and/or view information regarding spiff programs and their participants. FIG. 33 depicts one embodiment of an introduction page for an administrator. The introduction page comprises a series of three drill-down menus that provide links to allow the administrator to access spiff programs, generate and view reports, and manage and monitor users.

Figure 34:
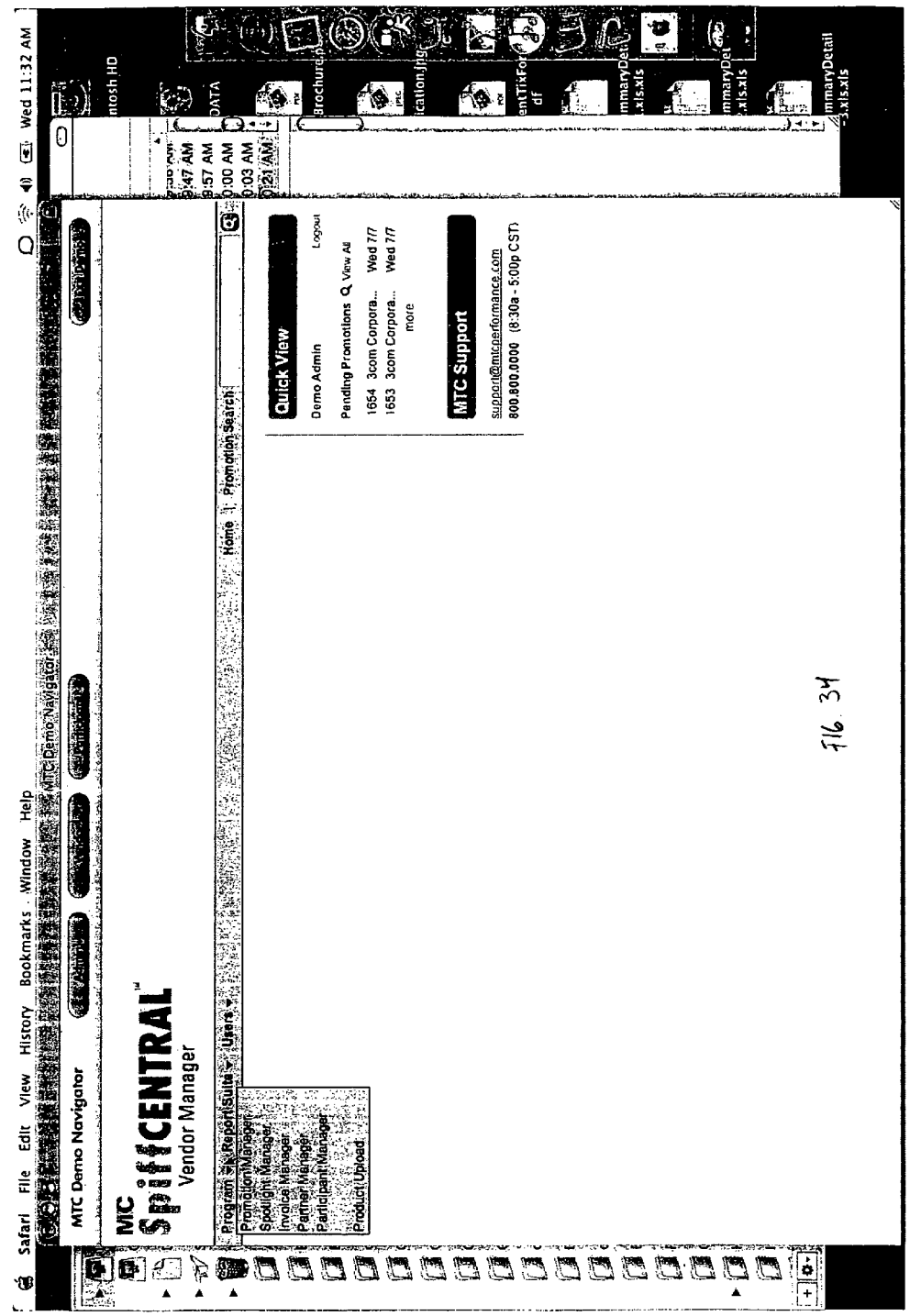
FIG. 34 is an embodiment of a screen shot of a Web page of the present invention showing a drill-down menu for allowing the administrator to move around the system.
Figure 35:
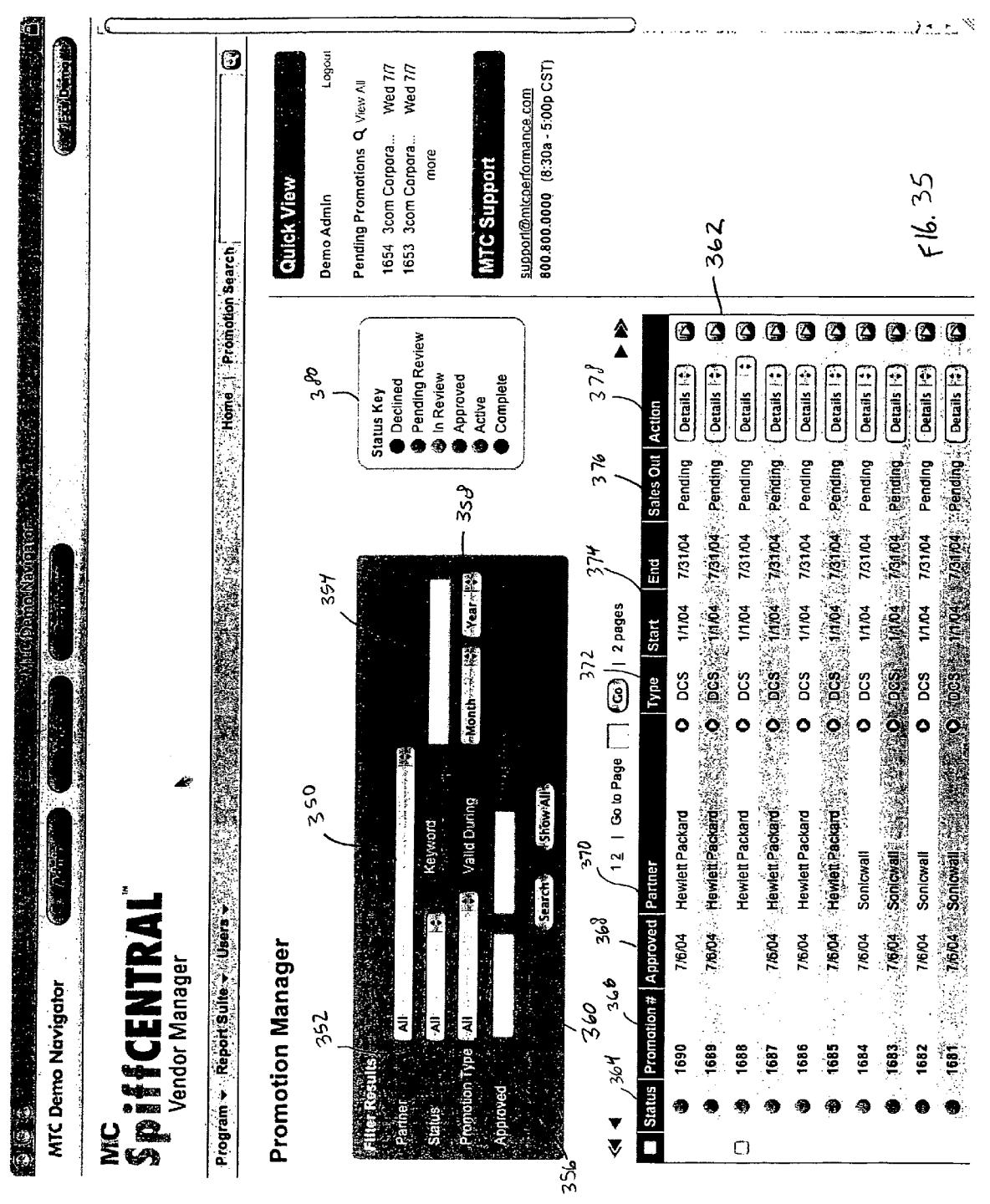

In a preferred embodiment shown in FIG. 34, the program menu generally allows for the administrator to, among other things, manage and/or monitor promotions ("Promotion Manager"), spotlights ("Spotlight Manager"), invoices ("Invoice Manager"), vendors ("Partner Manager") and/or participants ("Participant Manager"). With respect to the "Promotion Manager", the administrator (as shown in FIG. 35) may be allowed to use data entry or selection fields to search for particular programs or promotions by vendors ("partners") 350, promotion status 352, keywords 354, promotion types 356, promotion dates 358, and dates of approval 360 for the promotions. Alternatively, the administrator may view all of the available programs or promotions. The results of the search are preferably provided to the administrator in the form of a table 362 that lists information regarding the programs or promotions in a plurality of columns. Information that may be included in the table includes, but is not limited to: the status 364 of the promotions or programs; the program numbers 366; the date of approval 368, if available, for the program; the vendors or partners 370 for the programs; the program types 372; the start and ending dates 374 for the programs and notification of the status 376 of sales. With respect to the status of the programs, the administrator is preferably responsible for, among other things, reviewing and, if accepted, approving the spiff programs that are submitted by the vendors. One embodiment to depict the status of the programs is to use a series of different colored or shaded circles or other shapes or images. For example, referring to the key 380 shown in FIG. 35, different colored or shaded circles denote the different statuses of the programs, namely, declined, pending review, in review, approved, active and complete.

Figure 81:
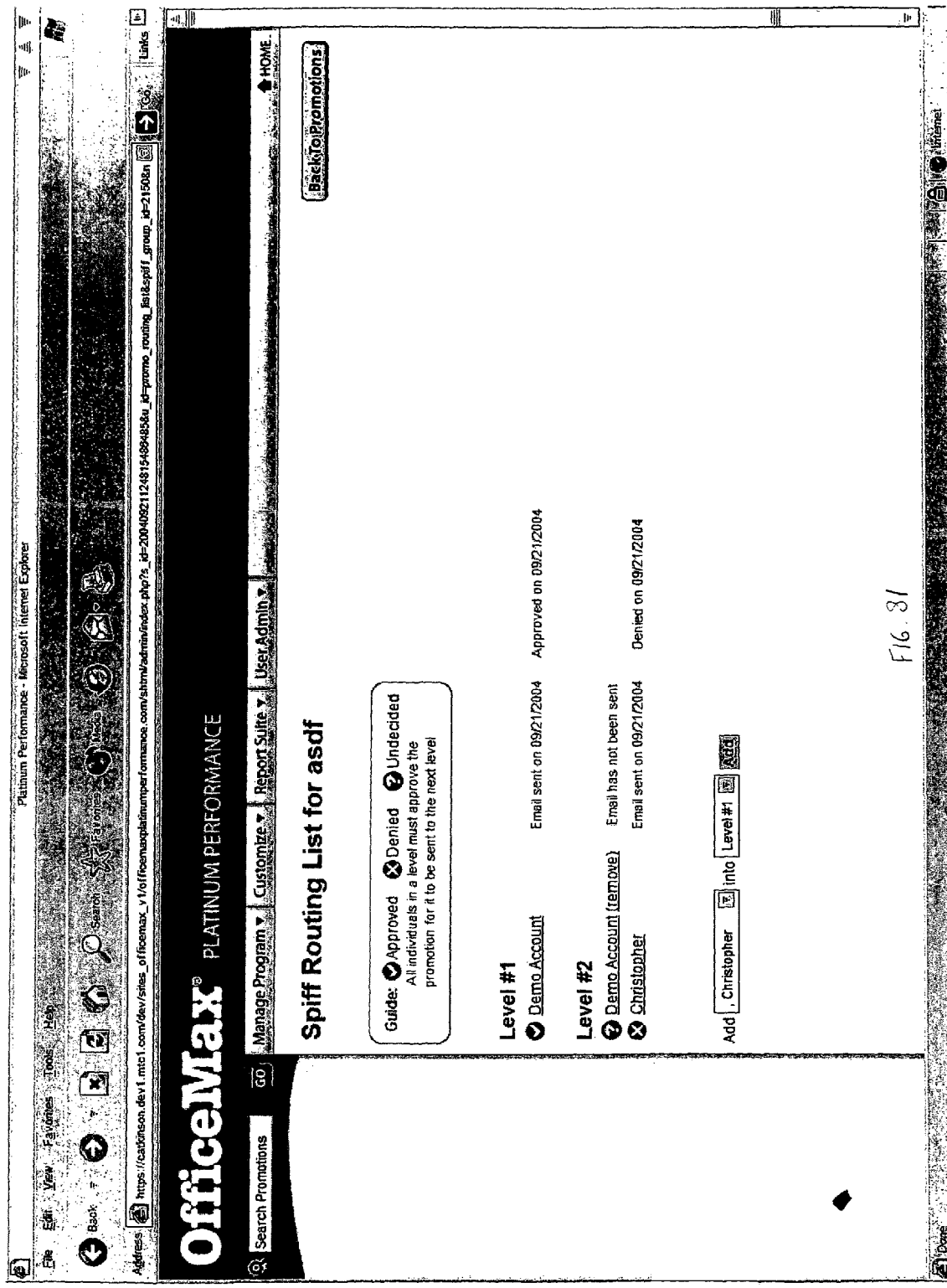
FIG. 81 depicts an embodiment of a screen shot of a Web page that an administrator may access to assist in the approval process for spiff programs.

The table may also include a column 378 having fields to permit one or more actions to be performed regarding the programs. For example, the administrator may elect to view specific details of a particular program, as shown by an embodiment of a Web page depicted in FIG. 36. In this example, the administrator has clicked on the details button 382 in the "Action" column 378 to view more information concerning promotion number 1690. FIG. 36, which shows one embodiment of the display of information regarding a program, includes: displays regarding the status of the program 390; the vendor for the program 392; the date the program was entered or approved 394; and the vendor contact name and information 396. Information regarding the particular program may also include the title 398, invoice reference number 400, description 402, start date 404 and end date 406 for the program. Additionally, the display preferably includes a table 408 or other display or listing of the particular spiffed products. Examples of information that may be contained in the table 408 include columns that list the products' SKU numbers 410, the vendor's part number 412, the vendor 414, the description of the product 416 and the spiff reward value 418.

Where it is necessary and/or desired for the vendor to approve of any spiff programs before the programs are offered to any recipients, it is appreciated that the system of the present invention may facilitate any communication between the vendor and any individuals it includes in the approval process. For example, as shown in FIG. 81, the vendor may go into a routing list to specify particular individuals and/or individuals on a particular level (e.g., all eligible participants) to send an E-mail or other communication to request their review and approval of the program, or certain aspects of the program, thereby providing interested individuals with the opportunity to provide input on particular spiff programs. For example, the vendor may want the analytical group to review the margin level aspects of the program, or its marketing department to review the spotlights or other marketing features prior to approving the program. Referring again to FIG. 81, the Web page indicates that the all individuals in the first level approved the program on Sep. 21, 2004, thereby allowing the promotion to be sent to the next level for approval. The Web page also indicates that the program was denied by an individual designated Christopher on Sep. 21, 2004. The system may also provide for means for the individuals to provide an explanation of the reasons for approval or any other questions or comments they may have such as, but not limited to, though an E-mail response or data entry fields that the individuals may access on the system.

Figure 37:
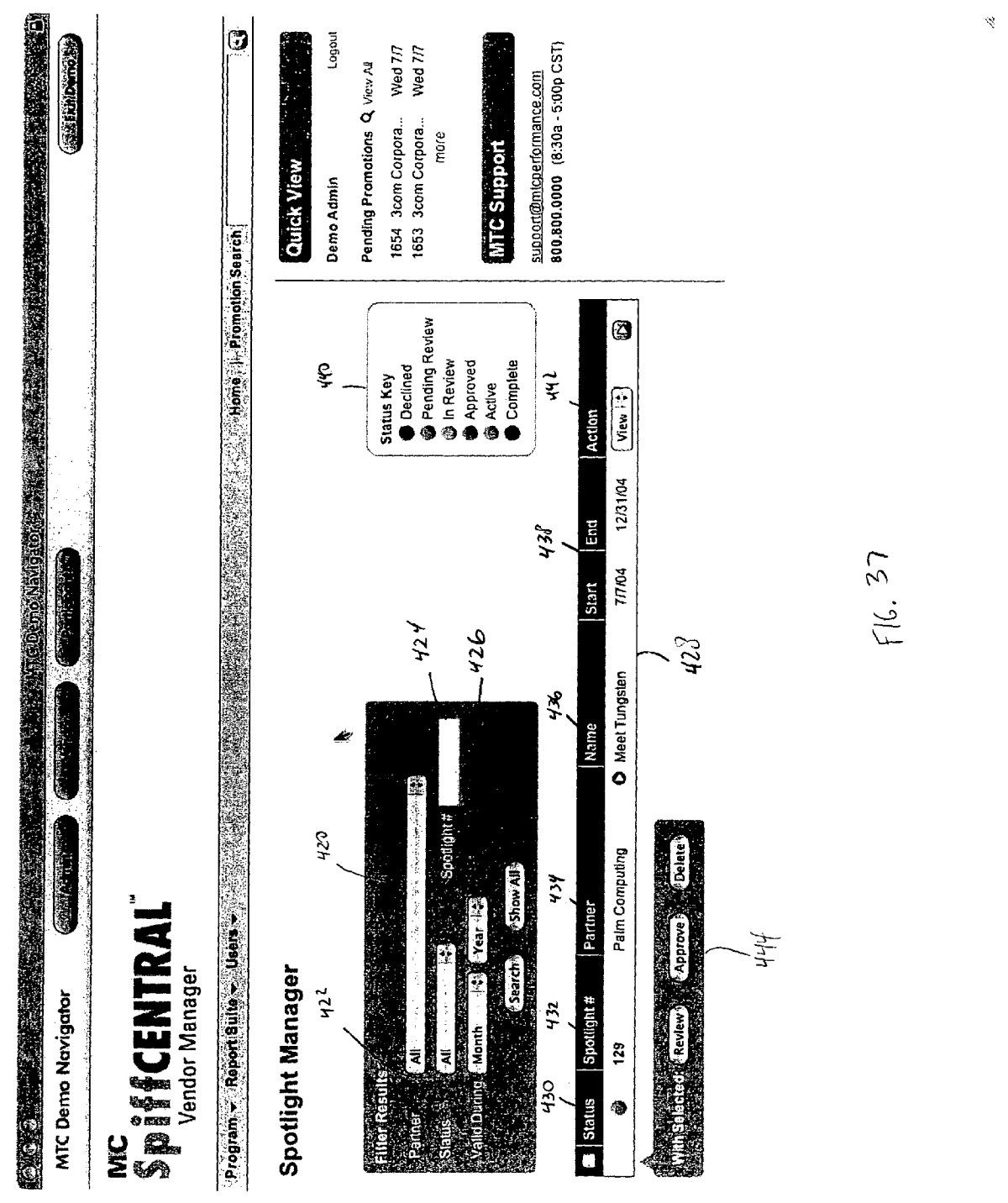

If the system allows for vendors to input or submit spotlights, the system preferably also allows the administrator to review the spotlights prior to the spotlight being available to be reviewed by salespeople. Referring to FIG. 37, the administrator may search the system for spotlights by data entry or selection fields such as, but not limited to, vendors or partners 420, spotlight status 422, spotlight number 424 or spotlight dates 426. The results of the search are preferably provided or displayed to the administrator in a table 428 that may include columns for depicting the status of the spotlights 430, the spotlight number 432, the vendor or partner 434, the name 436 of the spotlight and the start and end dates 438 for the spotlight. One embodiment to depict the status of the promotions is to use a series of different colored or shaded circles or other shapes or images. For example, referring to the key 440 shown in FIG. 37, different colored or shaded circles denote the different statuses of the spotlights, for example, declined, pending review, in review, approved, active and complete. The table 428 may also include one or more actions 442 that may be performed regarding the spotlights. For example, the user may elect to view a particular spotlight prior to deciding whether to approve the spotlight. The vendor may also modify the status of the spotlights through the system. For example, the administrator may select from a series of buttons 444 that allow the administrator to, among other things, review, approve or modify the spotlight.

The administrator also preferably has access to information regarding invoices for spiff programs that it is participating in or otherwise associated with. In order to assist the administrator in finding particular invoices, the system preferably allows the administrator to use one or more data entry or selection fields to search the invoice records by, for example, status 450, invoice number 452, vendor or partner 454, program number 456, program type 458 and invoice dates 460. The results of the search are preferably provided or displayed to the administrator in a table 462 that may include columns for depicting the status 464 of the invoices, the invoice number 466, the program number 468, the vendor or partner 470, the invoice date 472, the number of days 474 since the invoice issued, the invoice type 476 and the total amount 478 of the invoice. One embodiment to depict the status of the programs is to use a series of different colored or shaded circles or other shapes or images. For example, referring to the key 482 shown in FIG. 38, different colored or shaded circles denote the different statuses of the invoices, for example, pending payment—current, pending payment—31 to 45 days, pending payment—46 to 60 days, pending payment—61+ days, paid and cancelled.

The table 462 may also include a column 480 having fields to permit one or more actions 482 to be performed regarding the invoices. For example, the user may elect to view specific details of a particular invoice, as shown by an embodiment of a Web page depicted in FIG. 39. In this example, the administrator has clicked on the details button 484 in the "Action" column 480 to view more information concerning invoice number 3669. FIG. 39, which shows one embodiment of the display of information regarding an invoice, includes: displays regarding the status 490 of the invoice, the vendor 492 for the program, the invoice details 494, and any notes 496 that the administrator may have entered. Information concerning the invoice may include, among other things, the invoice date, the total amount of the invoice, a confirmation number, and the type of program. The information may also include a display 498 that indicates the payment status for the invoice and allows the administrator to change the status of the past due and/or enter a grace period for payment of the invoice.

The administrator may also use the system to communicate with the vendors. For example, in addition to reviewing and, if accepted, approving the spiff programs, the administrator may also communicate with the vendors regarding the particular spiff programs, oversee vendor literature postings on the system, assist in determining whether a spiff should be awarded, and communicate specific business rules to be used in establishing how spiffs how awarded for particular programs.

Referring to the embodiment of a Web page shown in FIG. 40, the administrator may also use the system of the present invention to monitor and manage the participants who are eligible for participating in the spiff programs. In order to assist the administrator in managing the participants, the administrator preferably may search the system's records using data entry or selection fields to search by salesperson status 510, salesperson name 512 or salesperson ID number 514. Results of the search are preferably provided to the administrator in a table 515 that may include columns such as, but not limited to, last name 516, first name 518, participant ID number 520, the date 522 the salesperson was added to the system, the number 524 of spills, the total amount awarded 526 to the salesperson, the status 528 of the salesperson and the term date 530. The table may also provide the administrator with the opportunity to perform certain actions 532 regarding the salespeople such as, but not limited to, viewing the saleperson's reward history. Additionally, the system may allow for the administrator to, among other things, select what types of programs the individual salespeople qualify for. In a preferred embodiment, once the types of programs are selected, the system automatically enrolls the salespeople into the appropriate programs once the programs are approved.

Figure 41:
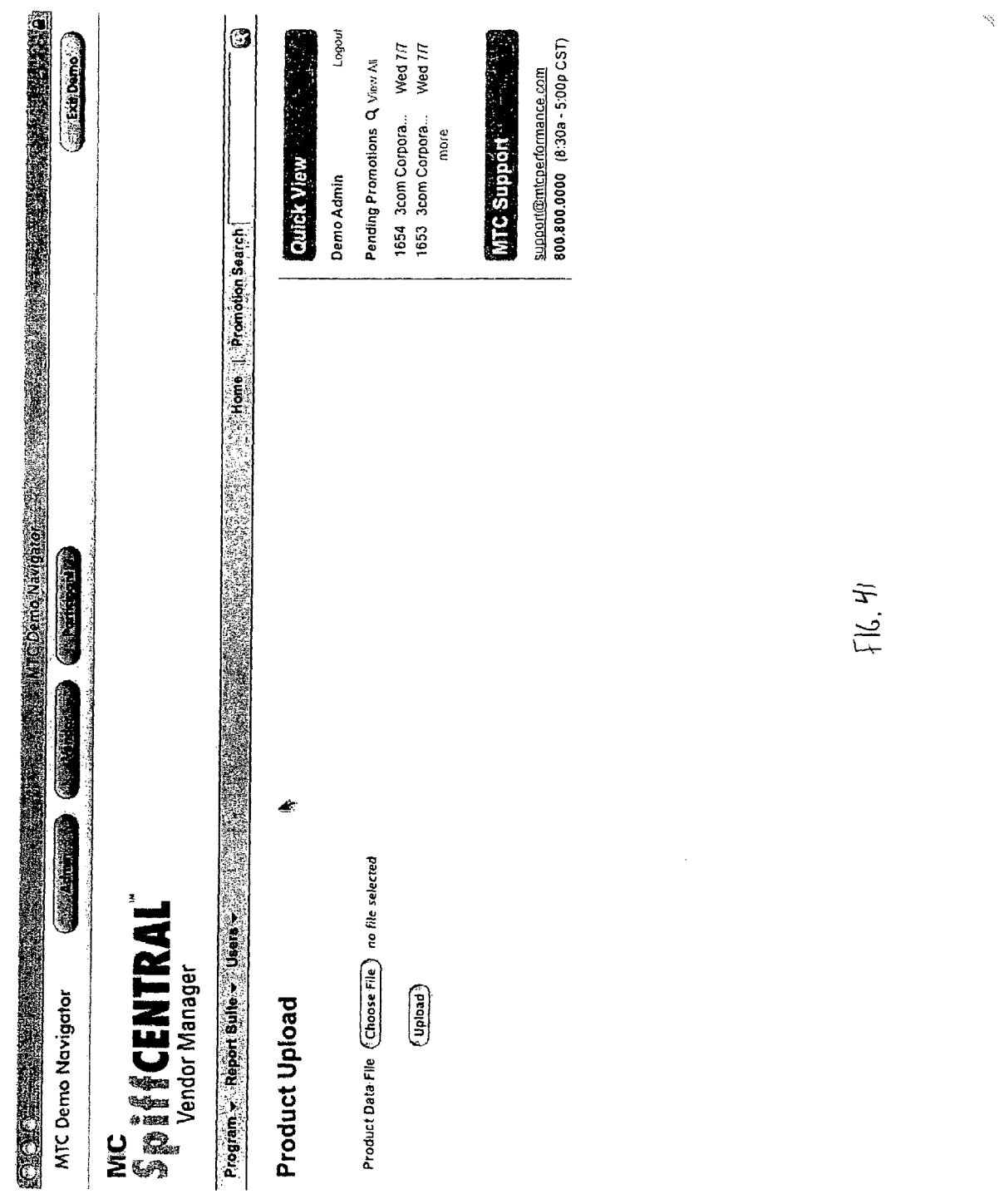

In order to assist in the inputting of information, the system, as shown by one embodiment of a Web page in FIG. 41, may also allow the administrator to upload product information into the system in a known way. Sales information may also be imported or inputted into the system in a known way. It is appreciated that the information may be uploaded or inputted on a set schedule (e.g., daily, weekly, monthly) or at anytime. Additionally, it is appreciated that the system may be set up to allow for sales information to be automatically transmitted or inputted into the system in a known way.

Figure 42:
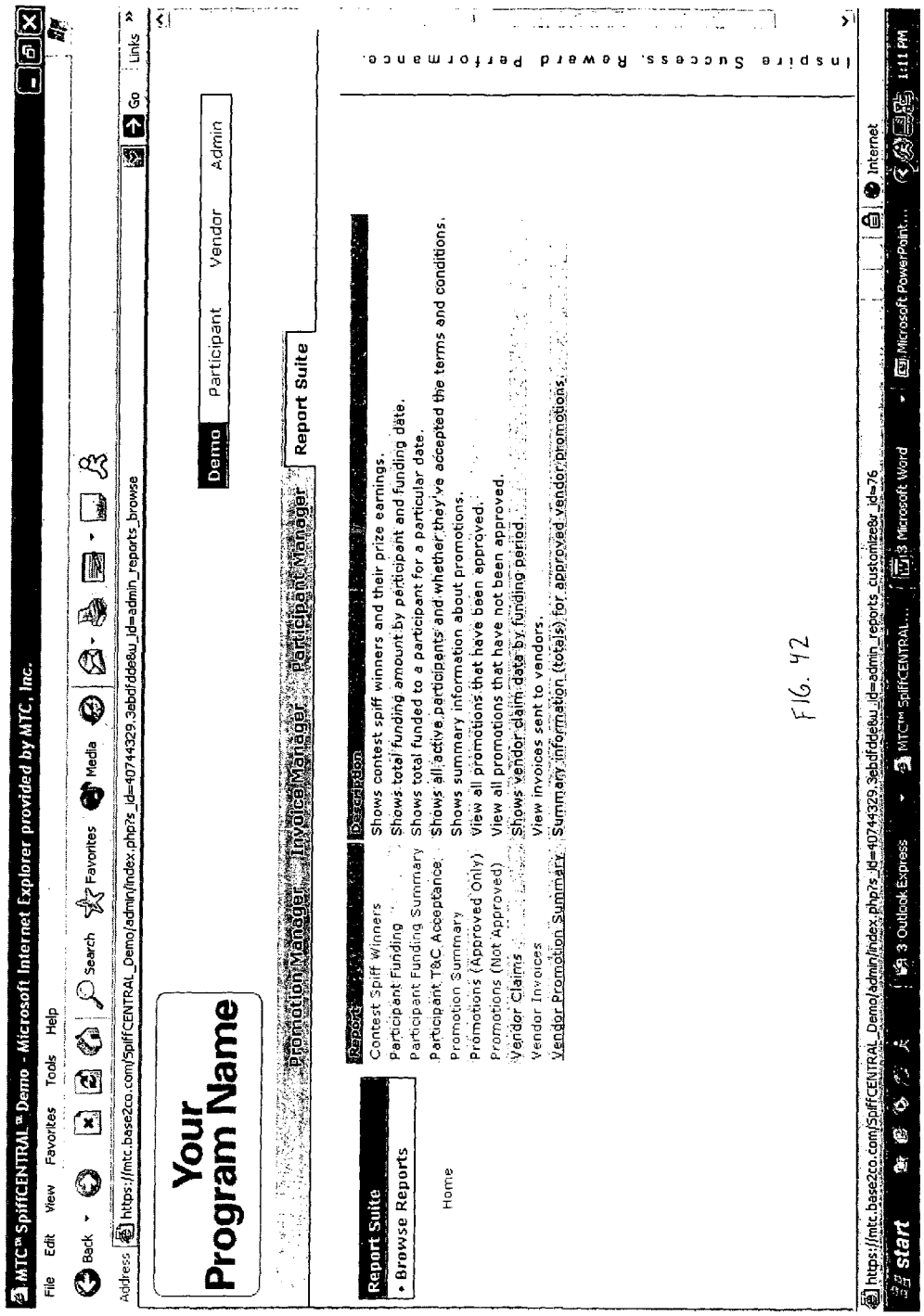
FIG. 42 is an embodiment of a screen shot of a Web page of the present invention that illustrates a variety of different available administrator report options.

As the administrator has an interest in understanding the performance of particular spiff programs that involve their jobs and/or employees, the system preferably allows for the administrator to obtain and view focused, personalized reports on the spiff programs. For example, a product manager of a printer group in a retail store has an interest in all of the spiff programs involving printers (e.g., Hewlett Packard, Lexmark, etc.). FIG. 42 is an embodiment of a Web page that depicts the various types of reports that may be available to the administrator. It is appreciated that the system provides for reports to be viewed online or downloaded to the administrator's computer in a known way in a known format such as, but not limited to Excel. Examples of reports include but are not limited to: a list of spiff winners and their earnings; total funding by salesperson and/or funding date; total funding for salespeople for a particular date; a summary of the status of all salespeople; a summary of the spiff programs; a list of approved programs; a list of programs that have not been approved; a list of vendor claims; a list of vendor invoices; and a summary of total sales for approved programs.

Figure 44:
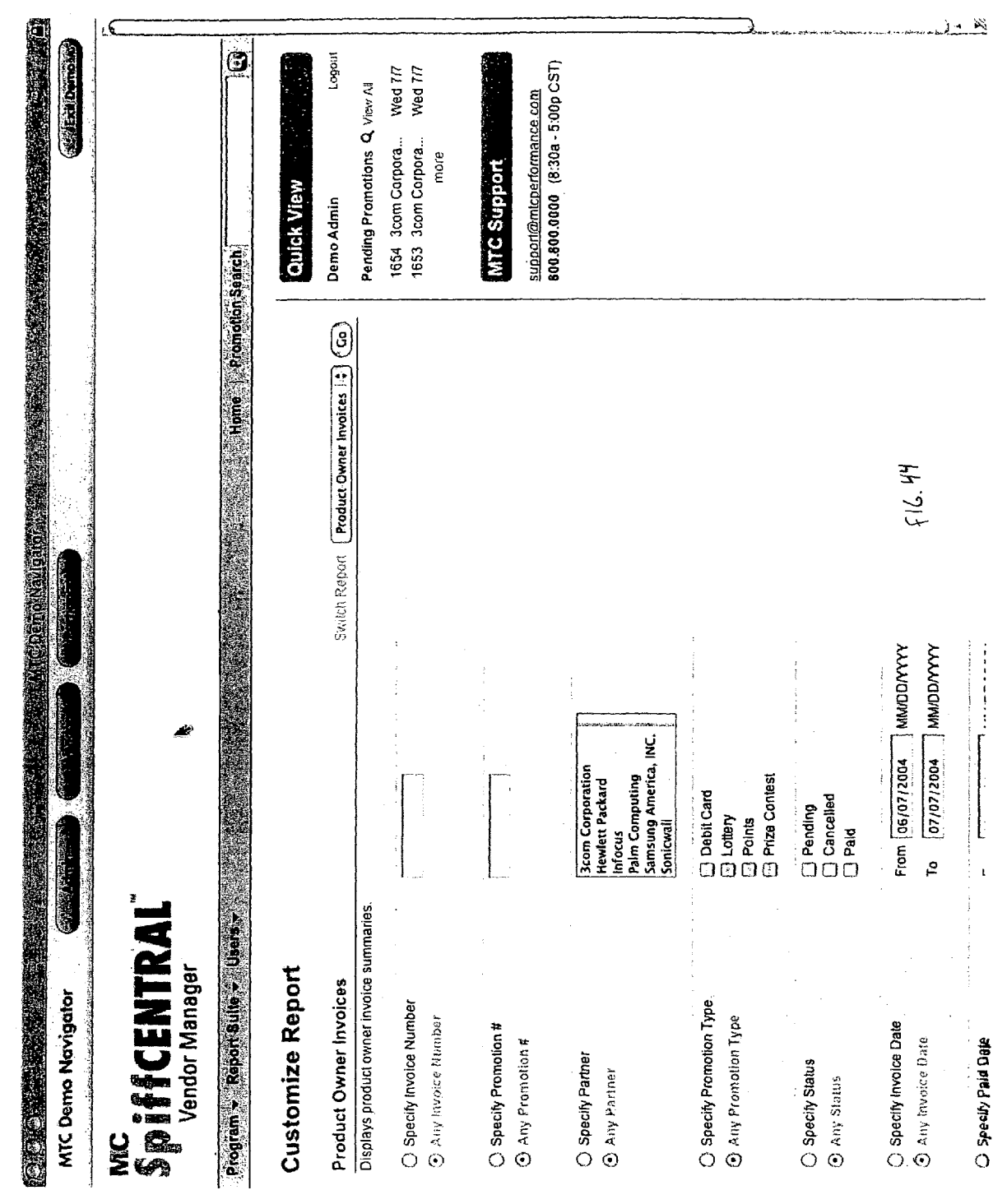
Figure 45:
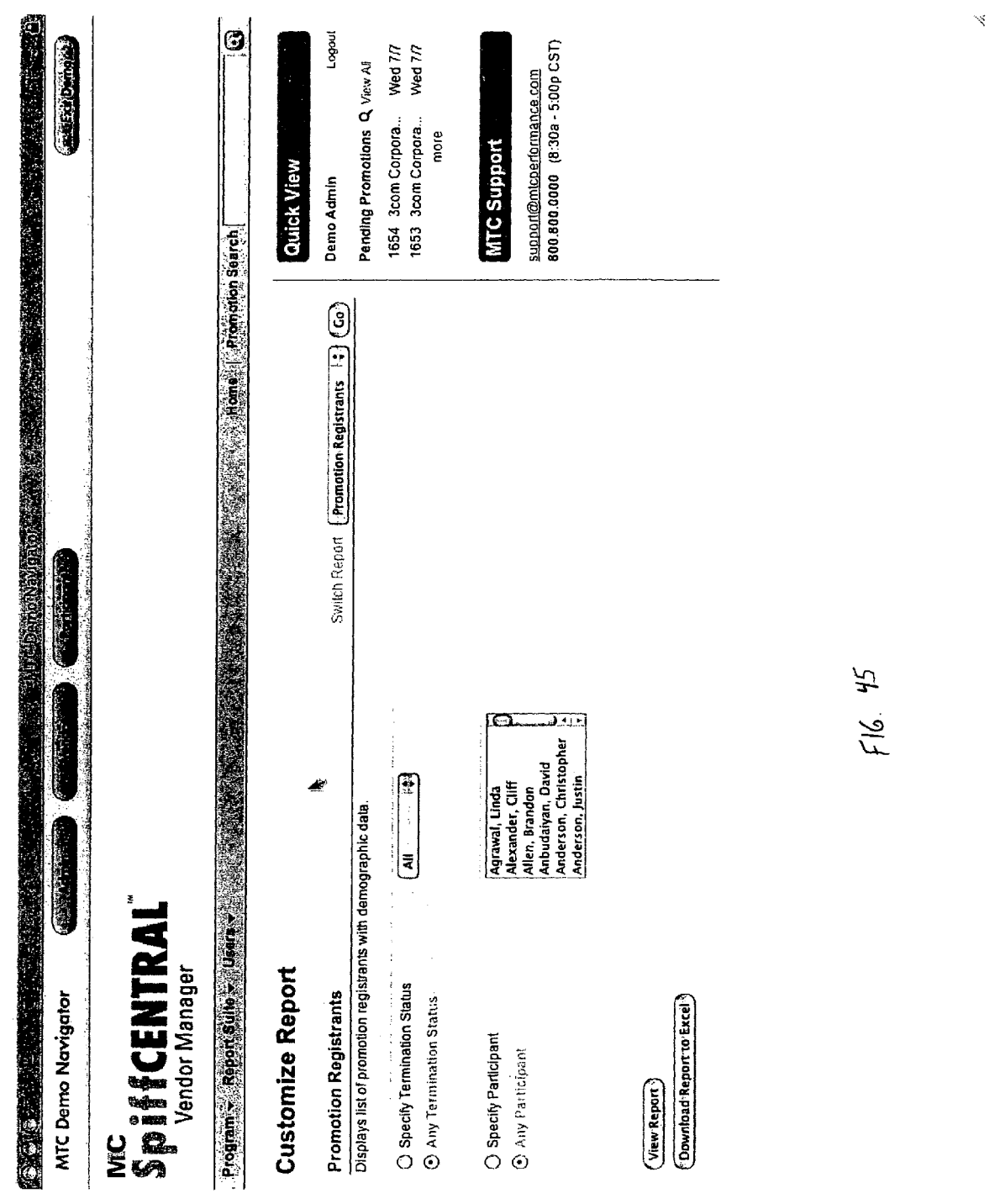
Figure 48:
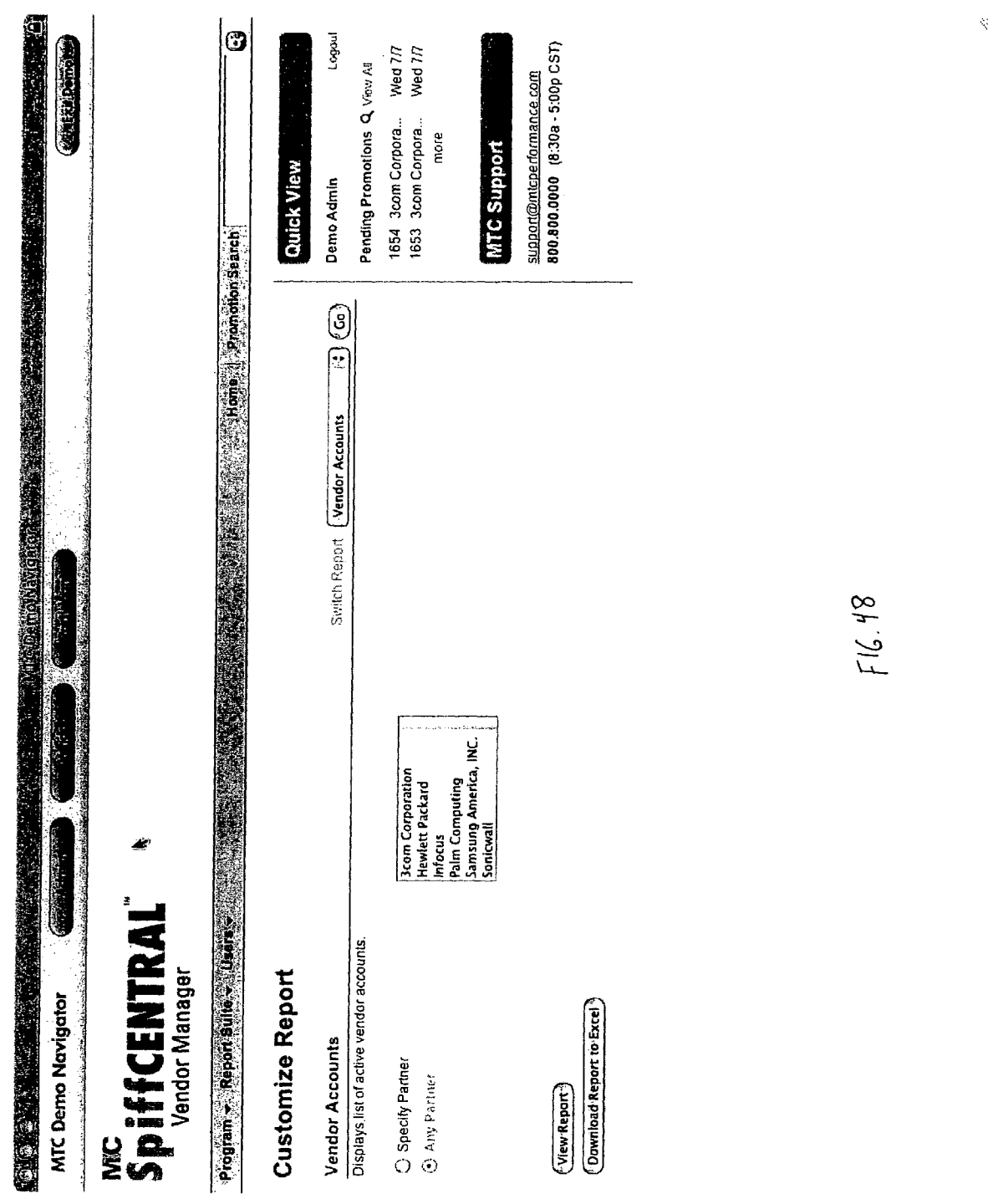

FIG. 43 illustrates an alternate embodiment of a Web page that depicts the various bases for reports that the administrator may elect to view. For example, as shown in FIG. 44, the administrator may elect to view reports based on particular eligible product invoices. Preferably, the system allows the administrator to limit or tailor the report based on particular invoices, program numbers, vendors, program types, invoice status, invoice dates, paid dates, invoice dates. The vendor may also be given the option to view detailed information regarding sales by particular participants, as shown in FIG. 45. As shown in FIG. 46, reports may also be generated based on spiffed sales. These reports may be limited to, among other things, particular participants, program numbers, invoice numbers and/or invoice dates. FIG. 47, which shows a partial listing of spiff sales for all participants, preferably includes the results in a table to facilitate the ease of reading the information. Additional detailed information may also be found by expanding the detailed information by clicking on the "+" box by a participant's last name. FIG. 48 depicts one embodiment of a Web page that allows the administrator to search and display vendor accounts.

Figure 49:
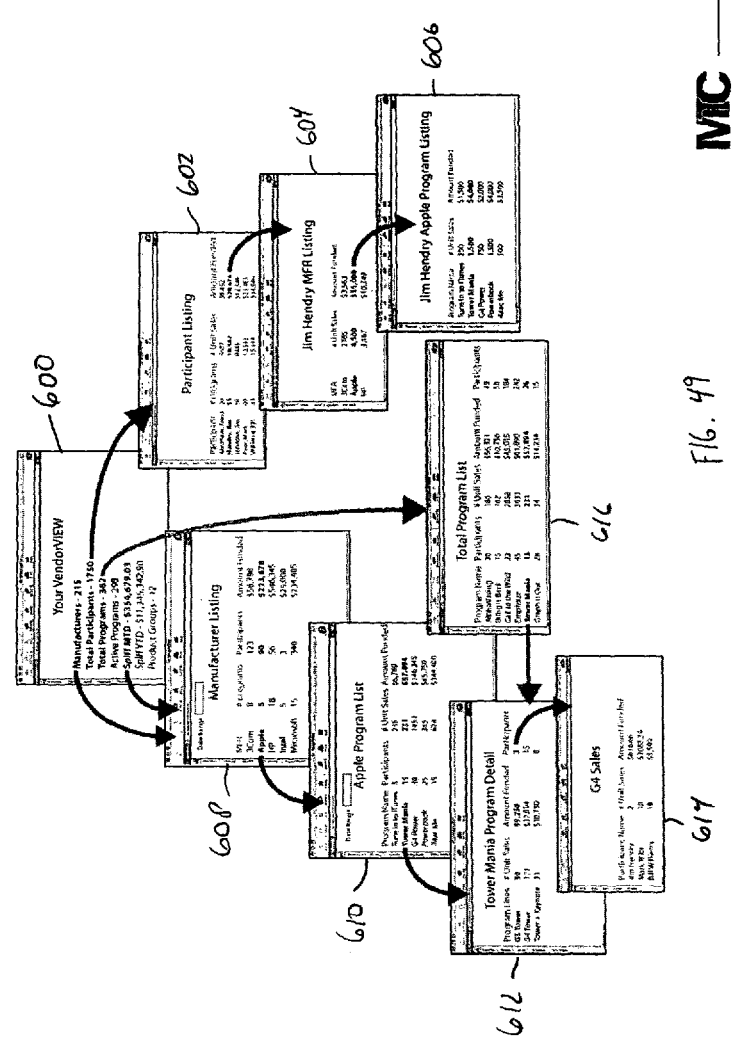
FIG. 49 is an embodiment of a screen shot of a Web page of the present invention that illustrates a variety of reports and the movement between the reports.

Referring now to FIG. 49, the ability of the present invention to allow users to easily move between and view reports is shown. FIG. 49 shows a plurality of different reports that may be generated and viewed by the administrator. As shown by the various arrows, the reports allow for the administrator to view related reports by merely clicking on a link. For example, the initial report 600 may generally summarize the number of manufacturers, participants, programs, active programs, spiff reward amounts and products groups. By clicking on any of these items, the administrator may easily monitor the activities of the spiff programs. For example, clicking on the total participants displayed in the initial report 600 provides the administrator with a list 602 of all participants, whereby the administrator may then select one or more participants to view their individual information 604. The individual's information may be further broken down by particular programs to show the participant's performance under certain spiff programs 606. Similar reports 608, 610, 612, 614 and 616 may be viewed by selecting other items such as the manufacturers, spiff awards or total programs. Examples of the many ways to use the reports of the present invention include, but are not limited to, selecting a particular vendor and then a product group to see what salespeople have been the most active for a period of time. The reports would also allow for the administrator to select a particular salesperson and go up by product group to see what vendor that particular salesperson received most of the spiff rewards from.

Figure 50:
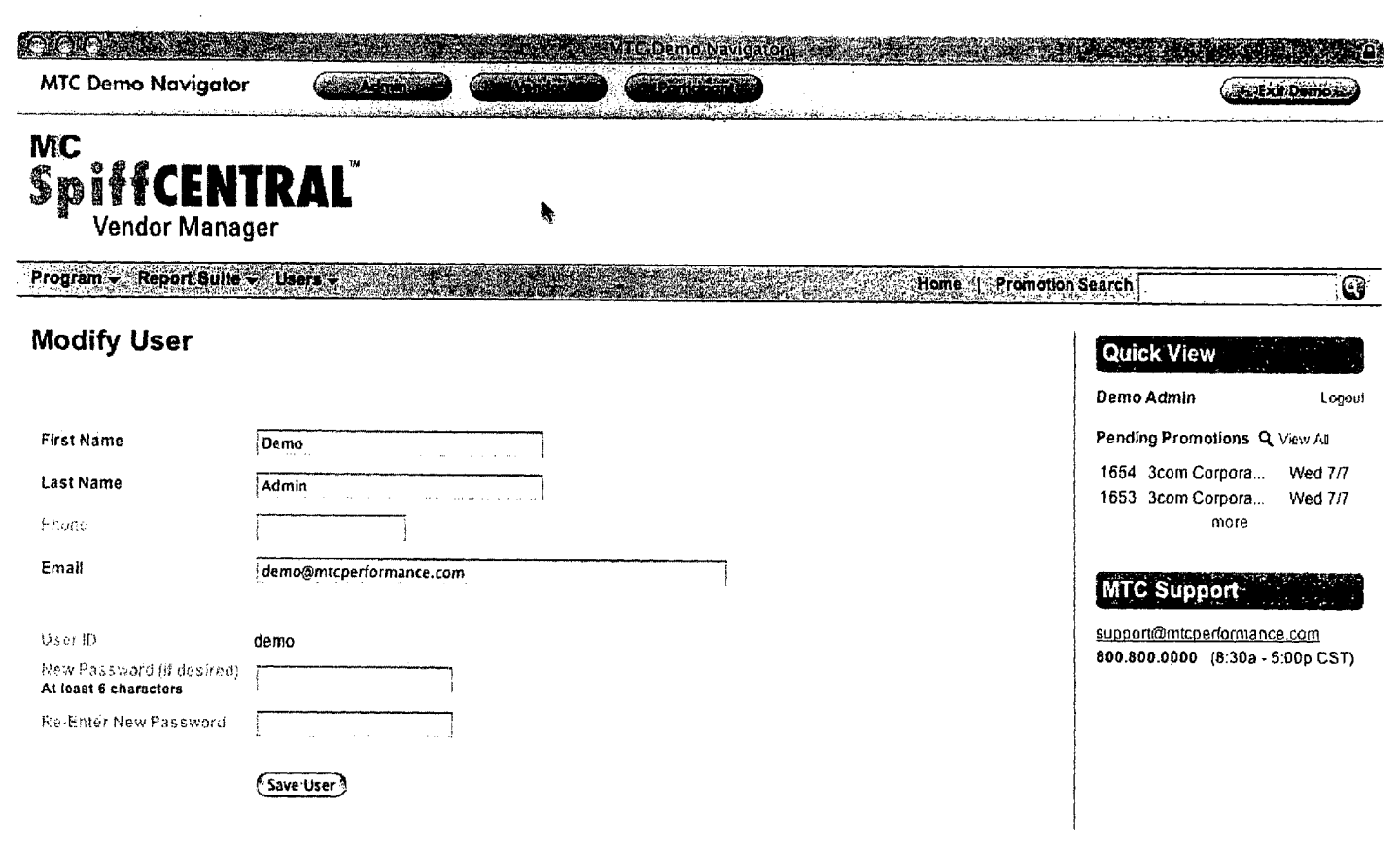

As shown in FIG. 50, the system also allows the administrator to modify its information, including its name, contact information, user ID and password.

Referring now to FIGS. 51 through 61, a series of Web pages that a salesperson may access in connection with one embodiment of the present invention are shown. Similar to the vendor application and as shown in FIG. 51, the system preferably requires the salesperson to register, establish a user ID and password, and log into the system.

If the salesperson has not registered with the system, it is preferred that the salesperson be directed to a Web page such as the one shown in FIG. 52 that includes a series of data entry fields for inputting user information to register. If the salesperson will be participating in any spiff programs that utilize a debit or credit card, it is appreciated that the host may require the salesperson to enter his or her date of birth and social security number.

Inputting the correct user name and password will allow the participant to access the incentive programs and perform a series of operations, including, but not limited to viewing the status of any spiff programs as well as the status of any spiff rewards for those programs. In the preferred embodiment, the system preferably automatically lists all spiff programs that the salesperson is eligible for once those programs are approved by the administrator.

Figure 53:
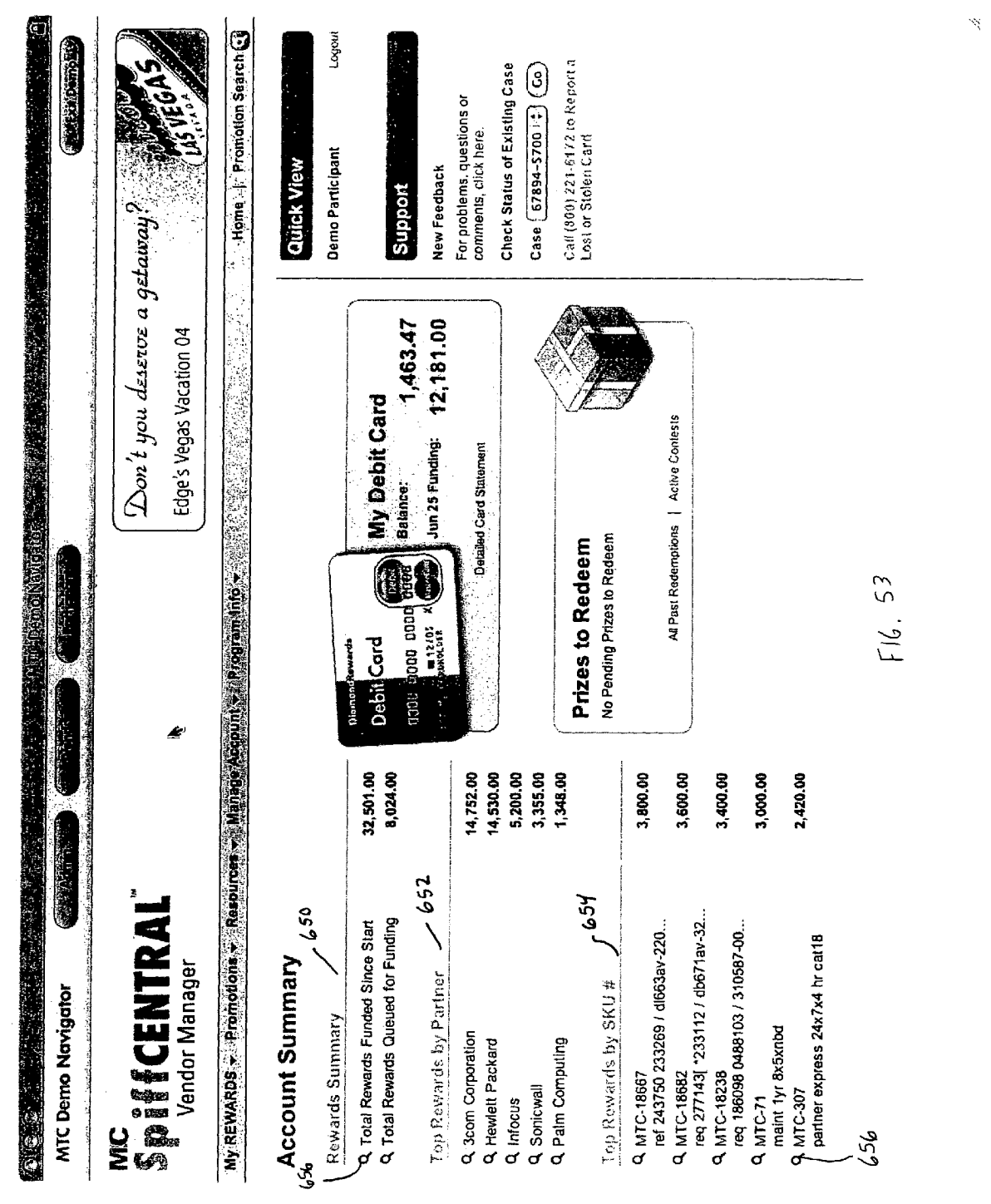

Referring now to FIGS. 53 through 57, the system preferably allows salespeople to, among other things, check their claim status and account statement online. FIG. 53 illustrates a sample Web page that allows salespeople to view their account summary. The account summary may provide a variety of information including, but not limited to, a summary 650 of all of the salesperson's rewards, a summary 652 of rewards per vendor and rewards 654 per SKU or product. The rewards summary 650 may include a display of the total amount of rewards funded for the salesperson, as well as the total amount of rewards that have been queued for funding. The Web page may also provide a link 656 to allow the salesperson to click on an entry to see more detailed information regarding the entry. For example, clicking on the total rewards funded to date link 656 under the rewards summary section 650 may provide the salesperson with a listing or breakdown of all of information regarding the funding of the spiff rewards to the participant's account. The information is preferably provided in a table 658 shown in FIG. 54 and may include columns for displaying information such as, but not limited to, the funding date 660, the number of invoices 662 associated with the funding date, the total quantity 664 of eligible products that were sold and the total spiff rewards 668 for those products. The table also preferably provides links that allow the salesperson to view more details for the spiff rewards, products and/or invoices. For example, clicking on the funding date listings may provide the salesperson with more detailed information about this matter. The Web page also preferably provides one or more data entry and/or selection fields to allow the salesperson to search for particular funding dates.

Referring now to FIG. 55, a sample card statement of the salesperson's purchase history is depicted. Similar to standard credit card statements, the card statement may include information such as the period of time for the card statement, the previous and new balances, and the details about the transactions. Details about the transaction may include, among other things, the date of the transaction, a description of the transaction and the credit or debit amount. The salesperson may also use data entry and/or data selection fields to search for particular transactions or types of transactions. The system also allows the salesperson to combine the rewards of all of the spiff programs. For example, if the salesperson is eligible for ten different debit card spiff programs, the system thereby allows the salesperson to combine all of the spiff rewards into one debit card. Having a single source for the various spiff programs will also benefit the salesperson by simplifying tax issues (e.g., only generating one tax form for all of the programs rather than separate tax forms for each individual program).

Figure 56:
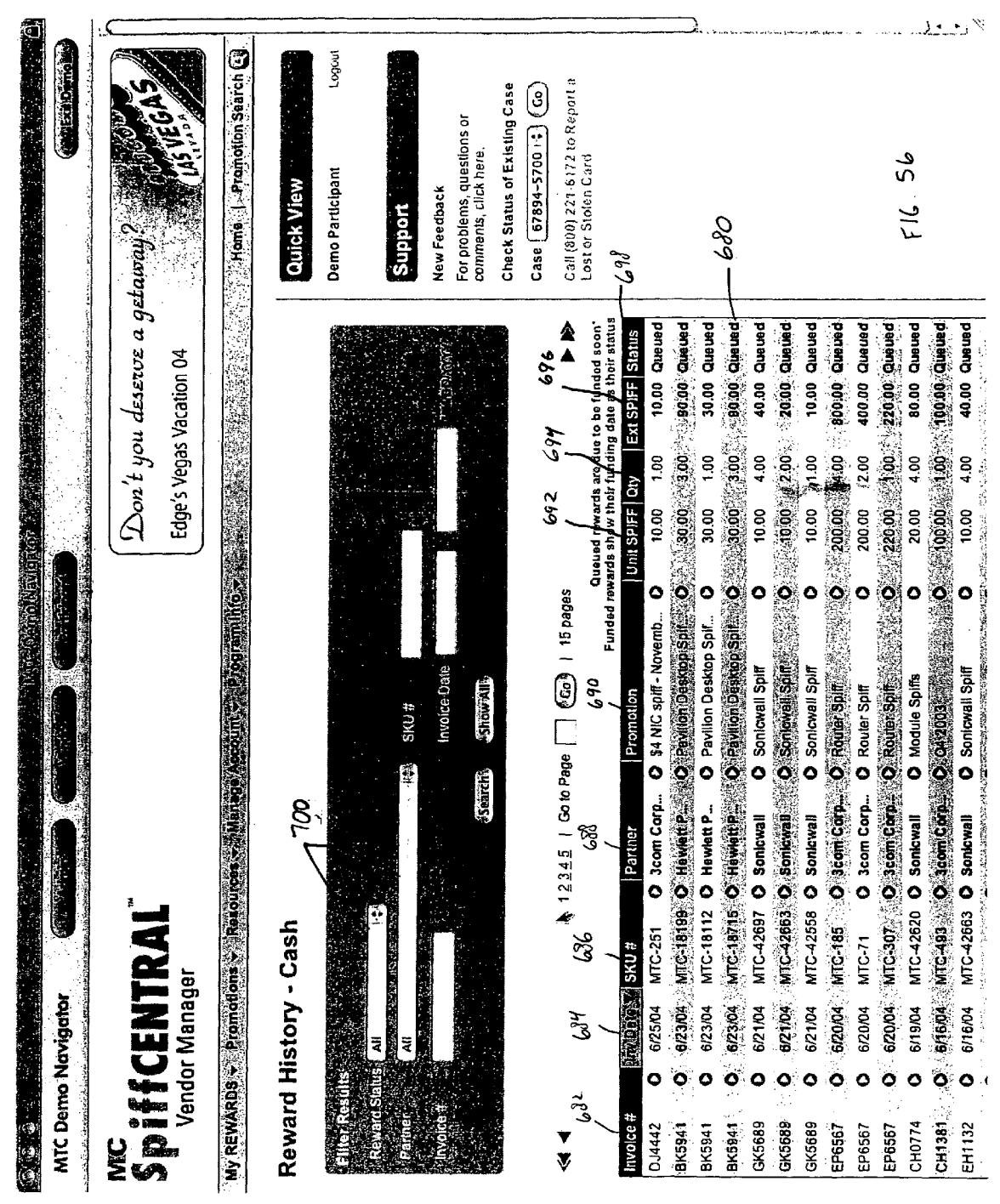

FIG. 56 depicts a partial display of a table that displays information regarding the monetary reward history for the salesperson. While a debit card for providing cash rewards is preferred, it is appreciated that other methods of providing rewards, including, but not limited to, checks or gift certificates, travel vouchers, rebate programs, payroll items, train tickets, restaurant certificates, gift certificates, paid vacation time, rental car certificates, trips, tickets to sporting events or concerts, or merchandise, may also be used and not depart from the scope of the present invention. The information is preferably provided in the form of a table 680 to facilitate ease of reviewing the information and may include columns for, among other things, the invoice number 682, the invoice date 684, the SKU number 686, the vendor 688, the promotion or program 690, the spiff amount 692, the number of eligible products 694 that were sold, the total spiff reward 696, and the status 698 of the processing of the claim. The Web page may also include a series of data entry and data selection fields 700 that may be used to search for information on particular rewards. Examples of fields for searching include, but are not limited to the reward status, the vendor, the SKU number, the invoice number and the invoice date.

Figure 57:
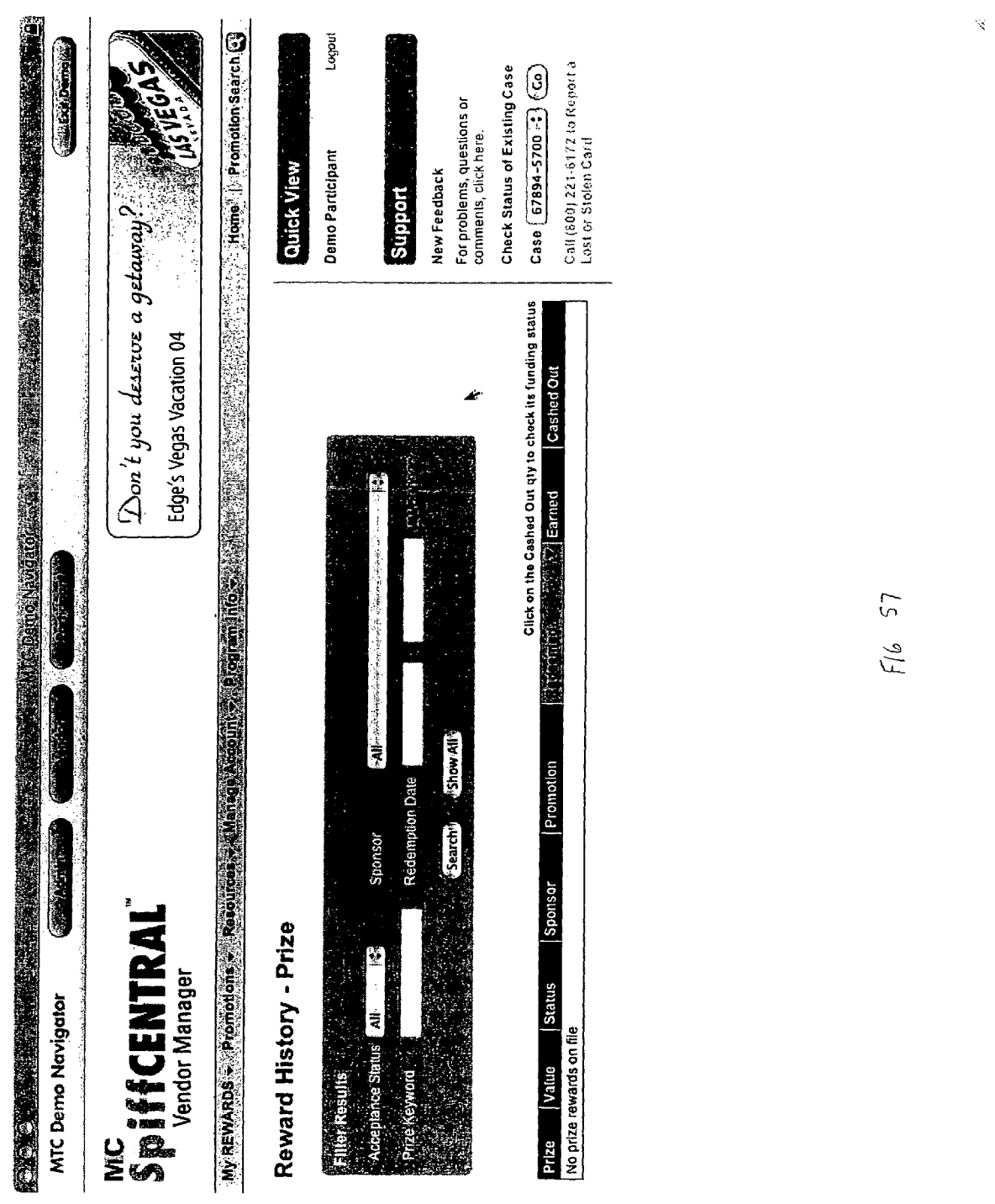

Similar to the table and search features shown in FIG. 56, the system, as shown in FIG. 57, also may allow the salesperson to display information regarding the prize reward history.

The system also preferably allows the salesperson to search or browse the system for the promotions and programs in which it is eligible for. Results of the search are preferably displayed in a table 710 that may display, among other things, the product, the vendor, the promotion or program, the start and end dates for the program and the reward value for the eligible product(s) of the program. The system may also be searched for particular programs based upon, among other things, particular vendors, product groups, program types, keywords, dates and programs by entering information into a plurality of data entry and/or data selection fields 712. Additional features may also be offered to the salesperson to, among other things, save his or her searches and any favorite searches or results.

Figure 59:
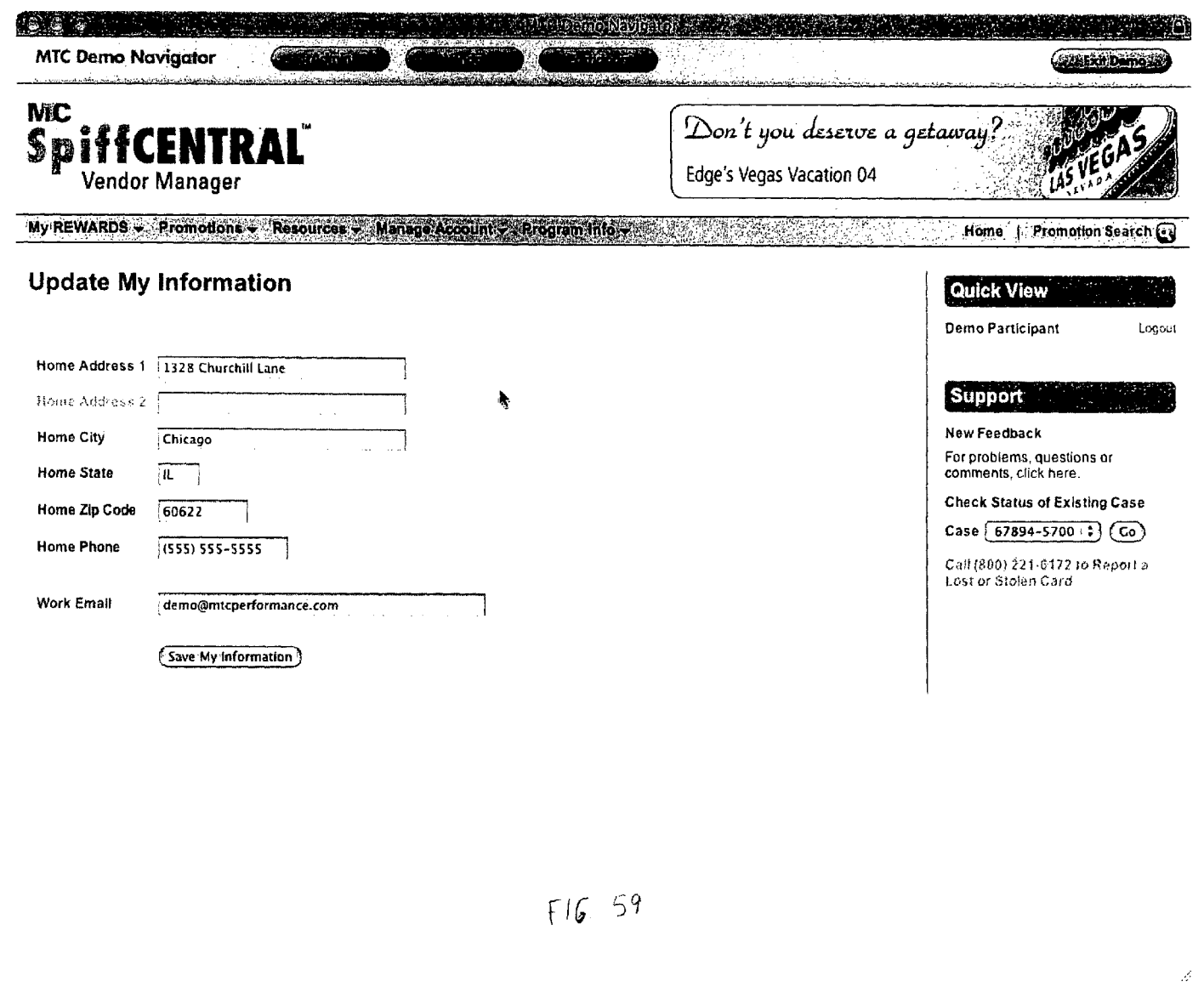
Figure 60:
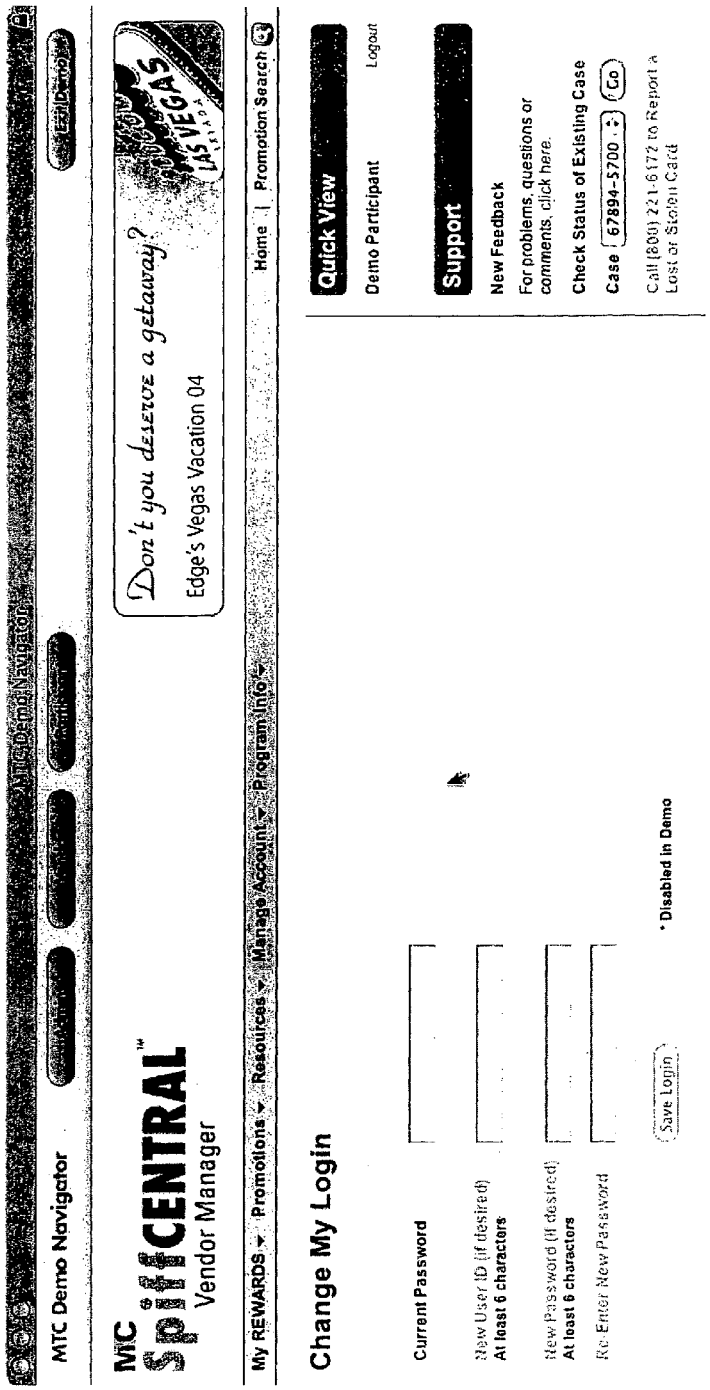
Figure 61:
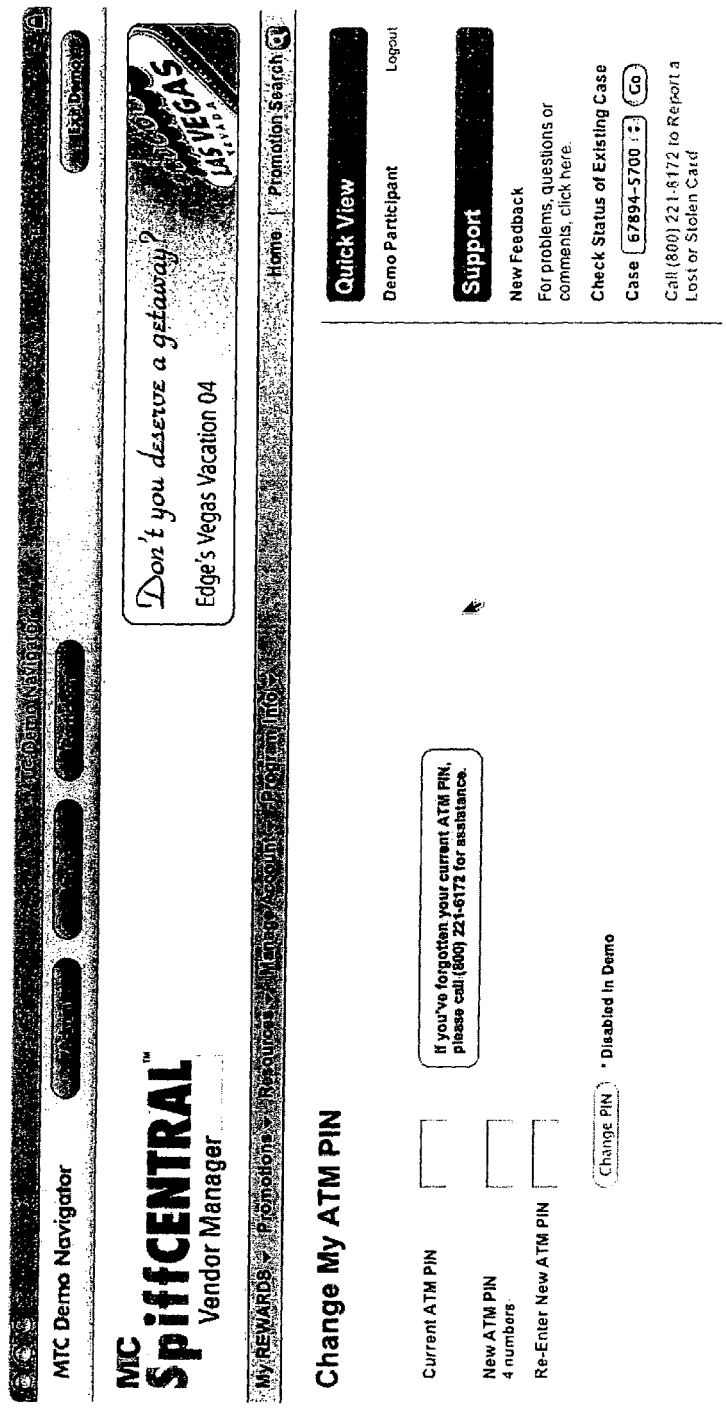

FIGS. 59 through 61 illustrate embodiments of Web pages that may be accessed by the salesperson to update his or her user information, password and/or ATM pin for use with any debit cards for the programs.

The system also operates to determine the relative success of the spiff programs by establishing a baseline of sales and then comparing the sales during the particular spiff programs with the baseline. It is appreciated that the baseline may be manually inputted into the system, or it may be calculated automatically through the collection and/or transmission of the sales information obtain through scanning the products when purchased. Comparison of spiff programs will allow the vendors to utilize the most effective spiff programs and maximize its return on investment.

Figure 62:
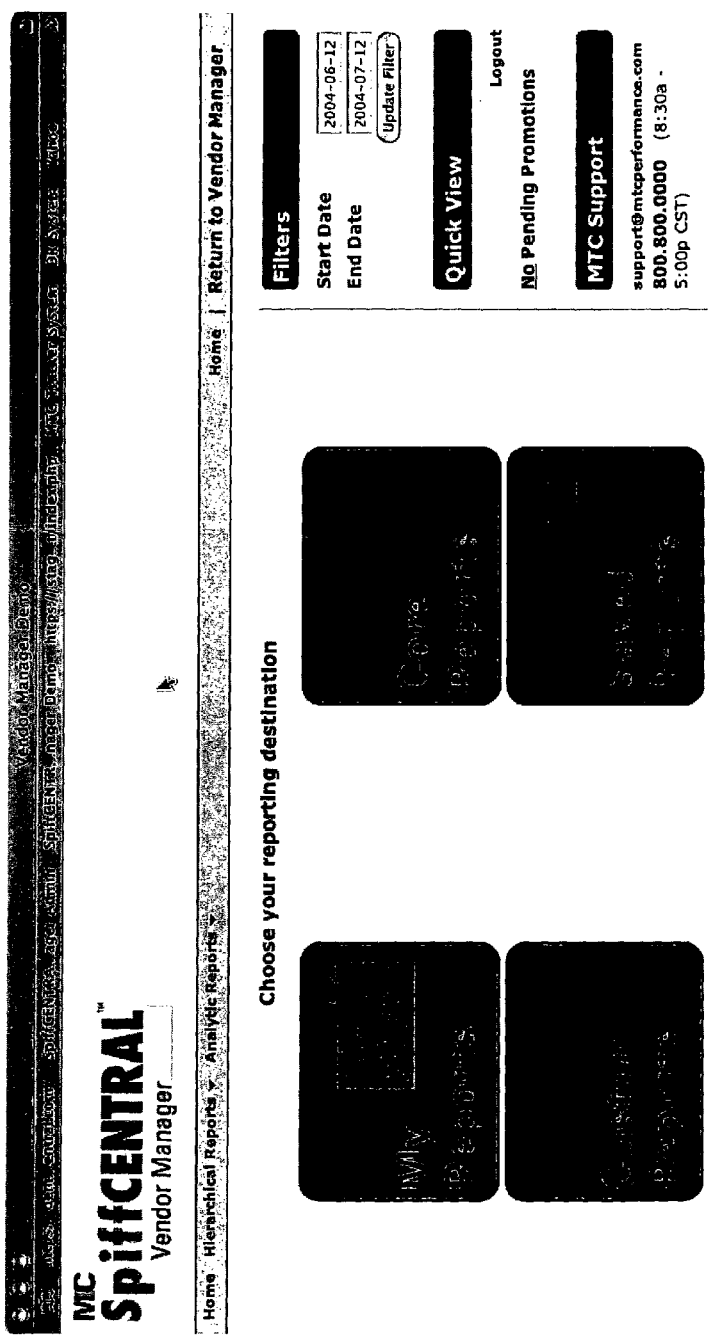
Figure 63:
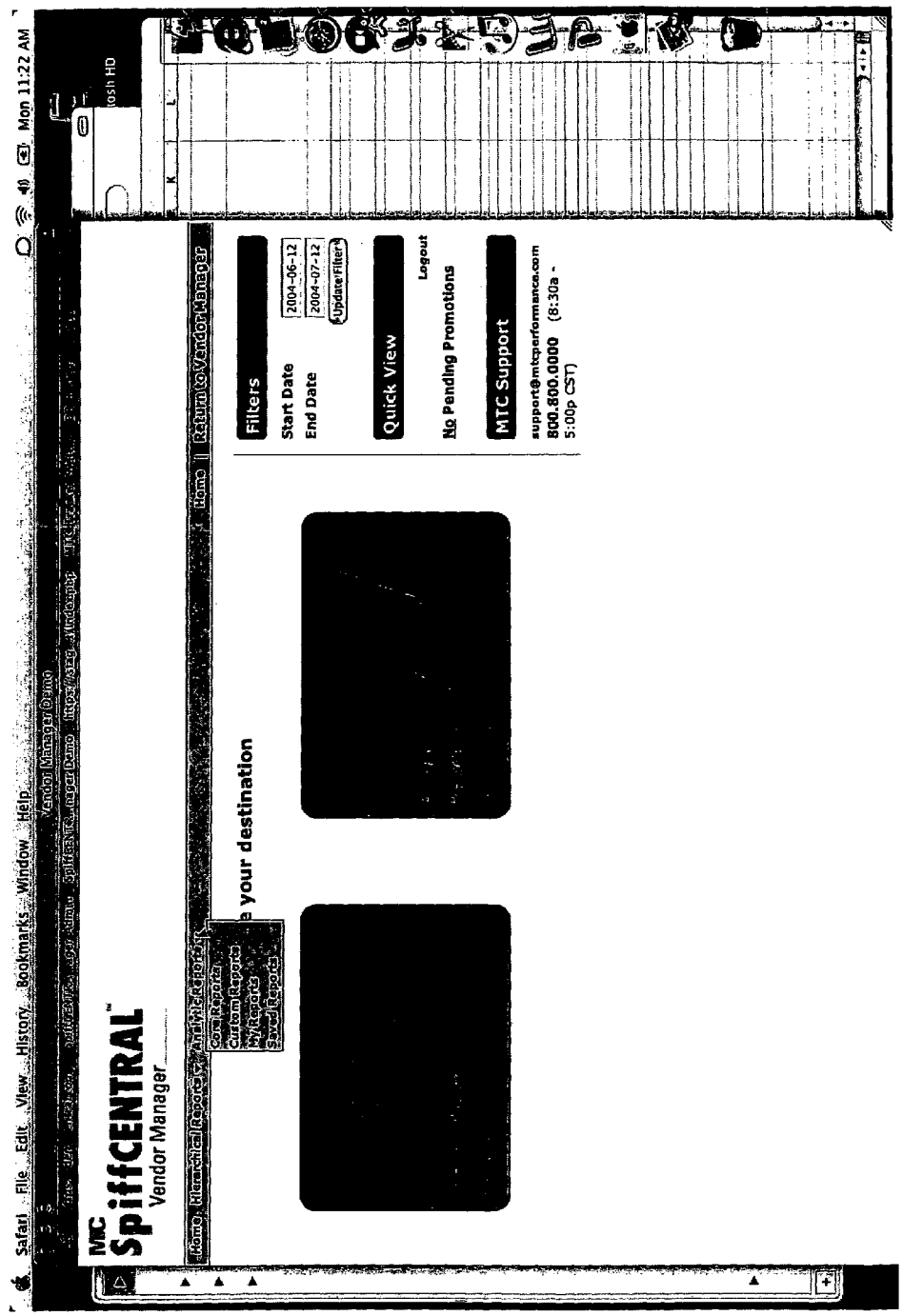

Referring now to FIGS. 62 through 70, a series of Web pages that a vendor or administrator may access to generate specific reports in connection with one embodiment of the present invention are shown. As shown in FIG. 62, a Web page may provide the vendor with a series of choices of the different types of reports that are available. Examples of possible reports include core reports, saved reports and custom reports. Once the type of report is selected, the vendor may select how the information will be reported. As shown in FIG.

63, examples of the different ways to report information include, but are not limited to, hierarchical reporting and analytical reports and graphs.

Figure 64:
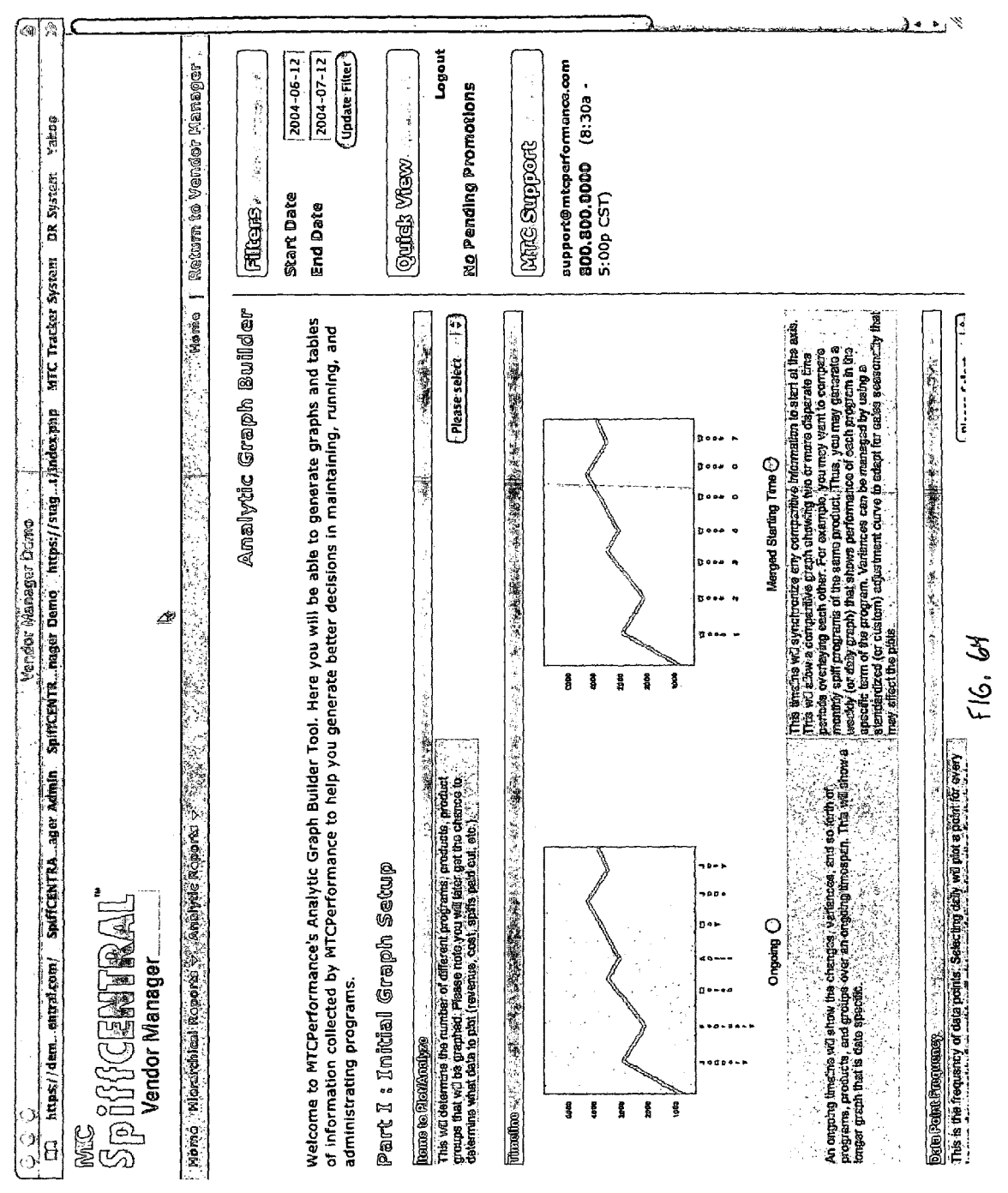

Referring now to FIG. 64, an example of a Web page that describes a process for setting up a graph for a custom report is shown. Examples of the different types of graphs include, but are not limited to, ongoing and merged starting time. The ongoing timeline or graph may show the changes, variances and the like of programs, products, and/or groups over an ongoing time period. The merged starting time graph may provide a comparative graph showing two or more disparate time periods overlaying each other. This will allow a vendor and/or an administrator to readily compare monthly spiff programs for particular products, products groups, participants and the like. The graphs may take into consideration variances using a standardized or custom adjustment curve to adapt to seasonal sales or other factors that may affect sales.

Figure 65:
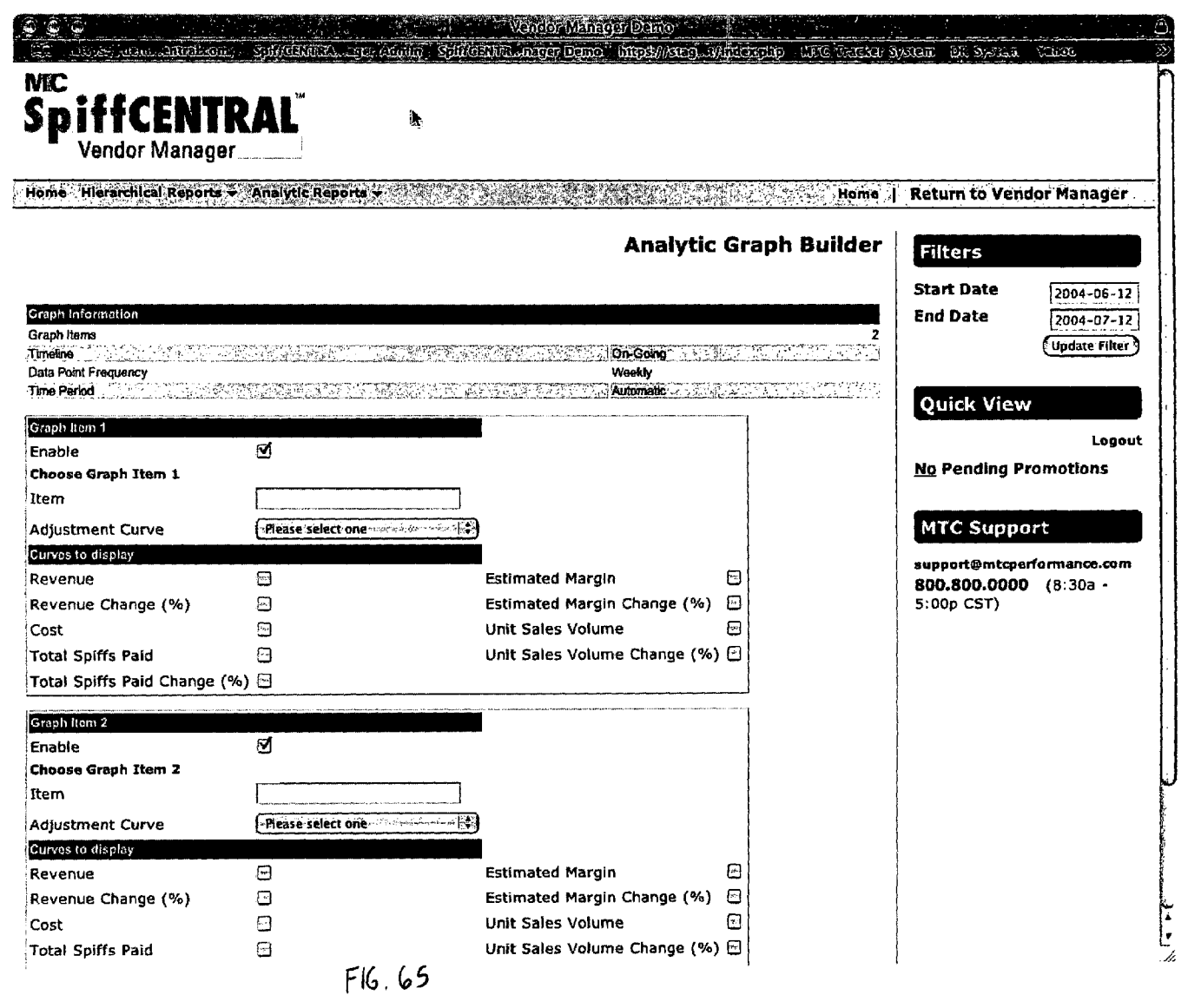

FIG. 65 illustrates a series of data entry and data selection fields that may be used to select information that the vendor desires to display for an on-going graph that shows data points on a weekly basis. Data may also be displayed daily, monthly, quarterly or any other selected time period. Examples of the information to display or graph include, but are not limited to, graphs that plot revenue, revenue change (%), cost, total spiffs paid, total spiffs paid change (%), estimated margin, estimated margin change (%), unit sales volume and unit sales volume change (%). Based on the selection of criteria for the graphs and the information to be displayed, the administrator/distributor will be provided with reports that will allow it to analyze trends and gain information on its particular products and programs, as well as others sold in the industry that are associated with the particular administrator/distributor (e.g., all brands of monitors that a particular distributor sells).

Figure 66:
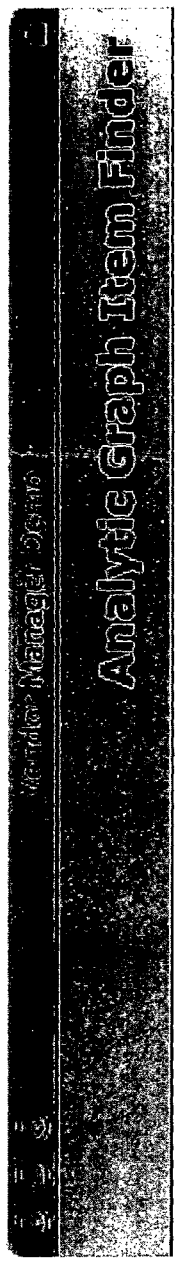
Figure 67:
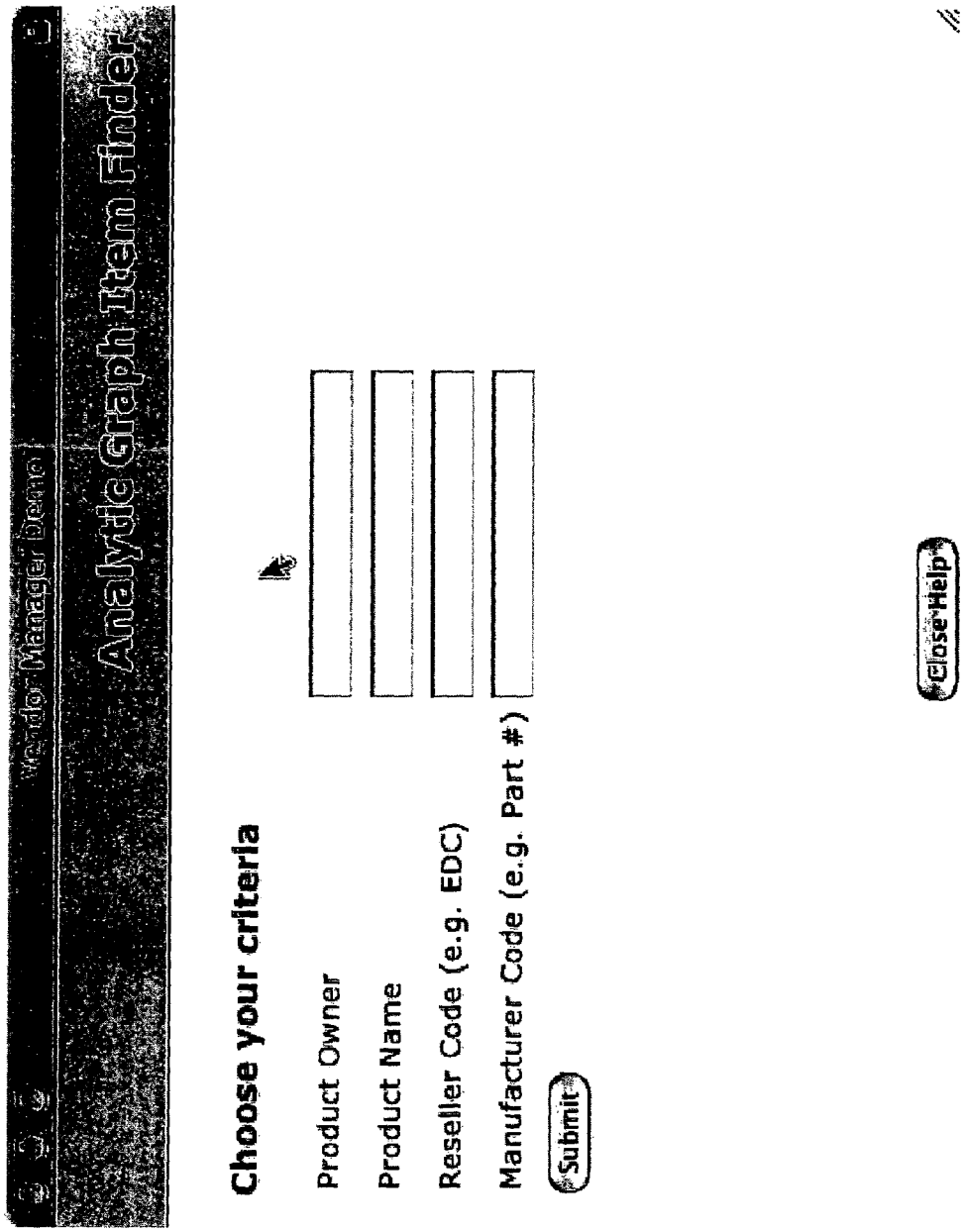

Referring to FIG. 66, the system may prompt the vendor and/or the administrator to choose a general item category to search for particular items to include in the reports. For example, if the vendor and/or the administrator would like to select a particular product of products, the system may provide a series of data entry and/or selection fields, as shown in FIG. 67, to permit the vendor and/or the administrator to search products by, among other things, the product owner, the product name, SKU numbers, the reseller code and/or the manufacturer code. FIG. 68 illustrates a list of results for products that were found that include the term "Sonicwall" in the product name.

Figure 69:
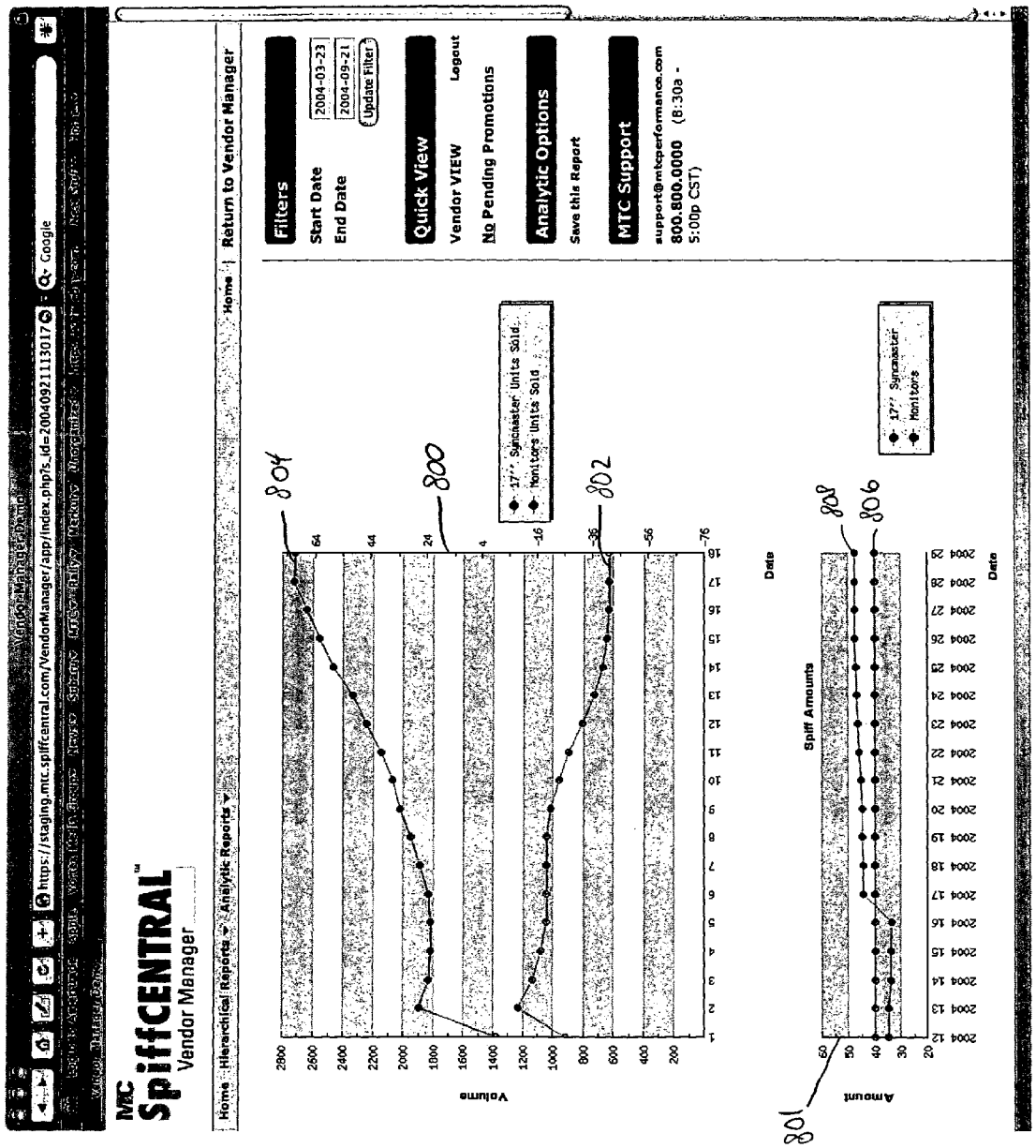

Referring now to FIG. 69, graphs showing the relative sales of a particular monitor (the 17" Syncmaster) compared to the sales of all monitors in that product group are shown. Referring to the first graph 800, the total number of units sold of the Syncmaster monitor are shown by a first line 802, and are compared against the sales of the total number of monitors sold as shown by a second line 804. The second graph 801 tracks the spiff award amounts for the same time period. The spiff amount for the vendor of the Syncmaster monitor is shown by line 806, while the average spiff amount of the monitor industry is shown by line 808. As shown in the second graph 801, the vendor has maintained the same spiff amount of $40 throughout the entire period. At the start of the time period, the industry average for spiff amounts is shown as about $35. During this time period, the Syncmaster monitor represented more than 50% of the sales of all of the monitors sold for the selected criteria. However, shortly after the average of the industry spiff amount exceeded the vendor's spiff amount, the number of sales of the Syncmaster monitors decreased, while the total sales of monitors increased. Based on the results of this report, the vendor may be able to quickly ascertain that it needs to raise its spiff amount to a competitive level in an effort to regain market share. The example of the comparative graphs represents only one embodiment of the types of reports that may be produced. As indicated above, the reports may also show, among other things, how sales under particular spiff programs compare when no spiff programs are running.

It will be understood that modifications and variations may be effected without departing from the scope of the novel concepts of the present invention, but it is understood that this application is limited only by the scope of the appended claims.

The invention claimed is:

1. A method for centralizing the simultaneous operation and management of a plurality of online incentive programs for salespersons, from a plurality of manufacturers and vendors, the method comprising the steps of:
   providing a host system for communicating with at least one program manager terminal accessible by program managers, at least one administration terminal accessible by an administrator, and at least one participant terminal accessible by salespersons wherein the host system comprises a host computer operably linked to the program manager terminal, administration terminal and participant terminal by a communications network;
   allowing a plurality of program managers to create and input a plurality of proposed sales incentive programs for a plurality of salespersons each covering one or more eligible products and/or services into the program manager terminal for transmission to the host system via the communications network;
   transmitting data indicative of the proposed incentive programs to the administration terminal to provide the administrator to have the opportunity to review and approve or disapprove the proposed incentive programs;
   activating the proposed incentive programs on the host system to create approved incentive programs only upon approval of the proposed incentive programs by the administrator via the administration terminal to create a plurality of authorized incentive programs;
   enrolling the salespersons at the host computer in the approved incentive programs;
   receiving information on the sales of products and/or services over the communications network and into the host system;
   at the host computer, automatically determining if the products and/or services that were sold are eligible products and/or services; and
   at the host computer, crediting the salespersons for the sale of eligible products and/or services.

2. The method of claim 1, wherein the step of allowing program managers to create and input a plurality of proposed incentive programs further comprises specifying salesperson eligibility criteria for incentive programs at the program manager terminal and wherein the step of enrolling the salespersons who meet the salesperson eligibility criteria in the approved incentive programs at the host computer is automatic.

3. The method of claim 1, wherein the step of allowing program managers to create and input a plurality of proposed incentive programs comprises the steps of:
   receiving SKU numbers for products and/or services at the host system via the communications network;
   transmitting the list of SKU numbers to the program manager terminal via the communications network; and receiving at the host system via the communications network from the program manager terminal selected SKU numbers for eligible products and/or services.

4. The method of claim 1, wherein the plurality of authorized incentive programs comprises a first incentive program for one of the program managers and a second authorized incentive program for the one of the program managers, and which further comprises the step of issuing a notification from the host system to the program manager terminal via the communications network for receipt by the one of the program managers if the second incentive program includes products and/or services that overlap with the first incentive program.

5. The method of claim 1, wherein at least two of the plurality of authorized incentive programs include rewards for eligible products and/or services, and which further comprises the step of combining at the host computer separate rewards of the at least two of the plurality of incentive programs into an aggregated reward for an individual salesperson.

6. The method of claim 1, which further comprises the steps of:
   establishing a baseline at one of the host computer, manager terminal, administration terminal and participant terminal for the amount of sales of the products and/or services when there are no incentive programs that cover the products and/or services; and
   electronically comparing at the host computer the sales of eligible products and services for the incentive programs with the baseline to produce comparative results; and
   providing the comparative results by transmitting the comparative results to at least one of the administration terminal, program manager terminal and participant terminal from the host computer via the communications network.

7. The method of claim 1, wherein the plurality of authorized incentive programs comprises a first authorized incentive program for one of the program managers and a second authorized incentive program for the one of the program managers, and which further comprises the steps of:
   receiving at the host system via the communications network and recording the sales of eligible products and/or services for the first authorized incentive program;
   receiving at the host system via the communications network and recording the sales of eligible products and/or services for the second authorized incentive program, wherein the eligible products and/or services for the second authorized incentive program are the same or the same type of products and/or services for the first authorized incentive program;
   electronically comparing at the host system the sales of eligible products and/or services for the first authorized incentive program with the sales of eligible products and/or services for the second authorized incentive program; and
   providing comparative results to the program manager by transmitting the comparative results to the program manager terminal.

8. The method of claim 1, which further comprises the step of generating reports on the status of the incentive programs, and wherein at least one generated report provides data spanning a plurality of authorized incentive programs.

9. The method of claim 8, wherein the generation of reports by the host computer may be done in substantially real time.

10. The method of claim 8, wherein the step of generating reports may be performed by the program managers, administrator and salespersons via requests submitted to the host computer via the communications network and originating from the program manager terminal, administration terminal and participant terminal, respectively.

11. The method of claim 10, wherein the step of generating reports comprises the step of selecting available reports to be viewed from amongst a list of available reports generated by the host computer.

12. The method of claim 11, which further comprising the step of limiting the available reports based on who is accessing or using the system and, in particular, making reports available by the host computer to the administrator that are not made available to managers and salespersons, and making reports available to the administrator and managers that are not made available to salespersons.

13. The method of claim 11, wherein the step of selecting available reports comprises the step of selecting available reports from one or more drill-down menus presented to a user of at least one of the administration terminal, program manager terminal and participant terminal.

14. The method of claim 11, which further comprises the step of including links in the available reports generated by the host computer to allow different reports to be accessed.

15. The method of claim 11, which further comprises the step of downloading one or more of the available reports from the host computer via the communications network.

16. The method of claim 1, which further comprises the step of generating invoices for payments due pursuant to an incentive program on the host computer and transmitting the invoices for receipt by the program managers at the program manager terminal based on the sales of eligible products and/or services under their respective incentive programs.

17. The method of claim 16, which further comprises the step of limiting the ability of the program managers to input incentive programs at the program manager terminal if any of their invoices remain unpaid for a period of time.

18. The method of claim 16, wherein the step of generating invoices comprises the steps of:
   calculating reward payments at the host system, based on the sale of eligible products and/or services for one of the plurality of authorized incentive programs for one of the program managers;
   generating an invoice at the host system for the sale of eligible products and/or services; and
   transmitting the invoice from the host system to the management terminal via the communications network for receipt by one of the managers.

19. The method of claim 1, which further comprises the step of allowing the managers to directly communicate with the salespersons from the management terminal through the host system and to the participant terminal via the communications network about the authorized incentive programs.

20. The method of claim 1 wherein the administrator at the administration terminal is one of a distributor, a dealer and a vendor, and the salespersons at the participant terminal are salespeople for the one of the distributor, dealer and vendor.

21. A system for centralizing the simultaneous operation and management of a plurality of online incentive programs for providing sales incentives to salespersons, from a plurality of manufacturers and vendors for administrators, program managers and salespersons, the system comprising:
   a host system comprising a host computer;
   a plurality of program manager computers operatively connected to the host system;
   an administrator computer operatively connected to the host system;
   a plurality of participant computers operatively connected to the host system;

data storage means operably associated with the host computer containing data concerning the program manager, administrator and salespersons;

means for a plurality of program managers to create and input a plurality of proposed sales incentive programs for a plurality of salespersons, each for products and/or services into the host system;

means for the administrators to review and selectively approve or disapprove the proposed incentive programs;

means for activating the proposed incentive programs on the host computer to create approved incentive programs only upon approval of the proposed incentive programs by the administrator; and means for the salespersons to be automatically entered into the incentive programs that have been approved.

22. The system of claim 21, wherein the data storage means comprises information on products and/or services and wherein the means for inputting a plurality of incentive programs comprising means for selecting eligible products and/or services from the information from the data storage means.

23. The system of claim 22, wherein the authorized incentive programs comprise a first authorized incentive program for a program manager and a second authorized incentive program for the program manager, and wherein the system further comprises:

means for comparing the first authorized incentive program with the second authorized incentive program; and means for notifying the program manager if the first authorized incentive program overlaps in associated goods or services with the second authorized incentive program.

24. The system of claim 21, which further comprises means to generate invoices to the program managers for the incentive programs.

25. The system of claim 21, which further comprises means to prevent a program manager from inputting incentive programs into the host system if any of the invoices remains unpaid for a period of time.

26. The system of claim 24, which further comprises means to automatically submit or forward invoices to the program managers.

27. The system of claim 21, which further comprises means for generating reports on the status of the incentive programs, and wherein at least one generated report provides data spanning a plurality of authorized incentive programs.

28. The system of claim 27, which further comprises means for selecting the reports to view.

29. The system of claim 28, wherein the means for selecting the reports comprises means to list available reports in one or more drill-down menus.

30. The system of claim 21, which further comprises means to track sales of the products and/or services.

31. The system of claim 30, which further comprises means to compare the sales of the products and/or services under the incentive programs.

32. The system of claim 21, wherein the administrator is at least one of a distributor and a system host, and the salespersons are salespeople for the distributor.

33. A method for centralizing the simultaneous operation and management of a plurality of online incentive programs to provide sales incentives for salespersons, from a plurality of manufacturers and vendors, the method comprising the steps of:

providing a host system for communicating with at least one program manager terminal accessible by program managers, at least one administration terminal accessible by an administrator, and at least one participant terminal accessible by salespersons, wherein the host system comprises a host computer operably linked to the program manager terminal, administration terminal and participant terminal by a communications network;

allowing program managers to create and input a plurality of incentive programs for a plurality of salespersons, each covering one or more eligible products and/or services into the program manager terminal for transmission to the host system via the communications network, wherein the plurality of incentive programs comprise a first incentive program for a first program manager and a second incentive program for at least one of the first program manager and a second program manager;

enrolling the salespersons in the approved incentive programs at the host computer;

receiving information on the sales of products and/or services at the host system via the communications network;

determining if the products and/or services that were sold are eligible products and/or services by the host computer;

recording the sales of eligible products and/or services for the first incentive program by the host computer;

recording the sales of eligible products and/or services for the second incentive program by the host computer;

establishing a baseline at the host computer for the amount of sales of the products and/or services when there are no incentive programs that cover the products and/or services;

electronically comparing the sales of eligible products and services by the host computer for the first and second incentive programs with the baseline and/or with one another; and providing comparative results comparing data from the first and second incentive program to the program manager terminal from the host computer via the communications network for receipt by at least one of the first program manager and the second program manager.

34. A method for centralizing the simultaneous operation and management of a plurality of online incentive programs to provide sales incentives to salespersons, from a plurality of manufacturers and vendors, the method comprising the steps of:

providing a host system for communicating with at least one program manager terminal accessible by program managers, at least one administration terminal accessible by an administrator, and at least one participant terminal accessible by salespersons, wherein the host system comprises a host computer operably linked to the program manager terminal, administration terminal and participant terminal by a communications network;

allowing a plurality of program managers to create and input a plurality of incentive programs each covering one or more eligible products and/or services into the program manager terminal for transmission to the host system via the communications network, wherein the plurality of incentive programs comprise a first incentive program for a first program manager and one or more second incentive programs for one or more second program managers;

enrolling the salespersons in the approved incentive programs at the host computer;

receiving information on the sales of products and/or services at the host system via the communications network;

determining if the products and/or services that were sold are eligible products and/or services by the host computer;

recording the sales of eligible products and/or services for the first incentive program by the host computer;

recording the sales of eligible products and/or services for all of the second incentive programs by the host computer;

electronically comparing the sales of eligible products and services by the host computer for the first incentive program with all of the sales for all of the incentive programs stored in the host computer; and providing comparative results comparing data from the first incentive program against data from all of the incentive programs stored in the host computer to the program manager terminal from the host computer via the communications network for receipt by the first program manager.

35. The method according to claim 1, wherein the step of allowing program managers to create and input a plurality of proposed incentive programs further comprises the steps of:

presenting a plurality of predetermined, standardized incentive program types to the program manager via the administration terminal; and permitting the program manager to select an incentive program type from the plurality of predetermined, standardized incentive program types via the administration terminal.

36. The method according to claim 35, wherein the plurality of predetermined, standardized incentive program types presented for selection via the administration terminal includes a sell and get type, wherein a salesperson earns a reward for each sale of a qualifying product; a lottery type, wherein a salesperson earns a raffle ticket for each sale of a qualifying product; and a competition type, wherein at least one top selling salesperson earns a reward.

37. The method according to claim 35, wherein the step of permitting the program manager to select an incentive program type from the plurality of predetermined, standardized incentive program types via the administration terminal is followed by the step of:

permitting the program manager to select an incentive program award substructure from amongst a plurality of predetermined incentive program award substructures via the administration terminal.

38. The method according to claim 37, wherein the plurality of predetermined incentive award substructures includes at least one of: a) an award type for each sale of an eligible product; b) an award type for sales exceeding a minimum quantity of an eligible product; c) an award type having a plurality of tiered values corresponding to a plurality of different minimum quantities of an eligible product sold; and d) an award type which bundles together required minimum quantities sold for a plurality of different eligible products.

39. The method according to claim 37, further comprising the steps of:

presenting a plurality of predetermined, standardized award types to the program manager via the administration terminal; and permitting the program manager to select a standardized award type from the plurality of predetermined, standardized award types via the administration terminal.

40. The method according to claim 39, wherein the plurality of predetermined, standardized award types includes at least one of: a) a monetary credit to a debit card; b) a gift certificate; c) a travel voucher; d) a ticket to an event; e) a check; f) a payroll item; and g) an item of merchandise.

41. The method according to claim 1, wherein the step of allowing program managers to create and input a plurality of proposed incentive programs further comprises the step of specifying a split-type reward via the administration terminal, wherein a single reward is shared by a plurality of salespersons.

42. The method according to claim 41, wherein a participant sharing in the split-type reward is a salesperson and another participant sharing in the split-type reward is a vendor who's products and/or services are included in an activated incentive program.

43. The method according to claim 1, wherein the step of activating the proposed incentive program comprises the substeps of:

creating a routing list via the administration terminal identifying individuals who's approvals are all required in order to activate a proposed incentive program; and activating the proposed incentive program on the host system to create approved incentive program only upon receipt of approvals at the host system of the proposed incentive program by all of the individuals identified on the routing list.

44. The method according to claim 43, wherein the approval of individuals across a plurality of different business organizations is required to be received at the host system in order to activate the proposed incentive program.

45. The method according to claim 1, further comprising the step of creating a competitive environment for a plurality of incentive programs by permitting an incentive program sponsor, via an administrative terminal, to compare and track sales of an individual product and/or service within one incentive program in relation to similar products and/or services across a plurality of incentive programs.

46. The method according to claim 1, further comprising the step of creating a competitive environment for a plurality of incentive programs by permitting a salesperson, at a participant terminal, to search for active incentive programs based upon types of products and/or services.

* * * * *

UNITED STATES PATENT AND TRADEMARK OFFICE
CERTIFICATE OF CORRECTION

| | | |
|---|---|---|
| PATENT NO. | : 7,778,870 B1 | Page 1 of 1 |
| APPLICATION NO. | : 10/946523 | |
| DATED | : August 17, 2010 | |
| INVENTOR(S) | : George Kriza | |

It is certified that error appears in the above-identified patent and that said Letters Patent is hereby corrected as shown below:

Column 2
Line 31, replace "managers's" with --manager's--.

Column 3
Line 27, replace "demonstrate" with --demonstrates--.

Column 8
Line 2, replace "odem" with --modem--.

Column 10
Line 60, replace "spills" with --spiffs--.

Column 11
Line 31, replace "spills" with --spiffs--.

Column 13
Line 42, replace "spill" with --spiff--.

Column 17
Line 41, replace "spills" with --spiffs--.
Line 46, replace "saleperson's" with --salesperson's--.

Signed and Sealed this
First Day of February, 2011

David J. Kappos
*Director of the United States Patent and Trademark Office*